(12) United States Patent
Mansouri et al.

(10) Patent No.: US 11,833,756 B2
(45) Date of Patent: Dec. 5, 2023

(54) MULTI-STAGE WASH SYSTEM FOR VAT POLYMERIZATION-BASED 3D PRINTED PARTS

(71) Applicant: SprintRay Inc., Los Angeles, CA (US)

(72) Inventors: Amir Mansouri, Los Angeles, CA (US); Huijian Tian, Los Angeles, CA (US); Shukun Ye, Los Angeles, CA (US); Hossein Bassir, Los Angeles, CA (US); Aayush Patel, Los Angeles, CA (US); Hang Ye, Los Angeles, CA (US)

(73) Assignee: SprintRay Inc., Los Angeles, CA (US)

( * ) Notice: Subject to any disclaimer, the term of this patent is extended or adjusted under 35 U.S.C. 154(b) by 0 days.

(21) Appl. No.: 17/678,996

(22) Filed: Feb. 23, 2022

(65) Prior Publication Data

US 2022/0176632 A1 Jun. 9, 2022

Related U.S. Application Data

(63) Continuation of application No. 17/142,942, filed on Jan. 6, 2021, now Pat. No. 11,279,089.

(Continued)

(51) Int. Cl.
*B29C 64/35* (2017.01)
*B29C 64/245* (2017.01)
(Continued)

(52) U.S. Cl.
CPC ............... *B29C 64/35* (2017.08); *B08B 3/02* (2013.01); *B08B 3/04* (2013.01); *B08B 3/104* (2013.01);
(Continued)

(58) Field of Classification Search
CPC .. B29C 64/35; B29C 2071/0027; B33Y 40/20
See application file for complete search history.

(56) References Cited

U.S. PATENT DOCUMENTS 3,599,872 A 8/1971 Guth
5,248,456 A * 9/1993 Evans, Jr. ............... B33Y 40/20
118/712

(Continued)

FOREIGN PATENT DOCUMENTS

CN 108746043 A * 11/2018
EP 691099 A2 * 1/1996 ......... A47L 15/4291
(Continued)

OTHER PUBLICATIONS

Machine translation: CN108746043; Chen (Year: 2018).*

*Primary Examiner* — Natasha N Campbell
(74) *Attorney, Agent, or Firm* — Jafari Law Group, Inc.

(57) ABSTRACT

The invention is generally a system for washing off residual resin from objects which are three-dimensionally (3D) printed through a vat polymerization (VP) process. Exemplary systems may include a solvent receptacle, a wash reservoir in fluid communication with the solvent receptacle, and a controller configured to pump a solvent from the solvent receptacle to the wash reservoir for washing off residual resin from a 3D-printed object. Exemplary methods may include pumping a first solution of a plurality of solvent solutions from the solvent receptacle to the wash reservoir, dispersing the first solution onto the 3D-printed object, pumping the first solution from the wash reservoir to the solvent receptacle, pumping a second solution of the plurality of solvent solutions from the solvent receptacle to the wash reservoir, and dispersing the second solution onto the 3D-printed object.

21 Claims, 45 Drawing Sheets

Related U.S. Application Data

(60) Provisional application No. 62/957,645, filed on Jan. 6, 2020.

(51) Int. Cl.
  *B29C 64/386* (2017.01)
  *B08B 3/10* (2006.01)
  *B08B 3/04* (2006.01)
  *B08B 3/02* (2006.01)
  *B33Y 30/00* (2015.01)
  *B33Y 40/20* (2020.01)
  *B33Y 50/00* (2015.01)

(52) U.S. Cl.
  CPC .......... *B29C 64/245* (2017.08); *B29C 64/386* (2017.08); *B08B 2220/04* (2013.01); *B33Y 30/00* (2014.12); *B33Y 40/20* (2020.01); *B33Y 50/00* (2014.12)

(56) References Cited

U.S. PATENT DOCUMENTS

| | | | |
|---|---|---|---|
| 2005/0233261 A1* | 10/2005 | Slaughter | G03F 7/00 430/330 |
| 2009/0283109 A1* | 11/2009 | Moussa | B08B 3/06 134/1 |
| 2010/0059091 A1 | 3/2010 | Meissner | |
| 2011/0186081 A1 | 8/2011 | Dunn et al. | |
| 2013/0075957 A1* | 3/2013 | Swanson | B33Y 40/20 264/405 |
| 2018/0215096 A1* | 8/2018 | McMahon | B29C 64/35 |
| 2020/0078831 A1* | 3/2020 | Converse | B29C 64/20 |
| 2020/0103857 A1* | 4/2020 | Wynne | G05B 19/4099 |

FOREIGN PATENT DOCUMENTS

| | | | | |
|---|---|---|---|---|
| EP | 0691099 A2 | | 1/1996 | |
| GB | 2151464 A | | 10/1984 | |
| GB | 2151464 A | * | 7/1985 | ............ A47L 15/22 |

* cited by examiner

FIG. 12A
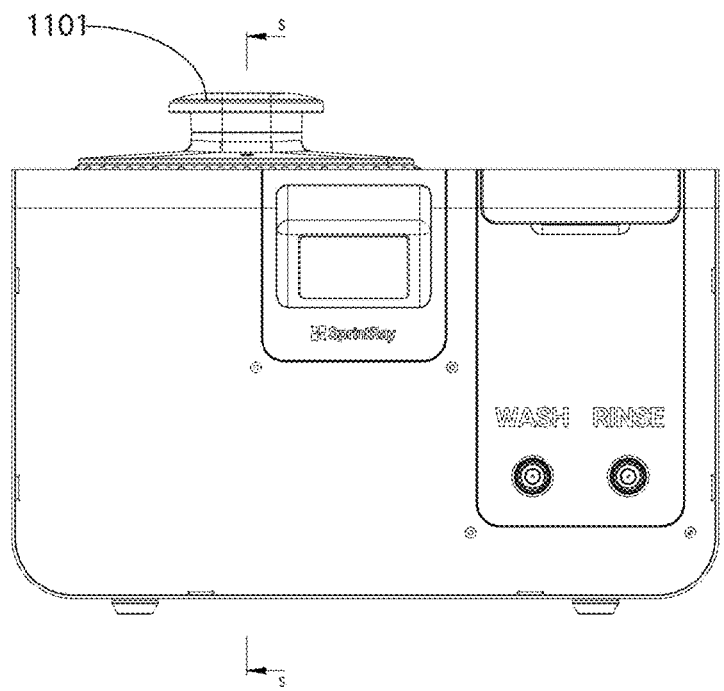
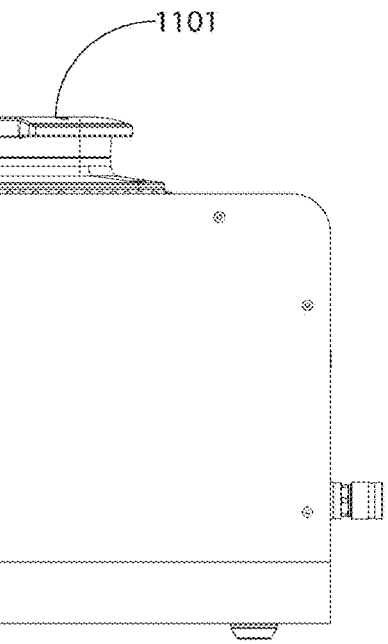
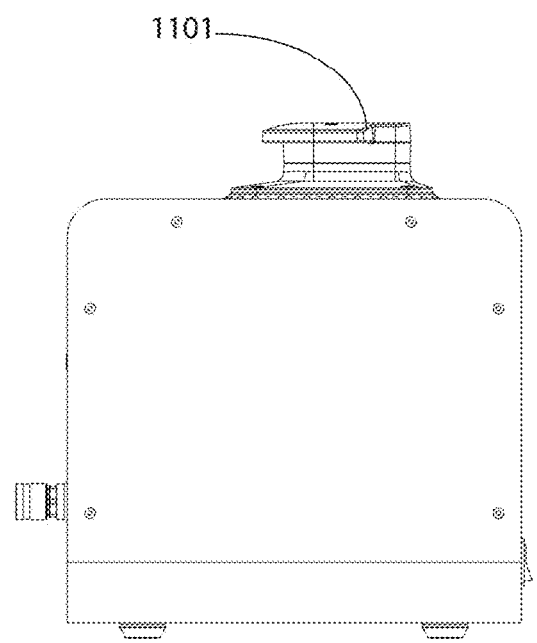
FIG. 12B
FIG. 12C

FIG. 23A
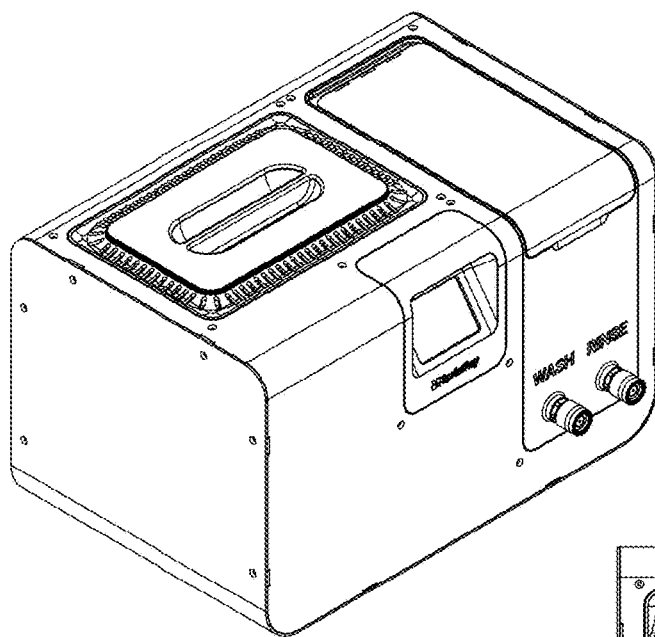
FIG. 23B
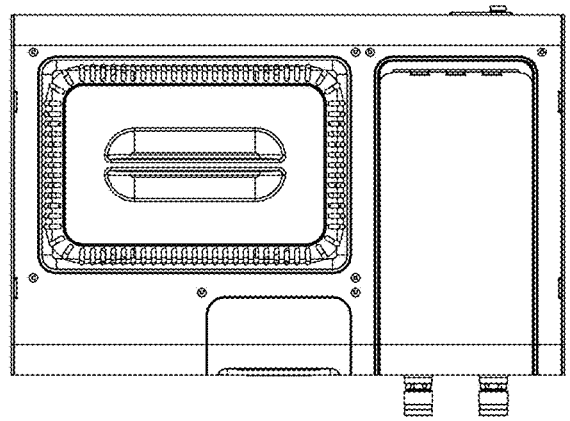
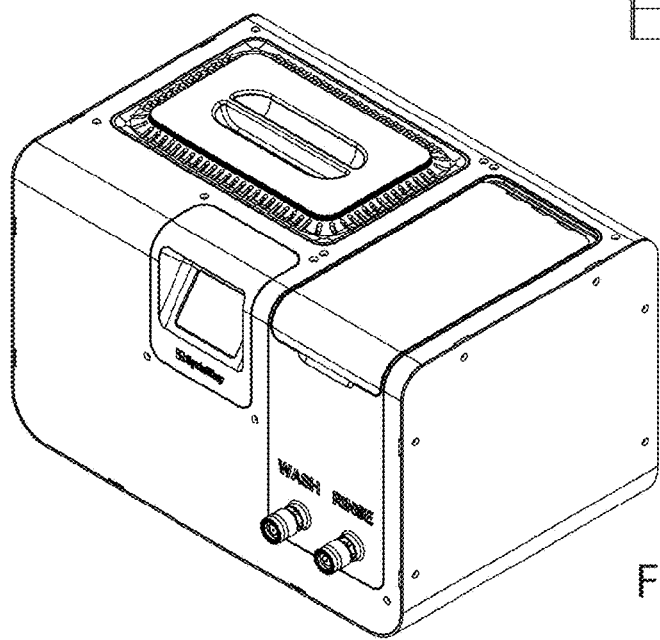
FIG. 23C

SECTION K-K

SECTION D-D

MULTI-STAGE WASH SYSTEM FOR VAT POLYMERIZATION-BASED 3D PRINTED PARTS

PRIORITY AND RELATED APPLICATIONS

This application is a continuation of U.S. Non-Provisional application Ser. No. 17/142,942, filed on Jan. 6, 2021, which claims priority to U.S. Provisional Application No. 62/957,645, filed on Jan. 6, 2020, the disclosure of which is incorporated by reference in their entirety.

TECHNICAL FIELD OF THE INVENTION

The present invention primarily relates to a system for washing off the uncured or residual resin from objects which are three-dimensionally (3D) printed. Particularly, the present invention relates to a multi-stage wash system for use in removing residual resin from objects that are 3D-printed through a vat polymerization (VP) process.

COPYRIGHT AND TRADEMARK NOTICE

A region of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Three-dimensional printing, also known as additive manufacturing (AM), rapid prototyping (RP), or solid free-form fabrication (SFF), is an advanced manufacturing process to additively create 3D objects from computer-aided design (CAD) data directly. The machine which performs the process is called a 3D printer. Compared with traditional manufacturing processes, such as milling, drilling, and injection molding, in which the object is fabricated through removing excess material from a block or changing the shape of the material, 3D printing fabricates 3D objects through selectively depositing material or energy on a single layer, and then accumulating layers one upon another to form 3D objects. Because of its unique means to create 3D objects, parts with complex shapes and intricate geometric features, which are usually not accessible through traditional manufacturing processes, could be fabricated through 3D printing. 3D printing is a collection of different techniques including vat polymerization, fused deposition modeling (FDM), selective laser sintering (SLS), etc.

Vat polymerization is one of the most popular 3D printing processes in the market nowadays. It uses a solution which is a mixture of photosensitive monomer and/or oligomer and certain photo initiator as the raw material. This photosensitive material may be a resin which is originally in the liquid state. When the resin is exposed to a light source with a certain wavelength, the photo initiator inside the resin may reach excited state to create a reactive specie, e.g., a free radical, a cation, or an anion. The reactive specie opens the π-bond of the monomer or oligomer and appends itself to the monomer or oligomer to form a new radical, cation, or anion. This process is repeated, and many more monomers and/or oligomers are successively added to the reactive species to form a polymer with a crosslinked network. In this process, the state of the resin turns from liquid into solid.

Vat polymerization process creates 3D objects by selectively solidify the resin layer by layer. Depending on the light source, there are several major types of VP processes, including stereolithography (SLA)-based VP which uses a laser as the light source, digital light processing (DLP)-based VP, and liquid crystal display (LCD)-based VP. All of these types of VP processes use liquid resin as the raw material and form 3D objects from a resin vat.

In VP processes, as 3D objects are created from the liquid resin container, and the printing part and/or the platform need to be immersed or partially immersed into the liquid resin, it is inevitable that residual resin in the liquid state stays on the surface of the 3D printed parts. Usually, a wash process is necessary to remove all the residual resin before sending the 3D printed parts for post curing, otherwise, the accuracy could be compromised. This is because the residual resin gets cured in a position during post curing, which results in an incremental change in dimensions of the object.

Furthermore, after being solidified, the hardened polymers are almost non-toxic, however, the exposure to uncured resin can be harmful, and it may contain a substance that is toxic and/or carcinogenic. Thus, it is desirable to have a wash process, through which the uncured or residual resin is completely removed from the surface of 3D printed parts, to complement the VP-based 3D printing processes.

Compared with other 3D printing technologies, VP-based 3D printing is one of the most accurate processes. Because of this, it is also one of the most popular processes in the market. With the advancement of technology and enhancement in printing speed, resolution, and reliability, VP-based 3D printing has been widely used in various fields recently, including dentistry, orthodontics, audiology, and jewelry. As a result, the necessity of some peripherals which can smoothen and facilitate the post process of VP-based 3D printing becomes more and more prominent. Similar to other commercial products, these peripherals are expected to be compact, efficient, reliable, user friendly, easy to operate, and cost effective.

Accordingly, it would be highly desirable to develop a wash system for VP-based 3D printing processes to fulfill the requirement in commercial applications and improve on the efficiency and efficacy of the conventional washing systems. It is to these ends that the present invention has been developed.

BRIEF SUMMARY OF THE INVENTION

According to the present invention, a wash system and method for removing the uncured or residual resin from the surface of objects which are created through a vat polymerization-based 3D printing process and removing residual wash solvent from the surface of the 3D printed objects, is described. The residual resin and wash solvent removal process described in the present invention includes multiple stages, and different stages serve different purposes. The multi-stage wash system for vat polymerization 3D printed parts is efficient, reliable, and easy to operate.

There are two major families of base monomers used in VP processes: 1) acrylicmethacrylic-based resin which can be crosslinked through radical polymerization; and 2) epoxy or vinyl ether-based resin which can be crosslinked through cationic polymerization. To remove the uncured or residual resin on the surface of 3D printed objects, traditionally, repetitive baths with chemicals, including acetone, isopropyl alcohol (IPA), or tripropylene glycol monomethyl ether (TPM), are used. The entire process of the bath can be broken down into the following steps:

1. Refill the wash reservoir with a predetermined volume of wash solvent;
2. Immerse the 3D printed objects with residual resin on their surface into the wash solvent;
3. Agitate the wash solvent for a certain period of time;
4. Take out the 3D printed objects from the wash reservoir; and
5. Air-dry the objects.

Depending on the result after wash at step 3, it may be necessary to give the 3D printed objects another round of wash to achieve satisfactory cleanliness. A final rinse with water may also be engaged into the entire wash process to remove the trace of the wash solvent used for baths.

In terms of the method adopted for agitating the wash solvent, there are two types of agitating methods: contact and non-contact. In contact stirring, a stirring device, such as a propeller or a magnetic bar, may be directly placed into the wash solvent, and it spins quickly to agitate the wash solvent when a rotating motor or a rotating magnetic field is employed. In non-contact stirring, nothing is in direct contact with the wash solvent. Instead, it creates turbulence in the wash solvent through an external mechanical oscillator or ultrasound oscillator.

A wash system for cleaning 3D objects printed through VP-based 3D printing processes may broadly comprise of a cartridge or receptacle that is used to store the wash solvent, a wash reservoir in which the removal of uncured resin from the surface of 3D printed objects happens, an automatic stirring device to agitate the wash solvent to wash off the uncured resin more efficiently, and an air-drying system.

According to some exemplary embodiments of the present invention, a system for removing the residual resin from the surface of objects which are created through a vat polymerization-based 3D printing process and removing residual wash solvent from the surface of objects, may comprise: a wash solvent reservoir or receptacle; a wash reservoir in fluid communication with the wash solvent receptacle; and a controller configured to pump a wash solvent from the wash solvent receptacle to the wash reservoir for washing off residual resin from objects that are 3D printed through a VP process.

According to some exemplary embodiments of the present invention, a system for washing 3D printed objects may include a resin concentration monitoring module.

According to some exemplary embodiments of the present invention, a system for washing 3D printed objects may include a wash reservoir with an anti-splashing adapter for a build platform to prevent wash solvent from splashing or spilling from the wash reservoir.

According to some exemplary embodiments of the present invention, a system for washing 3D printed objects may include multiple pumps to refill or drain the wash reservoir, including automatic valves to direct and control the flow of the wash solvent, and or check valves to prevent an unwanted reverse flow of the wash solvent.

According to some exemplary embodiments of the present invention, a system for washing 3D printed objects may include an observation window through which the user can observe the whole process.

According to some exemplary embodiments of the present invention, a system for washing 3D printed objects may include a wash reservoir with one inlet and one outlet which are used to refill and drain the wash reservoir, respectively. The inlet and outlet may include barbs to securely fasten the tubing and prevent leakage. The wash reservoir may also include a mesh which is expected to prevent printed 3D printed objects or parts thereof from directly hitting a rotatory component during a wash or air-drying process. The material of the mesh may be preferably compatible with both the wash solvent and the resin. The bottom of the wash reservoir may be slightly slanted and coated with a thin layer of hydrophobic and/or oleophobic coating, e.g., Teflon, to help drain the wash reservoir completely.

According to some exemplary embodiments of the present invention, a system for washing 3D printed objects may include an adapter for the wash reservoir on which the build platform from a specific VP-based 3D printer can directly sit. The adapter may include an anti-splashing design, so the agitated wash solvent cannot come out of the wash reservoir during the wash process, however, it allows the necessary circulation of the air flow during the air-drying process.

According to some exemplary embodiments of the present invention, a system for washing 3D printed objects may include a resin concentration monitoring module for measuring the resin concentration of the wash solvent in real time. The resin concentration monitoring module gives feedback to the entire wash system based on which the wash system can determine whether the wash solvent is suitable for wash or needs to be replaced. After each wash, the uncured resin goes into the wash solvent, and thus, the resin concentration in the wash solvent increases. The wash solvent used in the present invention is preferably configured for multiple uses and may be repeatedly used until the resin concentration reaches a certain level beyond which the wash process is not efficient anymore. Accordingly, in some exemplary embodiments, a user may be required to replace the wash solvent. This may be achieved in various manners depending on the specifications of the resin concentration monitoring module. For example, and without limiting the scope of the present invention, the following are exemplary embodiments of a resin concentration monitoring module in accordance with the present invention:

Detecting Change in Density:

For a commonly used wash solvent, such as acetone, IPA, or TPM, its density is usually smaller than that of the resin. To be more specific, the density for acetone is $0.788 \times 10^3$ $kg/m^3$, the density for IPA is $0.785 \times 10^3$ $kg/m^3$, and the density for TPM is $0.975 \times 10^3$ $kg/m^3$. Compared with the density of the aforementioned solvents, the density for photosensitive resin is usually greater than $1.1 \times 10^3$ $kg/m^3$. When more photosensitive resin is dissolved into the wash solvent, the density of the wash solvent also increases. Based on the change of the wash solvent density, a density-based sensor, e.g., hydrometer, can be used to monitor the resin concentration in the wash solvent.

Detecting Change in Pressure:

Besides directly using density change to indicate the resin concentration of the wash solvent, the pressure change at a certain location can also be used for this purpose. The pressure (P) in a static liquid is proportional to both the liquid density ($\rho$) and the depth (h) in the liquid which can be represented as $P=\rho gh$, where g is the gravitational constant. Therefore, the pressure change at a certain depth in the wash solvent can reflect the wash solvent density change, and further indicate the concentration change of the wash solvent.

Detecting Change in Opacity:

Another method to monitor the concentration change of the wash solvent is to evaluate the opacity of the wash solvent. For commonly used wash solvent, such as acetone, IPA, or TPM, it usually has a high transparency. With the increasing of the resin concentration, the transparency decreases. This change can be detected by a photosensitive sensor, such as a photoresistor. For a given light source, the resistance of a photoresistor increases with decreasing incident light intensity which is caused by increasing media opacity between the light source and the photoresistor. Therefore, the opacity can be used to indicate the resin concentration in the wash solvent.

According to some exemplary embodiments of the present invention, a system for washing 3D printed objects may include a predetermined volume of wash solvent. The wash solvent may be added into the wash reservoir through an auto refilling system which includes a pump, valves and tubing. Before the wash process starts, the pump may transport the wash solvent from the wash solvent reservoir to the washing reservoir until the predetermined volume is achieved. A liquid level measuring module can be used to check the volume of the wash solvent and determine whether to stop feeding the wash reservoir.

In some exemplary embodiments, the aforementioned photosensitive sensor can also serve to monitor whether the predetermined volume is achieved. The photosensitive senor may be mounted at a certain height on the wash reservoir which reflects the predetermined volume. Before the wash solvent reaching that height, the gap between the photosensitive sensor and the light source is filled with air. Once the liquid level achieves that height, the same gap is filled with the wash solvent whose transparency is usually lower than that of the air. This change in transparency can be monitored by a photosensitive sensor, such as a photoresistor. Once the drop in the transparency is observed, the auto refilling system stops feeding the wash reservoir. Therefore, the volume in the wash reservoir is the predetermined amount.

According to some exemplary embodiments of the present invention, a system for washing 3D printed objects may be configured for removing residual wash solvent from the surface of objects after the wash process. The residual wash solvent removal process introduced by the present invention may include an air-drying system. The air-drying system may be compact, reliable and easy to operate.

According to some exemplary embodiments of the present invention, a system for washing 3D printed objects may include solvent cartridges that are removable and replaceable to store the wash solvent. The cartridges may be compact and interchangeable.

According to some exemplary embodiments of the present invention, a system for washing 3D printed objects may be configured to perform a multi-stage residual resin removal process, e.g., two stages: preliminary wash and fine wash. The majority of the residual resin, i.e., 85%, 90%, or 95%, may be removed during the preliminary wash, and the remaining liquid resin on the 3D printed objects, i.e., 15%, 10%, or 5%, may be washed off during the fine wash. In some embodiments, the wash solvent for each wash stage comes from an exclusive or separate wash solvent cartridge or solvent compartment in a solvent receptacle.

According to some exemplary embodiments of the present invention, a system for washing 3D printed objects may be configured to perform a multi-style residual resin removal process, i.e., rinsing, splashing, and jetting. Different wash styles may stem from the wash solvent level and the liquid flow rate. In a rinsing style, the 3D printed objects may be fully immersed into the wash solvent, and the wash solvent may be agitated gently. In this case, the residual resin may be removed mainly by dissolving into the wash solvent. In a splashing style, an agitator may be immersed into the wash solvent, and the wash solvent may be agitated with a medium speed. In this case, the residual resin may be removed by both dissolving into the wash solvent and washing off by the solvent flow. In a jetting style, the liquid level may be lower than the agitator, and the wash solvent may be agitated with a high speed. In this case, the residual resin may be removed mainly by washing off by the high-speed solvent flow. Generally, jetting is more effective than splashing, and splashing is more effective than rinsing. However, higher agitating rates may cause more solvent loss for each wash. Therefore, the material property and resin concentration in the wash solvent may need to be taken into consideration when selecting the wash style for each stage.

According to some exemplary embodiments of the present invention, a system for washing 3D printed objects may be configured to adaptively change the duration for each wash stage based on the resin type, the residual resin amount, the resin concentration in the wash solvent, and the wash style.

According to some exemplary embodiments of the present invention, a method for washing off residual resin from objects that are 3D-printed through a vat polymerization process, and removing residual wash solvent from the surface of the 3D printed objects, may include pumping a first solution of a plurality of solvent solutions from a solvent receptacle to a wash reservoir of the system, wherein the wash reservoir is adapted to enclose a 3D-printed object, by activating a pump of solvent disperser adapted to facilitate a flow of the plurality of solvent solutions between the wash reservoir and the solvent receptacle; dispersing the first solutions onto the 3D-printed object by activating an agitator of the solvent disperser adapted to disperse the plurality of solvent solutions onto the 3D-printed object; pumping the first solution from the wash reservoir to the solvent receptacle in order to substantially remove the first solution from the wash reservoir; pumping a second solution of the plurality of solvent solutions from the solvent receptacle to the wash reservoir; and dispersing the second solution onto the 3D-printed object.

According to some exemplary embodiments of the present invention, a method in accordance with the present invention may include activating an agitator to create an airflow and dry the 3D-printed object.

According to some exemplary embodiments of the present invention, a method in accordance with the present invention may include filling up the wash reservoir with a solution so that the 3D-printed object inside the wash reservoir is fully submerged in the solvent during a rinsing cycle.

According to some exemplary embodiments of the present invention, a method in accordance with the present invention may include filling up the wash reservoir with a solution so that a propeller of the agitator is fully submerged in the solvent during a splashing cycle.

According to some exemplary embodiments of the present invention, a method in accordance with the present invention may include filling up the wash reservoir with a solution so that a solvent level inside the wash reservoir is lower than a portion of a propeller of the agitator during a jetting cycle.

According to some exemplary embodiments of the present invention, a method in accordance with the present invention may include monitoring a resin concentration inside the solvent receptacle using one or more sensors including an optical sensor, a density sensor, or a pressure sensor.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

FIG. 12A-FIG. 12C depict a front view and side views, respectively, of the exemplary embodiment illustrated in FIG. 11A-FIG. 11B.

FIG. 23A-FIG. 23C depict a first perspective side view, a top view, and a second perspective side view, respectively, of an exemplary embodiment of the present invention that employs a cage for enclosing 3D printed objects therein.

DESCRIPTION OF THE INVENTION

Figure 1A:
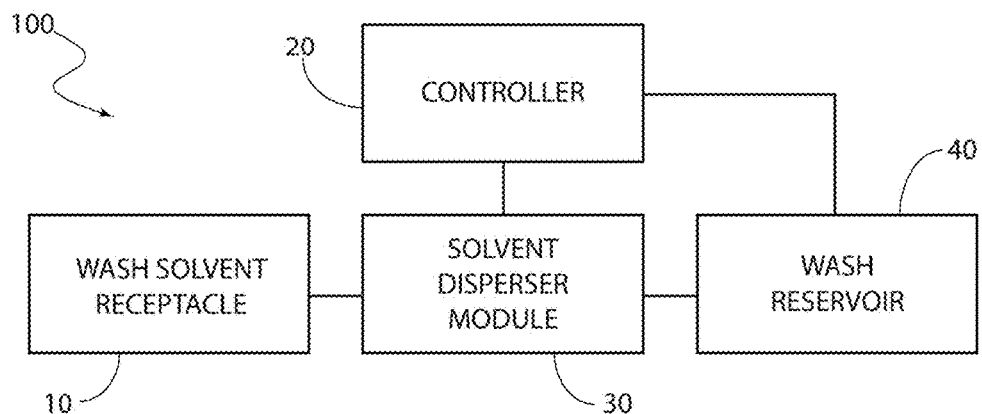
FIG. 1A is a block diagram of an exemplary system for removing the uncured residual resin from the surface of objects which are created through a vat polymerization-based 3D printing process, in accordance with the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps.

For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1A is a block diagram of an exemplary system for removing the uncured residual resin from the surface of objects which are created through a vat polymerization-based 3D printing process, in accordance with the present invention. More specifically, FIG. 1A depicts system 100, comprising a wash solvent storage or receptacle 10, a controller 20, and a solvent disperser module 30, which may include one or more of a pump, valve(s), and tubing or conduits configures to supply the wash reservoir with a wash solvent stored in the wash receptacle, and a wash reservoir 40 in which 3D printed objects may be washed. The wash solvent receptacle 10 stores wash solvent for removing the residual resin from the 3D objects which are 3D printed through a VP-based process. The wash solvent could be acetone, IPA, TPM or water (for water-washable resin). The controller 20 controls the entire wash and air-drying process, including refill and drain the wash reservoir 40, switch on and off the agitator for wash and air-drying, etc. The pump, valve, and tubing system of solvent disperser module 30 provides the necessary power and passage to direct and transport the required wash solvent for a specific wash stage from the wash solvent receptacle 10 to the wash reservoir 40, or in the opposite direction, i.e., from the wash reservoir 40 to the wash solvent receptacle 10. The wash reservoir 40 receives the wash solvent from the wash solvent receptacle 10 and provides a space where wash and air-drying processes take place.

Figure 1B:
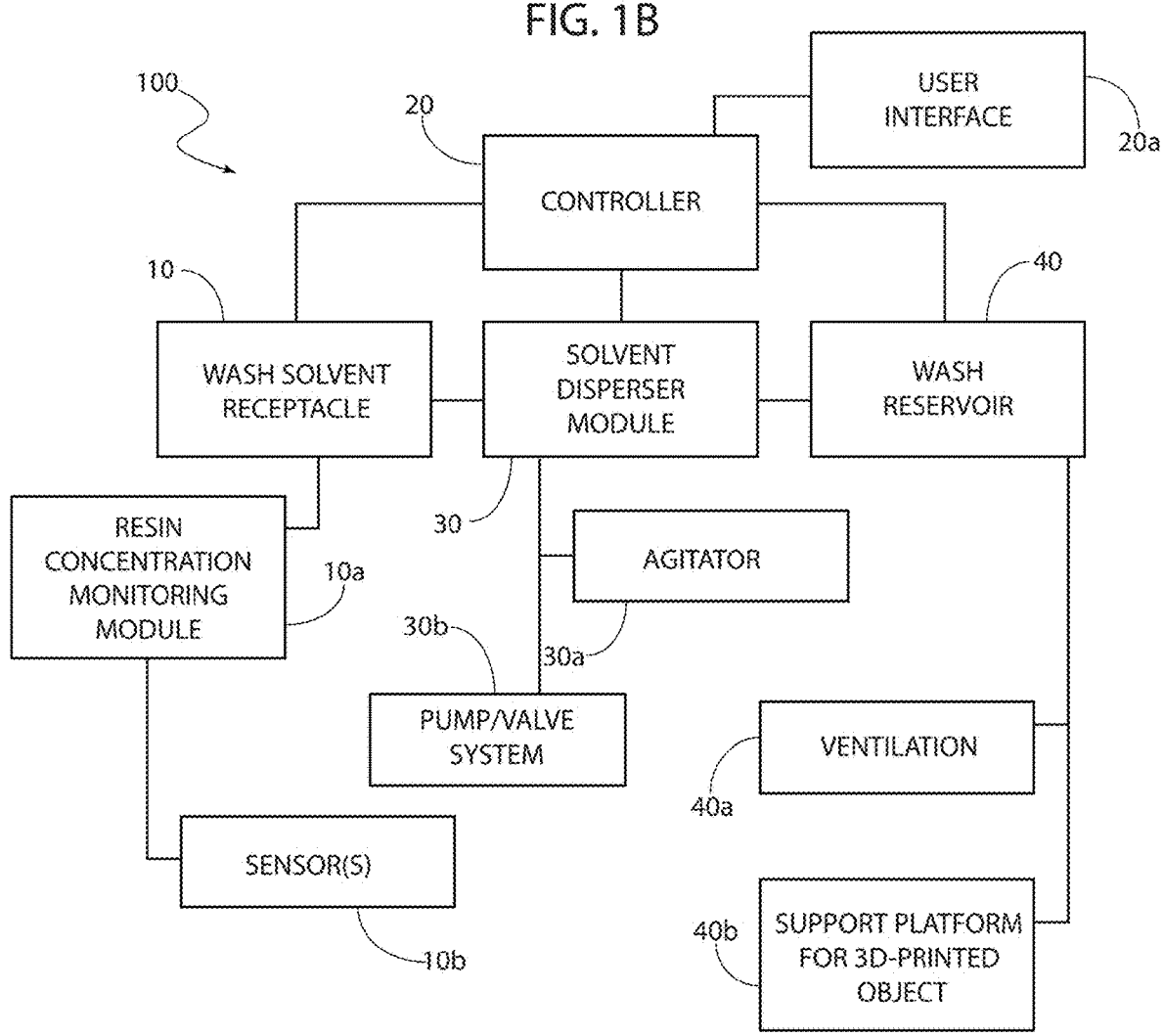
FIG. 1B is a block diagram of another exemplary system for removing the uncured residual resin from the surface of objects which are created through a vat polymerization-based 3D printing process, in accordance with the present invention.

FIG. 1B is a block diagram depicting some exemplary components of system 100 in accordance with the present invention. More specifically, FIG. 1B depicts system 100 exemplarily, and without limiting the scope of the present invention, including a resin concentration monitoring module 10a, a user interface 20a, an agitator 30a, a pump/valve system 30b, a ventilation or airflow system 40a, and a support platform 40b.

In some exemplary embodiments, which will be discussed in more detail below, a resin concentration monitoring module 10a may include one or more sensors 10b for detecting a resin concentration within wash solvent receptacle 10. This allows system 100 to detect when the solvent may need replenishment or changing. As will be discussed below, several types of sensors may be utilized without deviating from the scope of the present invention, including optical sensors, density sensors, pressure sensors, or any other type of sensor that may be suitable for detecting a resin concentration in order to monitor that the solvent being used is adequate for washing off the undecided residue from 3D printed objects.

In some exemplary embodiments, which will be discussed in more detail below, the controller 20 may include a user interface 20a for a user to program, execute, or otherwise control features of system 100. User interface 20a may be as simple as a few buttons or more complex such as a display with a touch screen. Several embodiments of a user interface in accordance with the present invention will be discussed with more detail below.

In some exemplary embodiments, which will be discussed in more detail below, the solvent disperser module may include various components, including an agitator that may be adapted for dispersing the solvent in one or multiple manners so as to maximize the washing process. For example, and without limiting the scope of the present invention, system 100 may include an agitator 30a that is configured to disperse solvent in a jetting manner, a splattering manner, and in an immersive manner. In some exemplary embodiments, the agitator may comprise of a propeller. Each means of dispersing a solvent onto a 3D printed object will be discussed with more detail below.

In some exemplary embodiments, which will be discussed in more detail below, the wash reservoir may include various components, including a ventilation or airflow system 40a for improving or facilitating an airflow within the wash reservoir. Such airflow system may facilitate a drying cycle or drying sequence activated by controller 20 to dry off the 3D printed object after one or more wash cycles.

In some exemplary embodiments, which will be discussed in more detail below, the wash reservoir may include a support platform 40b for supporting a 3D printed object being washed therein. In some exemplary embodiments, support platform 40b may include an adapter for securing a 3D printer platform, or other 3D printer component directly onto the adapter (see FIG. 2, FIG. 11A-FIG. 13). In some exemplary embodiments, support platform 40b may include a cage (see FIG. 24A-FIG. 28, for example) for enclosing the 3D printed object and preventing debris from the residue that comes off the 3D printed object from interfering with components of system 100.

Figure 2:
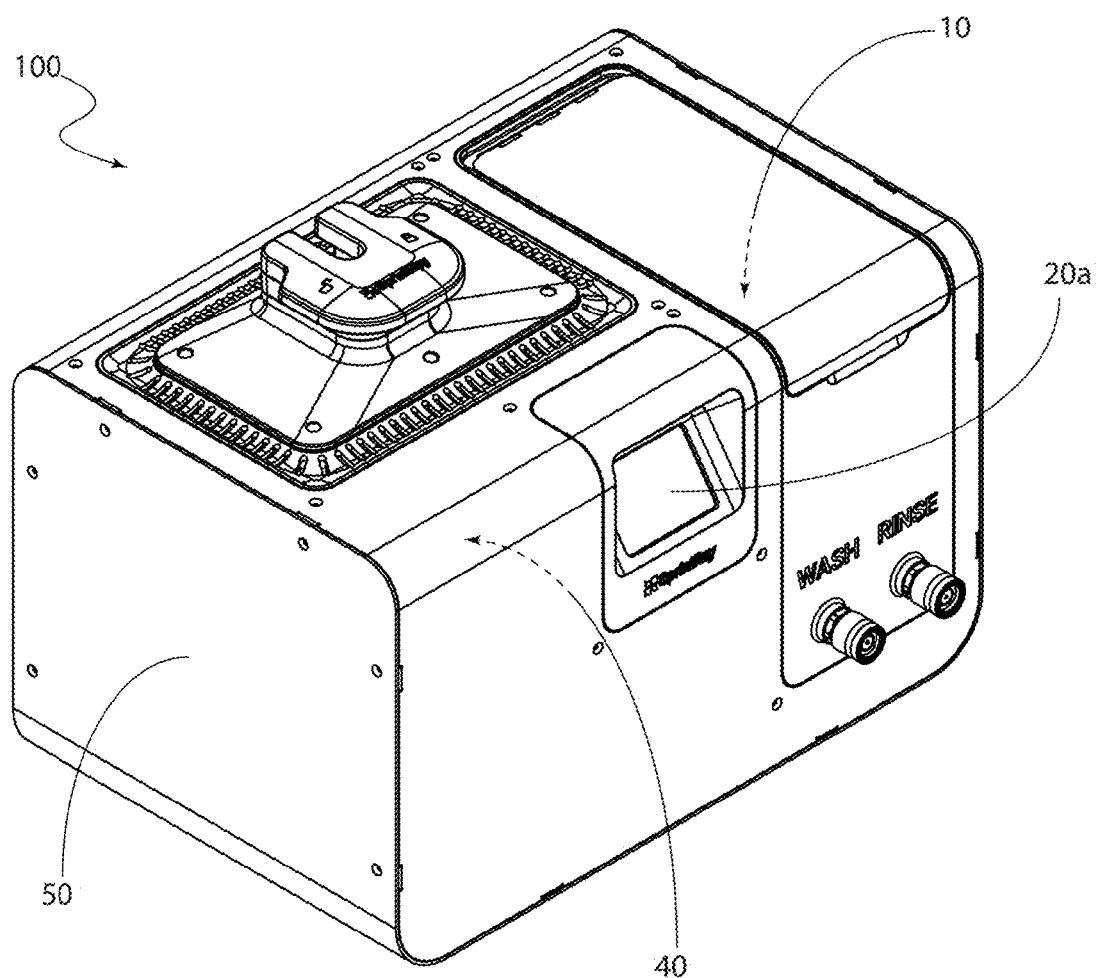
FIG. 2 is a perspective view of a multi-stage wash system for VP-based 3D printed parts according to an embodiment of the present invention.

FIG. 2 depicts a perspective view of a two-stage wash apparatus for removing the uncured residual resin from the surface of 3D objects which are created through a vat polymerization-based 3D printing process according to an embodiment of the present invention. More specifically, FIG. 2 depicts one embodiment of system 100, which includes an enclosure 50 that houses each of the components of system 100 to provide an easy-to-use appliance to the user. Enclosure 50 may be a single enclosure with multiple cavities therein, and or may be configured to hold one or more receptacles or containers therein. For example, and without limiting the scope of the present invention, enclosure 50 may include a first cavity for housing wash reservoir 40, which may be situated within a larger area or cavity of the enclosure 50. Enclosure 50 may include a second cavity for housing wash solvent receptacle 10, which may be situated within a smaller area or cavity of the enclosure 50. Disposed on or accessible via an outer surface of enclosure 50, may be user interface 20a, which allows a user to interact with system 100. Controller 20 and solvent disperser module 30 may be housed within the one or more cavities of enclosure 50 along with any other components of system 100. Enclosure 50 may be configured to receive components of system 100 therein, such as for example, cartridges that may form part or facilitate use of solvent receptacle 10, in accordance with some exemplary embodiments of the present invention, as will be discussed with reference to FIG. 3 and FIG. 4 below.

Figure 3:
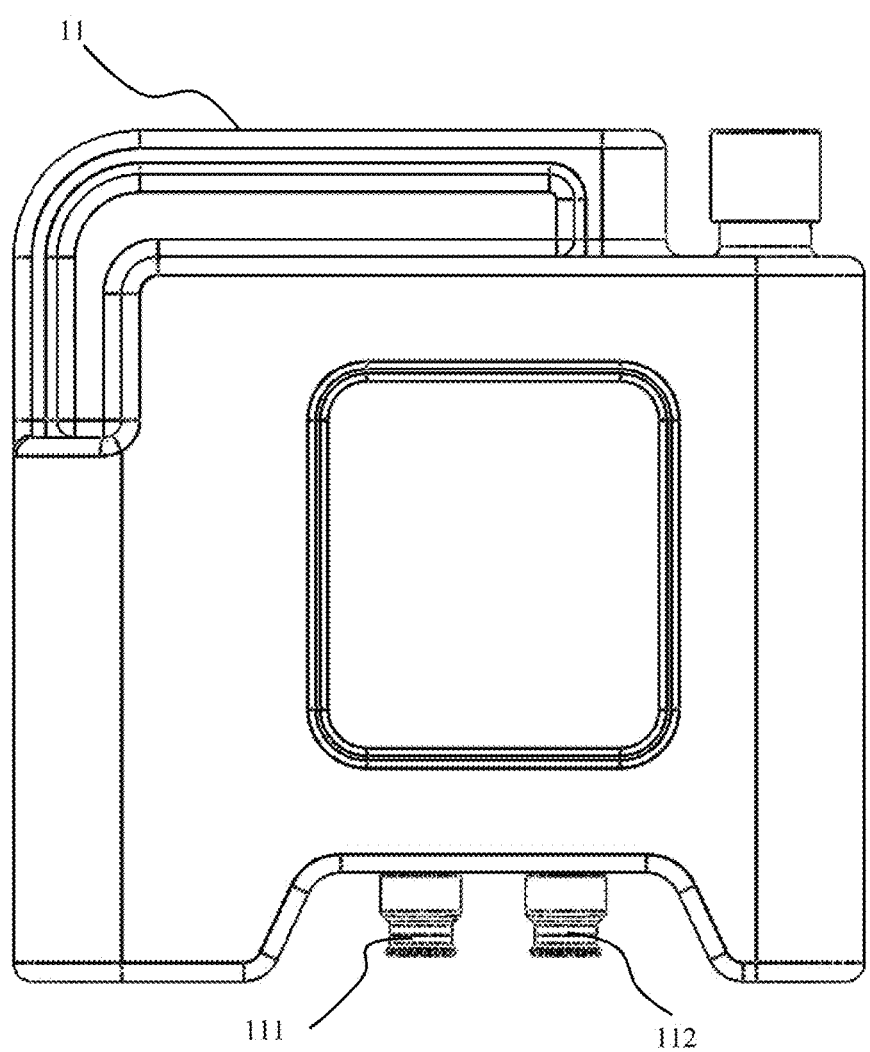
FIG. 3 is a front view of wash solvent cartridge according to an embodiment of the present invention.
Figure 4:
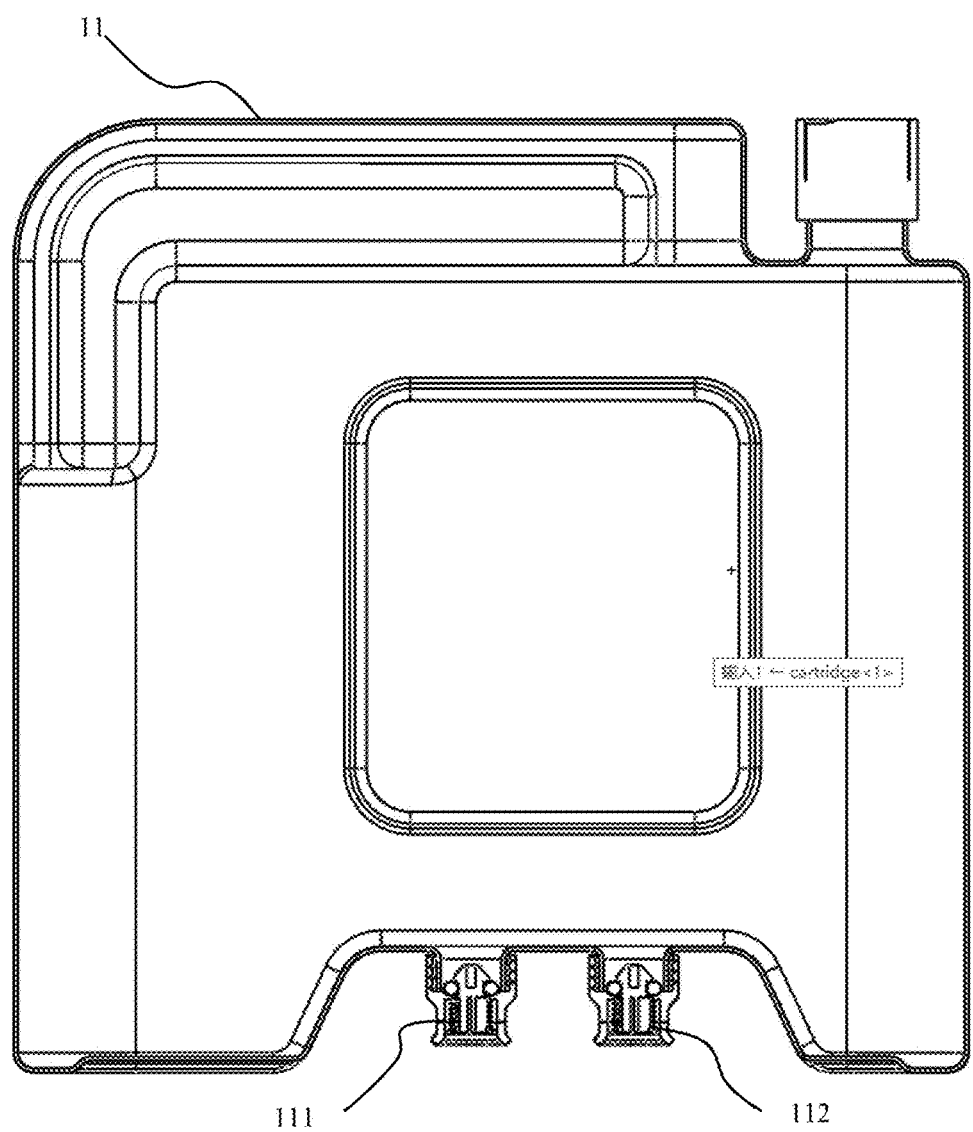
FIG. 4 is a front cross-sectional view of a wash solvent cartridge according to an embodiment of the present invention.
Figure 5:
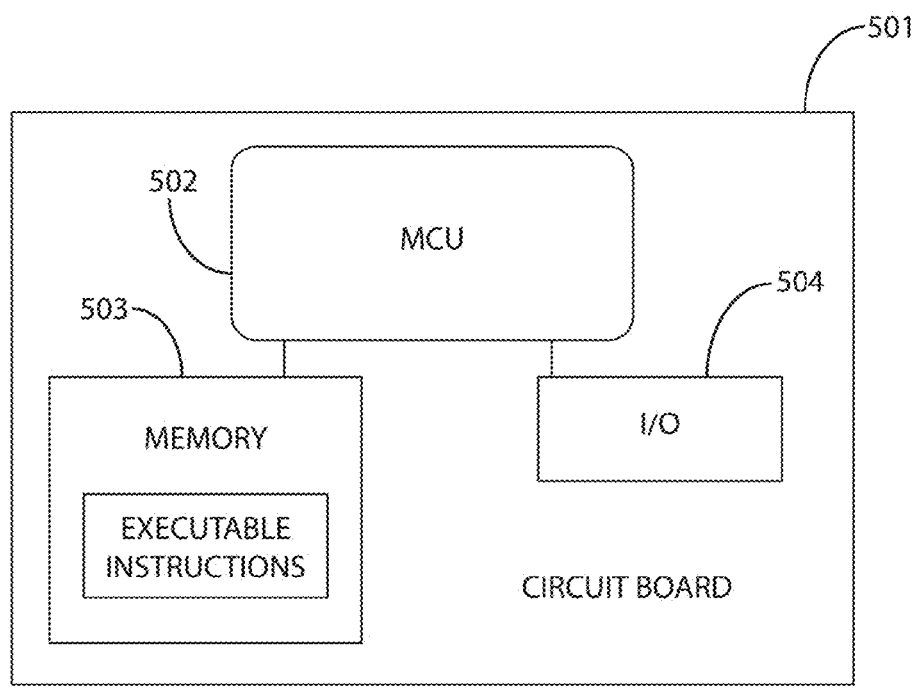
FIG. 5 is a block diagram of a controller according to an embodiment of the present invention.

Turning now to the next set of figures, FIG. 3 is a front view of wash solvent cartridge according to an embodiment of the present invention; FIG. 4 is a front cross-sectional view of a wash solvent cartridge according to an embodiment of the present invention; FIG. 5 is a block diagram of a controller according to an embodiment of the present invention; and FIG. 6 is a schematic diagram for an exemplary pump, valve, and tubing system according to an embodiment of the present invention.

Figure 6:
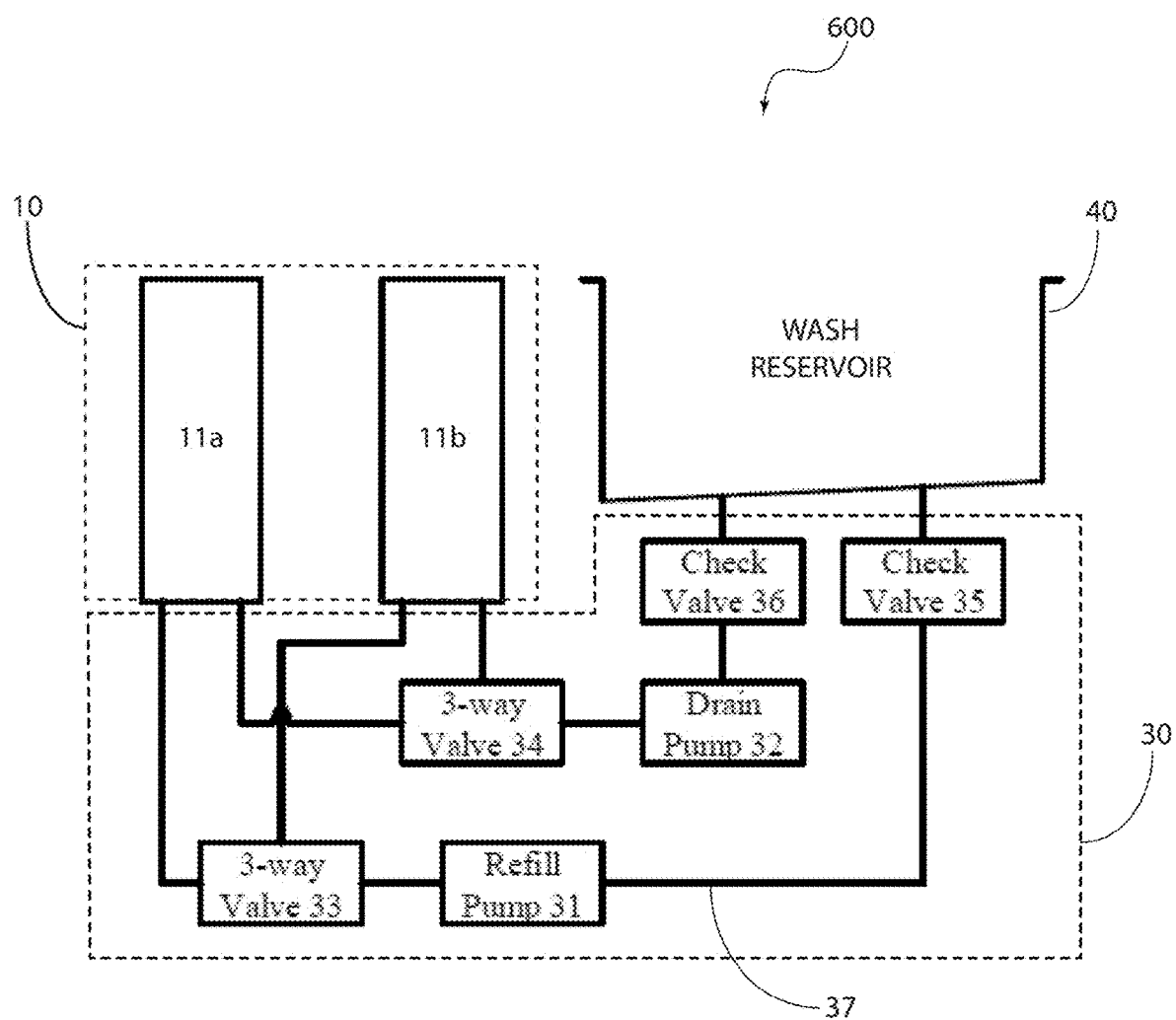
FIG. 6 is a schematic diagram for an exemplary pump, valve, and tubing system according to an embodiment of the present invention.

According to some exemplary embodiments, as depicted in FIG. 6, the wash solvent receptacle 10 may include two repositories for storing two solvent solutions. In one exemplary embodiment, as shown and in accordance with the cartridges illustrated in FIG. 3 and FIG. 4, the two repositories may comprise cartridges, i.e., a wash solvent cartridge for the preliminary wash 11a and wash solvent cartridge for the fine wash 11b. Referring to FIG. 3-4, each cartridge may include two bite valves, i.e., 111 for the inlet and 112 for the outlet, which are located on the underside of the wash solvent cartridge 11, i.e., the bite valves 111a and 112a for the cartridge 11a, the bite valve 111b and 112b for the cartridge 11b. When the cartridge 11 is installed in position, the bite valve 111 and 112 are squeezed to allow the wash solvent to flow into the tubing connected to the cartridge 11. Once the cartridge 11 is removed from the wash system, the bite valve 111 and 112 return to its original state and shuts off the flow.

The wash solvent cartridge 11 is made from material which is compatible with both resin and wash solvent, such as poly(methyl methacrylate) (PMMA).

Referring to FIG. 3-FIG. 4, each cartridge may also include an ID chip which is located next to the bite valve 111. The ID chip may be used to save and update the information related to the wash solvent it contains, such as the type of the wash solvent and the current resin concentration of the solvent. When the cartridge 11 is installed in position, the controller 20 reads the information from the ID chip. Based on this information, the wash system can determine the style and time for each wash stage.

Referring to FIG. 5, the controller 20 may include a circuit board 501, which integrates electronic components comprising a micro control unit (MCU 502), memory 503, and I/O ports 504. Necessary program and data are installed in the memory for MCU 502 to operate. In exemplary embodiments, memory 503 incudes a set of executable instructions for operating the system 100.

Referring to FIG. 2, in accordance with some exemplary embodiments, the controller 20 may also include a touch screen (user interface 20a), which may be electrically connected with the circuit board of FIG. 5 as human-machine interface. Its major functions include, but are not limited to:

a. receiving commands from the user, such as start a programmed wash cycle, start a customized wash cycle, set the customized time for each wash stage, drain the wash bucket 41, cancel the job, etc;

b. showing the status of the wash system, e.g., busy or idle;

c. showing the progress regarding to current job, e.g., stage 1 wash, stage 2 wash, or air-drying;

d. showing the relevant information regarding to current job, e.g., estimated time consumption, estimated time left, resin concentration for wash solvent cartridge 11a, resin concentration for wash solvent cartridge 11b, etc.; and or e. showing system relevant information, such as machine model number, machine serial number, etc.

The concept of multi-stage wash is implemented by a pump, valve, and tubing system that form part of the disperser module 30 which fluidly communicates the wash solvent receptacle 10 with the wash reservoir 40. Referring to FIG. 6, in one exemplary embodiment, such as system 600, a two-stage wash system may employ the pump, valve, and tubing system of the disperser module 30, including a refill pump 31, a drain pump 32, an "L" type automatic three-way valve 33 for the refill pump 31, an "L" type automatic three-way valve 34 for the drain pump 32, a check valve 35 connected with the wash solvent inlet 44 of wash reservoir 40 (see also FIG. 8), a check valve 36 connected with the wash solvent outlet 45 of wash reservoir 40 (see also FIG. 8), and tubing 37 that forms part of the pump, valve, and tubing system of the disperser module 30.

Figure 18:
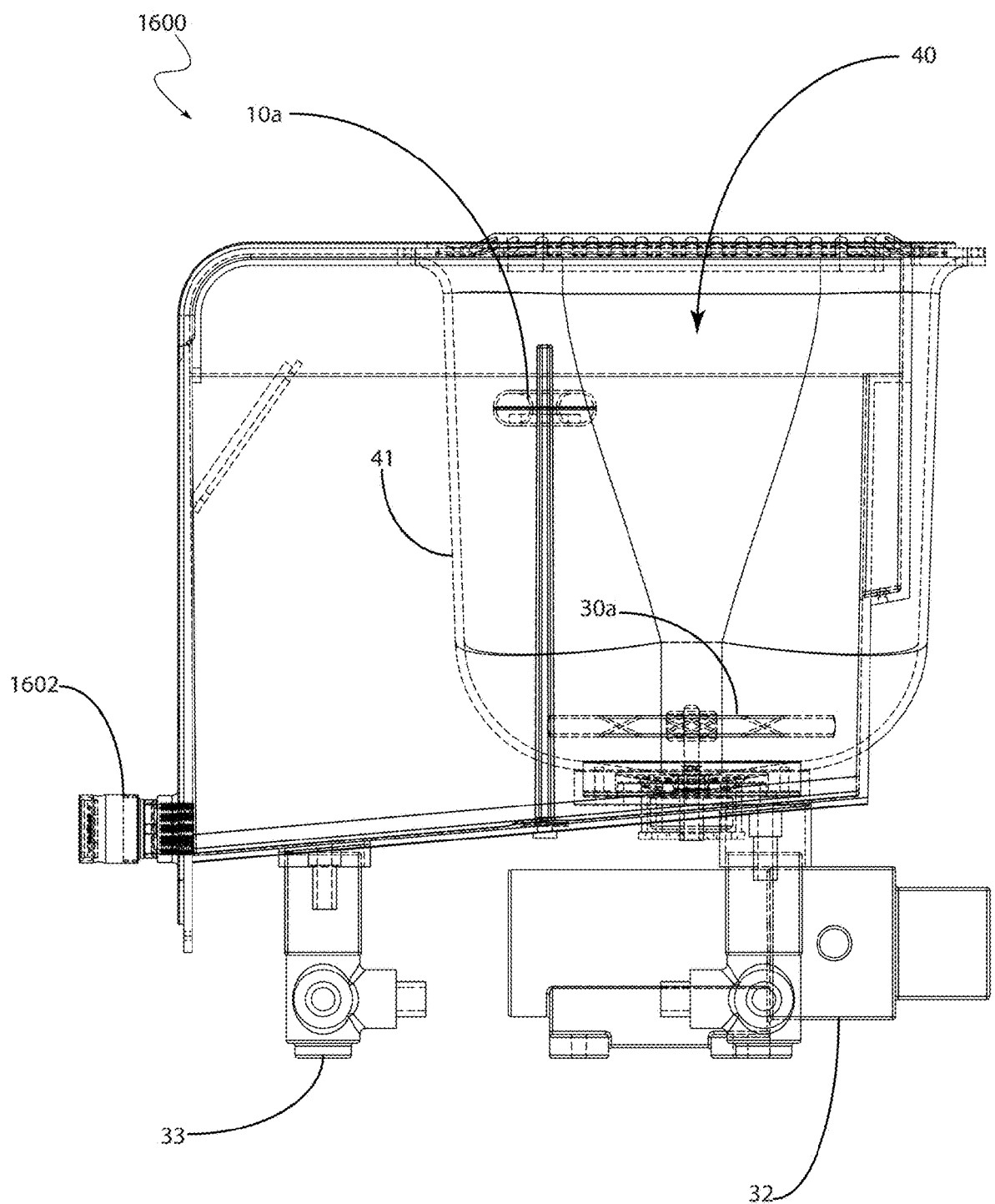
Figure 19:
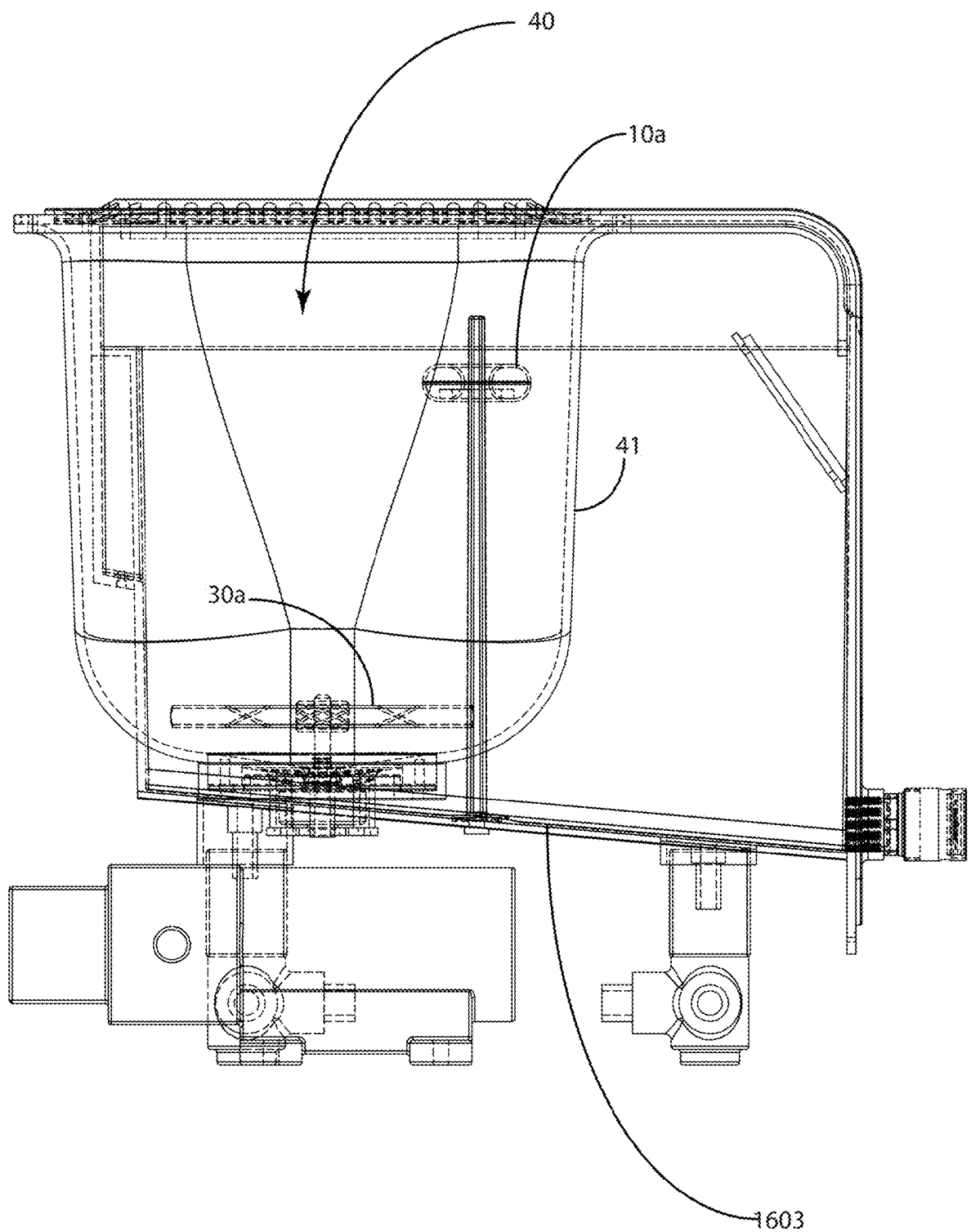
Figure 20:
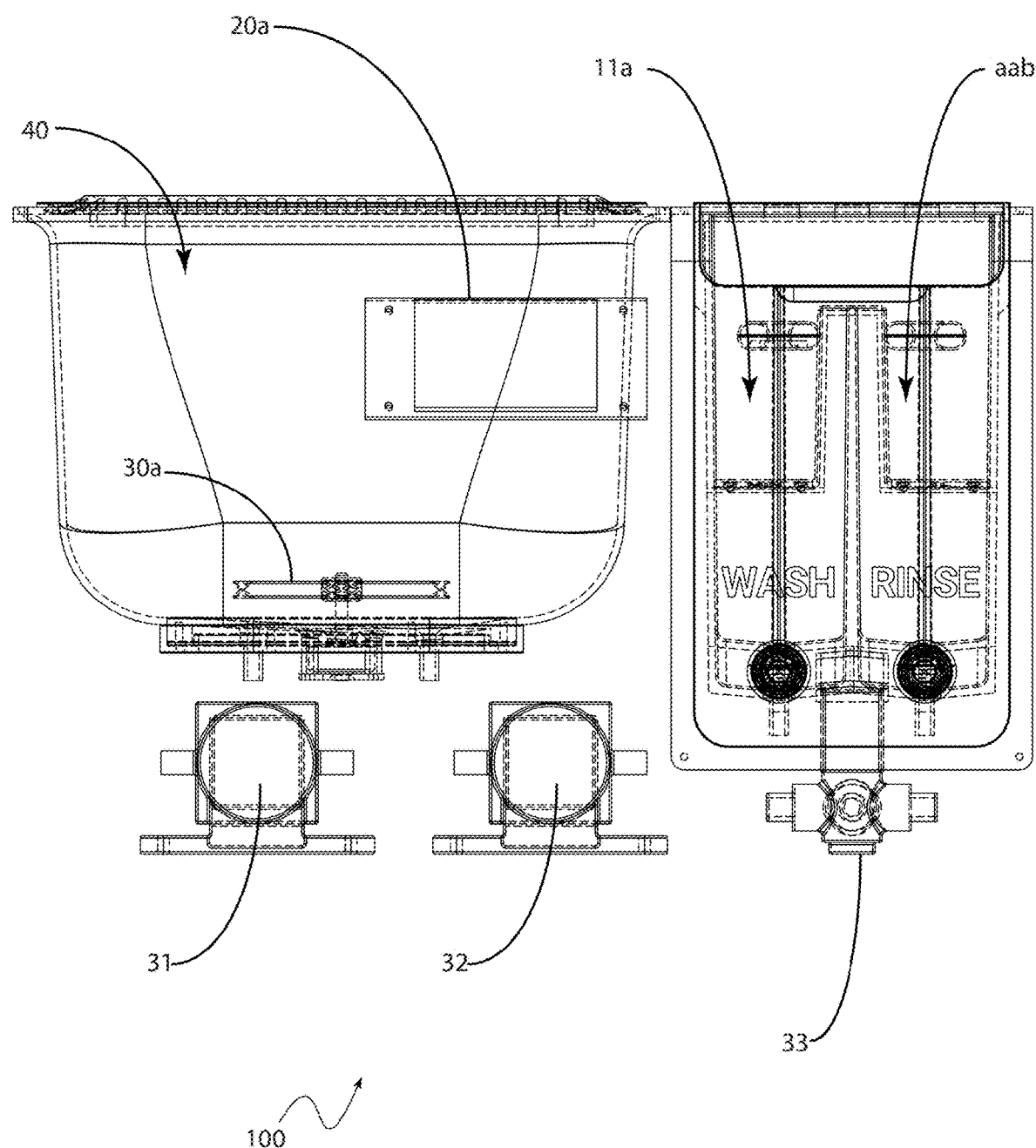
Figure 21:
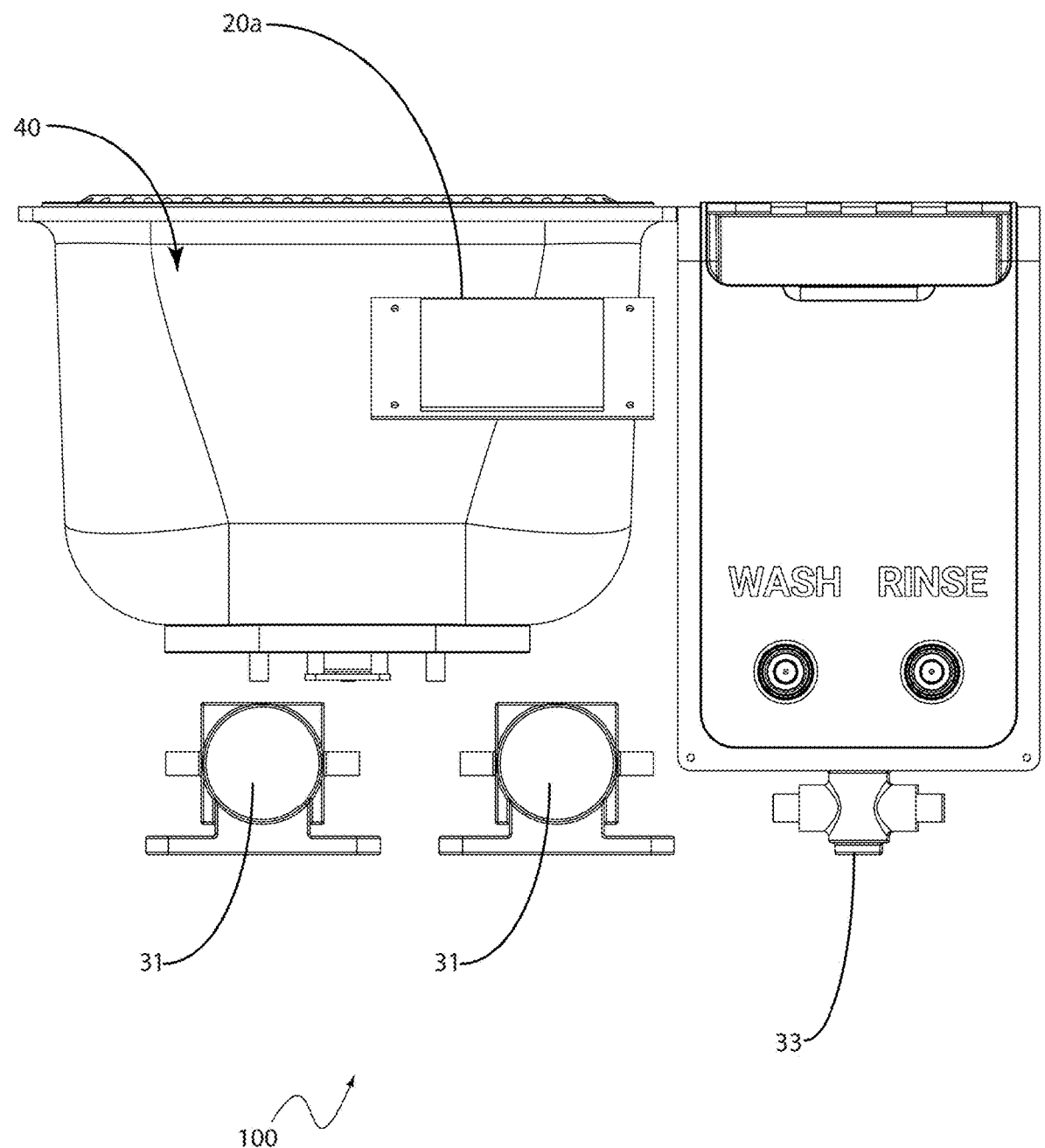

In some exemplary embodiments, a wash and air-drying process may be broken down into the following steps:

Step 1: The "L" type three-way valve 33 switches the direction to allow the wash solvent to flow from the cartridge or tank 11a of receptacle 10 to the refill pump 31;

Step 2: The refill pump 31 pumps a predetermined volume of wash solvent from the cartridge or tank 11a of receptacle 10 to the wash reservoir 40;

Step 3: The agitator 30a runs for a specific time for a preliminary wash (i.e., although the agitator is not shown in the diagram of FIG. 6, see other figures for reference such as FIG. 13 and FIG. 18, in which an agitator is shown housed within the wash reservoir);

Step 4: The "L" type three-way valve 34 switches the direction to allow the wash solvent to flow from the drain pump 32 to the cartridge or tank 11a of receptacle 10;

Step 5: The drain pump 32 pumps the wash solvent from the wash reservoir 40 back to the cartridge or tank 11a of receptacle 10;

Step 6: The "L" type three-way valve 33 switches the direction to allow the wash solvent to flow from the cartridge or tank 11b of receptacle 10 to the refill pump 31;

Step 7: The refill pump 31 pumps a predetermined volume of wash solvent from the cartridge or tank 11b of receptacle 10 to the wash reservoir 40;

Step 8: The agitator 30a runs for a specific time for fine wash;

Step 9: The "L" type three-way valve 34 switches the direction to allow the wash solvent to flow from the drain pump 32 to the cartridge or tank 11b of receptacle 10;

Step 10: The drain pump 32 pumps the wash solvent from the wash reservoir 40 back to the cartridge or tank 11b of receptacle 10 so that wash reservoir is substantially empty and all or substantially all of the solvent has been removed; and Step 11: The agitator 30a runs for a specific time for air-drying.

Accordingly, in exemplary embodiments, a method performed by system 100 for washing off residual resin from objects that are 3D-printed through a vat polymerization process, may include: pumping a first solution (stored in cartridge or tank 11a) of a plurality of solvent solutions from a solvent receptacle 10 to a wash reservoir 40 of system 100, wherein the wash reservoir 40 is adapted to enclose a 3D-printed object, by activating a pump of solvent disperser module 30 adapted to facilitate a flow of the plurality of solvent solutions between the wash reservoir 40 and the solvent receptacle 10; dispersing the first solutions onto the 3D-printed object by activating an agitator 30a of the solvent disperser module 30 adapted to disperse the plurality of solvent solutions onto the 3D-printed object; pumping the first solution from the wash reservoir 40 to the solvent receptacle 10 (i.e. a cartridge or tank 11a) in order to substantially remove the first solution from the wash reservoir 40; pumping a second solution (stored in cartridge or tank 11b) of the plurality of solvent solutions from the solvent receptacle 10 to the wash reservoir 40; and dispersing the second solution onto the 3D-printed object.

In some exemplary embodiments, the method performed by system 100 described above may further include: pumping the second solution from the wash reservoir 40 back to the solvent receptacle 10 (i.e., back into cartridge or tank 11b) in order to substantially remove the second solution from the wash reservoir 40. In some exemplary embodiments, the method performed by system 100 described above may further include activating the agitator 30a of the solvent disperser module 30 to create an airflow and dry the 3D-printed object. In this manner, system, 100 may be configured to perform an air-drying cycle.

See also FIG. 16-FIG. 20, which depict each of the components mentioned above with reference to some exemplary embodiments of the present invention. In exemplary embodiments, the majority of the residual resin on the 3D printed object, i.e., 85%, 90%, or 95%, is expected to be removed during the preliminary wash, and the remaining liquid resin on the 3D printed objects, i.e., 15%, 10%, or 5%, is expected to be washed off during the fine wash. The wash solvent for each wash stage may be stored in an exclusive wash solvent cartridge or tank of the solvent receptacle 10. Therefore, the resin concentration in the wash solvent for the preliminary wash increases much faster than that for the fine wash, and as a result, it may require replacement more frequently as well.

According to some exemplary embodiments of the present invention, a system for washing 3D printed objects may be configured to perform a multi-style residual resin removal process, i.e., rinsing, splashing, and jetting. Different wash styles may stem from the wash solvent level and the liquid flow rate. In a rinsing style, the 3D printed objects may be fully immersed into the wash solvent, and the wash solvent may be agitated gently. In this case, the residual resin may be removed mainly by dissolving into the wash solvent. In a splashing style, an agitator may be immersed into the wash solvent, and the wash solvent may be agitated with a medium speed. In this case, the residual resin may be removed by both dissolving into the wash solvent and washing off by the solvent flow. In a jetting style, the liquid level may be lower than the agitator, and the wash solvent may be agitated with a high speed. In this case, the residual resin may be removed mainly by washing off by the high-speed solvent flow. Generally, jetting is more effective than splashing, and splashing is more effective than rinsing. However, higher agitating rates may cause more solvent loss for each wash. Therefore, the material property and resin concentration in the wash solvent may need to be taken into consideration when selecting the wash style for each stage.

Referring to FIG. 6, the pump, valve, and tubing system of disperser module 30 includes a check valve 35 which is installed between the refill pump 31 and the wash solvent inlet 44. The check valve 35 allows the wash solvent to flow from the refill pump 31 to the wash solvent inlet 44 and shuts off the flow in the opposite direction. The pump, valve and tubing system of disperser module 30 also includes a check valve 36 which is installed between the wash solvent outlet 45 and the drain pump 32. The check valve 36 allows the wash solvent to flow from the wash solvent outlet 45 to the drain pump 32 and shuts off the flow in the opposite direction.

Figure 7:
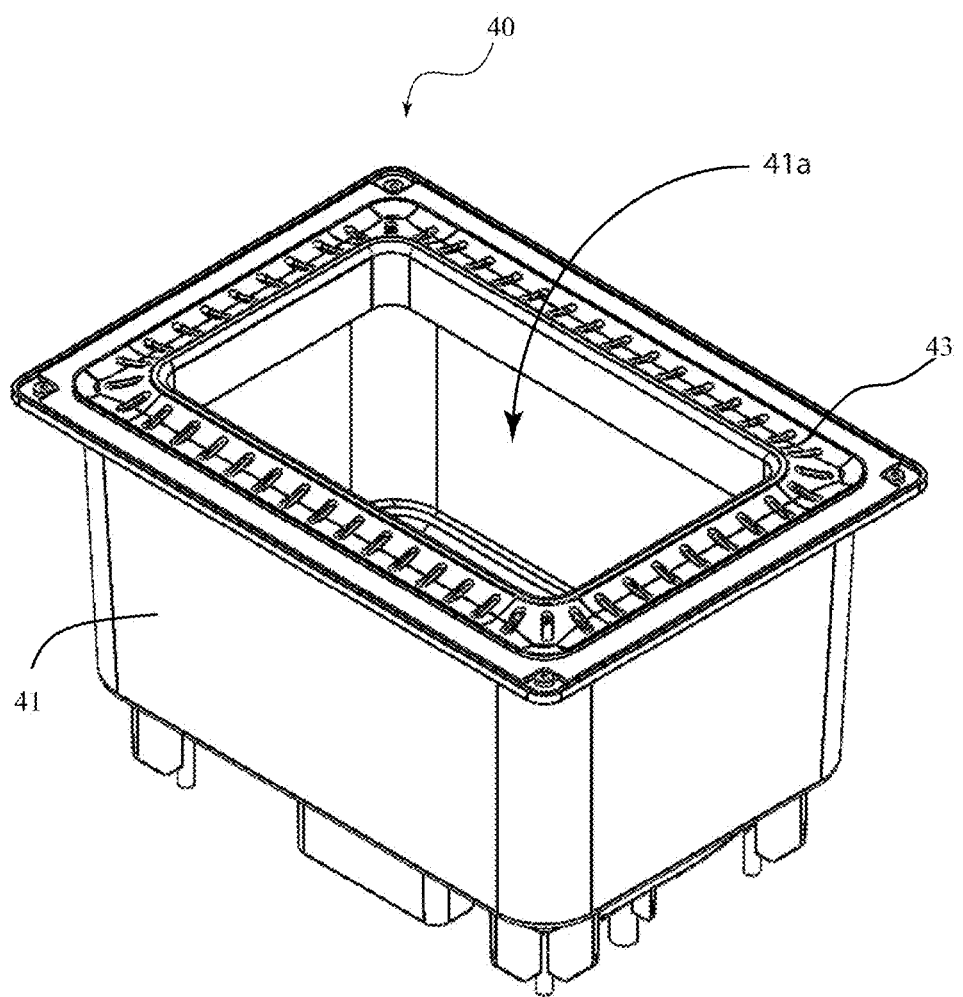
FIG. 7 is a front perspective view of a wash reservoir according to an embodiment of the present invention.
Figure 8:
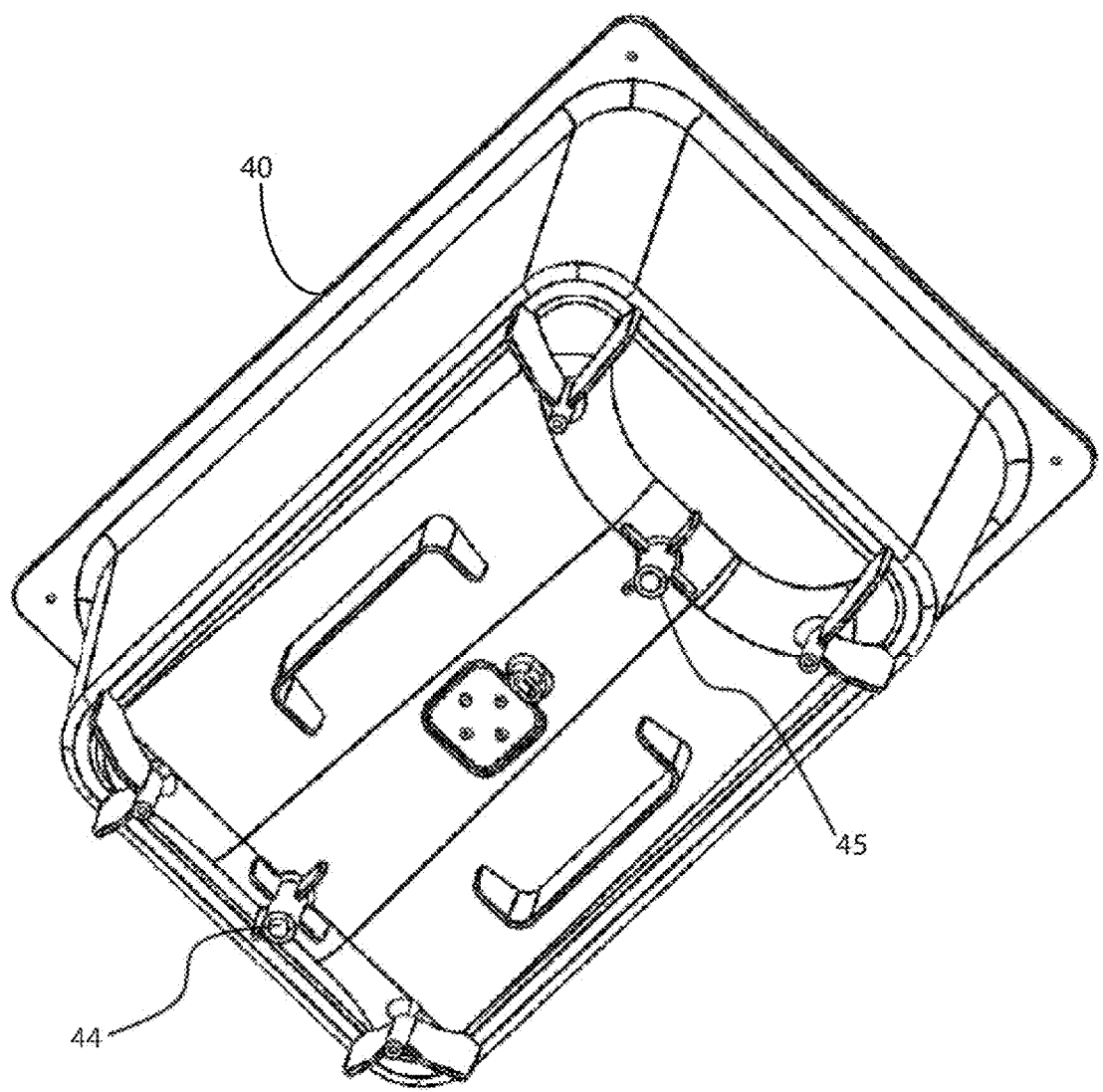
FIG. 8 is a bottom perspective view of a wash reservoir according to an embodiment of the present invention.

Referring to FIGS. 7-8, the wash reservoir 40 typically comprises a wash bucket 41, wherein the wash bucket 41 may include a monitoring window that may be disposed over an aperture 41a of the wash bucket 41, an anti-splashing adaptor 43, and a wash solvent inlet 44 that may include a barb, and a wash solvent outlet 45 that may include a barb for facilitating coupling to the tubing system of disperser module 30. Although not shown in these views, but will be discussed further below with reference to other figures, wash reservoir 40 may typically house or be coupled with a mesh, a resin concentration monitoring module, and a wash solvent agitator of the solvent disperser module 30.

In some exemplary embodiments, the wash bucket 41 may be made of a material that is compatible with both resin and wash solvent, such as PMMA. The wash bucket 41 may preferably employ a slightly slanted bottom, and the wash solvent outlet 45 may be located at its lowest position. Therefore, this design can help to drain the wash solvent when necessary. Furthermore, a hydrophobic and/or oleophobic coating, e.g., Teflon, can be applied on the bottom of the wash bucket 41, which may further help the drainage of the wash solvent. In some exemplary embodiments, wash reservoir 40 including wash bucket 41 may employ a monitoring or observation window on one or more of the walls of wash bucket 41, or the entirety of wash bucket 41 may be transparent, and thus, the user can monitor the wash and air-drying process. In such embodiments, an enclosure of the system such as enclosure 50 may include such observation window on one of its walls.

Figure 9:
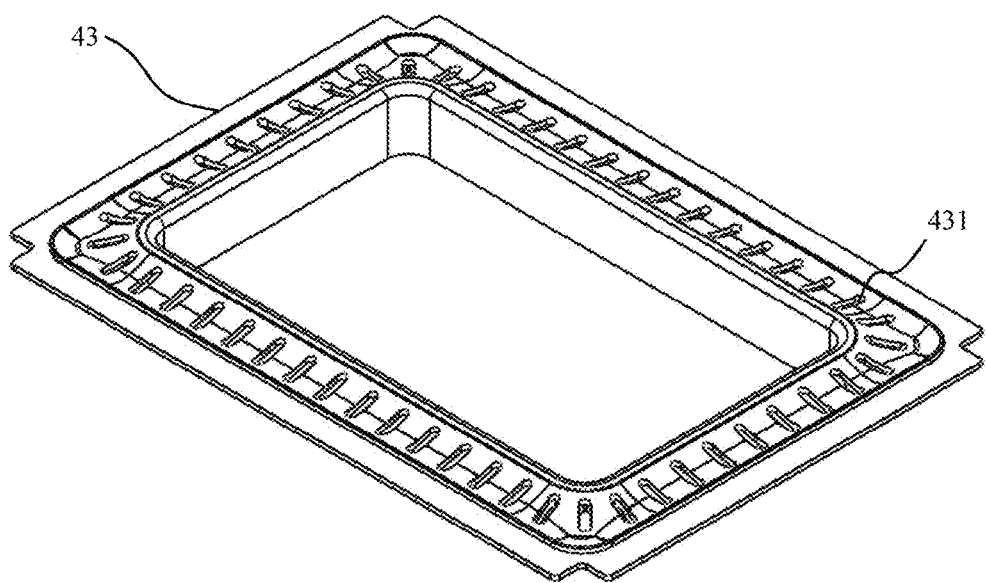
FIG. 9 is a front perspective view of an anti-splashing adapter according to an embodiment of the present invention.
Figure 10:
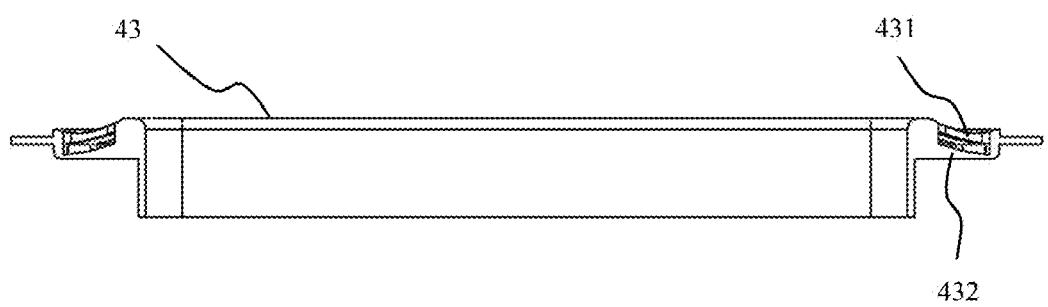
FIG. 10 is a front sectional view of an anti-splashing adapter according to an embodiment of the present invention.
Figure 11A:
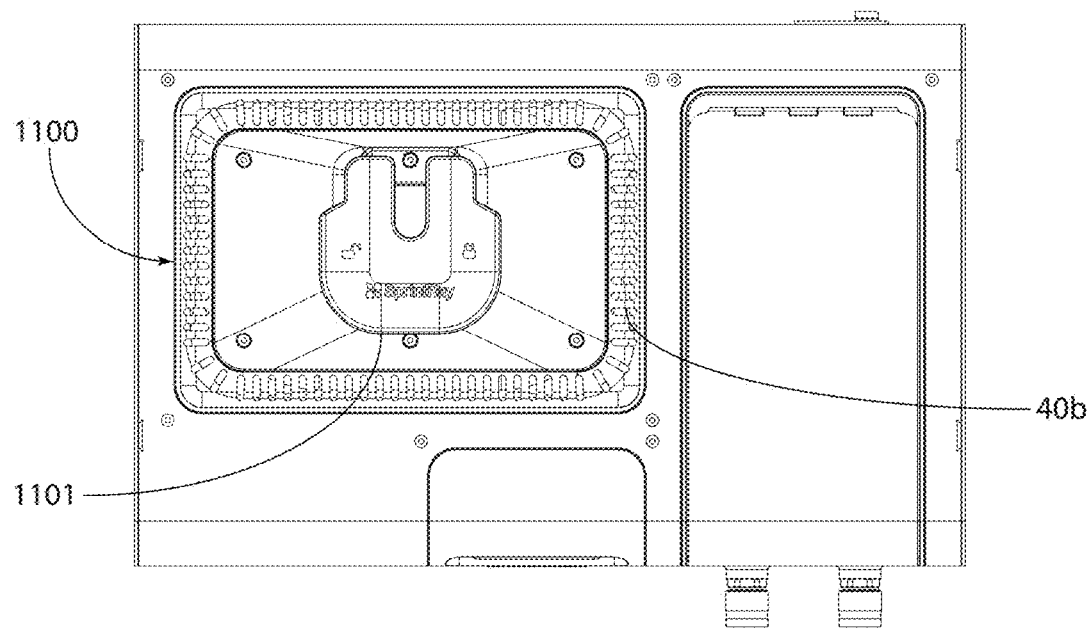
FIG. 11A-FIG. 11B depict an exemplary embodiment of the present invention in which a top aperture of a multi-stage wash device is configured to receive a platform of a 3D printer that can be washed using the system when coupled to the aperture.
Figure 11B:
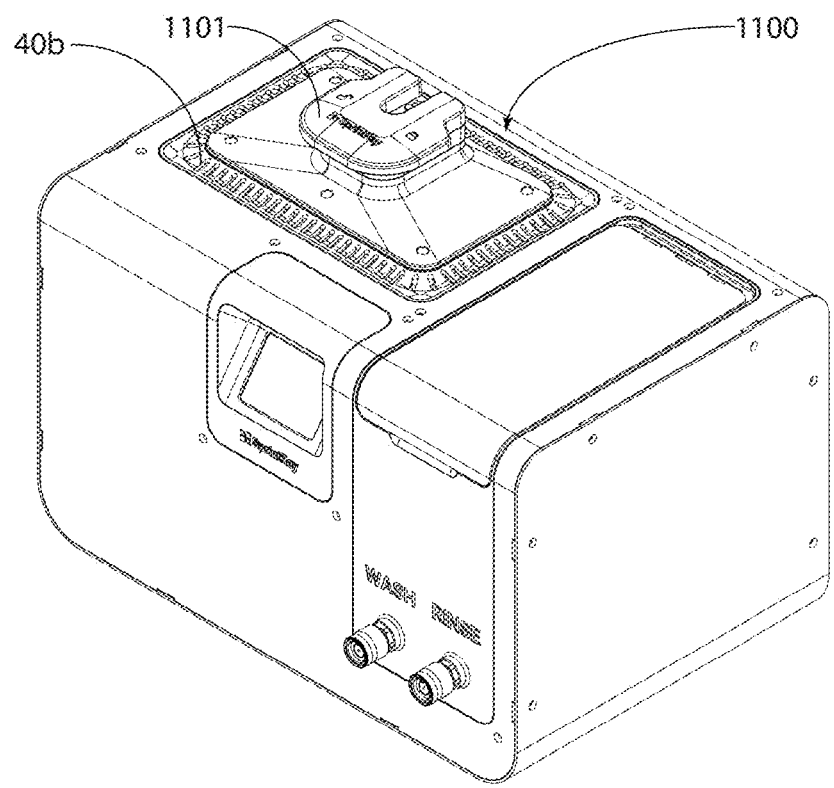

Referring to FIG. 9-10, an anti-splashing adapter 43 sits on the top of the wash bucket 41. It receives the build platform from a specific VP-based 3D printer. The anti-splashing adapter 43 has an array of slots 431, and below each slot 431, there is a small block 432 which is connected to the bottom surface of the anti-splashing adapter 43. Therefore, no direct passage exists in the vertical direction for the anti-splashing adapter 43. When the wash solvent inside the wash bucket 41 is agitated by the agitator, the wash solvent cannot come out easily. However, the slot 431 serves as a vent or airway for the necessary air circulation during air-drying—that is, when the wash reservoir is emptied, and the agitator is activated to create an airflow that dries the 3D-printed object within the wash reservoir. The inlet 44 and outlet 45 of the wash reservoir 40 come with barbs or similar coupling components, so the tubing with appropriate size can be securely fastened on them.

Referring to FIG. 7, FIG. 11A-FIG. 11B, FIG. 13, and FIG. 24A-24B, one or more components may be employed in order to protect the agitator during the wash and air-drying process. For example, and without deviating from the scope of the present invention, in some exemplary embodiments, a mesh may be positioned inside of wash bucket 41, which prevents debris from falling back onto the agitator inside the wash reservoir. In some exemplary embodiments, a support platform may be employed. For example, and without deviating from the scope of the present invention, a support platform 40b may be integrated with a lid of the wash reservoir, such as lid 1100, wherein the support platform 40b includes an adapter for receiving a build platform 1101 of a 3D printer. See for example the embodiment of FIG. 11A-FIG. 11B in which lid 1100 includes a support platform 40b that secures build platform 1101 of a 3D printer. In this exemplary embodiment, a build platform of a 3D printer may simply be placed facing into the wash reservoir 40 so that 3D printed objects attached directly on the build platform for ease of use. In this exemplary embodiment, the attachment or the 3D printed object may become loose during the wash and air-drying process due to the impact from the wash solvent or air flow. Thus, it is possible that the 3D printed objects fall off from the build platform. Accordingly, as shown by way of example in FIG. 13, a mesh 1301 may be installed in the wash bucket 41 to prevent the fallen objects from directly hitting on the agitator 30a. Meanwhile, the bore size and density of the mesh affect the wash and air-drying efficiency. The selection of the bore size and density for the mesh needs to offer enough protection for the rotatory components without significantly compromising the wash and air-drying efficiency. It is preferable that the bore size is in the range of 4-5 mm in diameter, the density is in the range of $4-6/cm^2$, and the thickness is less than 1 mm. The material of the mesh needs to be compatible with both the resin and wash solvent, such as stainless steel 316L.

Figure 24A:
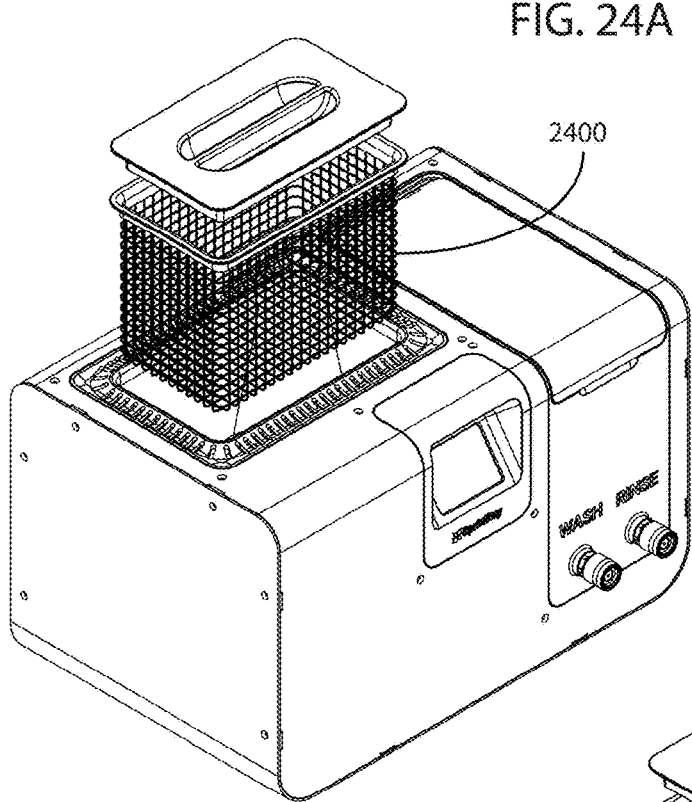
FIG. 24A-FIG. 24B depict a first exploded perspective side view, and a second exploded perspective side view of the exemplary embodiment illustrated in FIG. 23A-FIG. 23C.
Figure 24B:
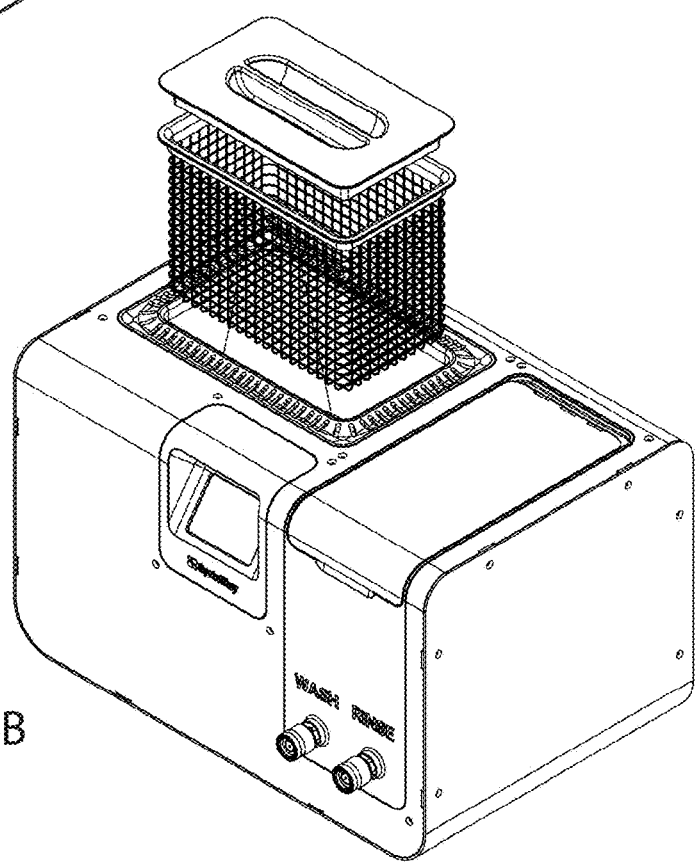
Figure 29:
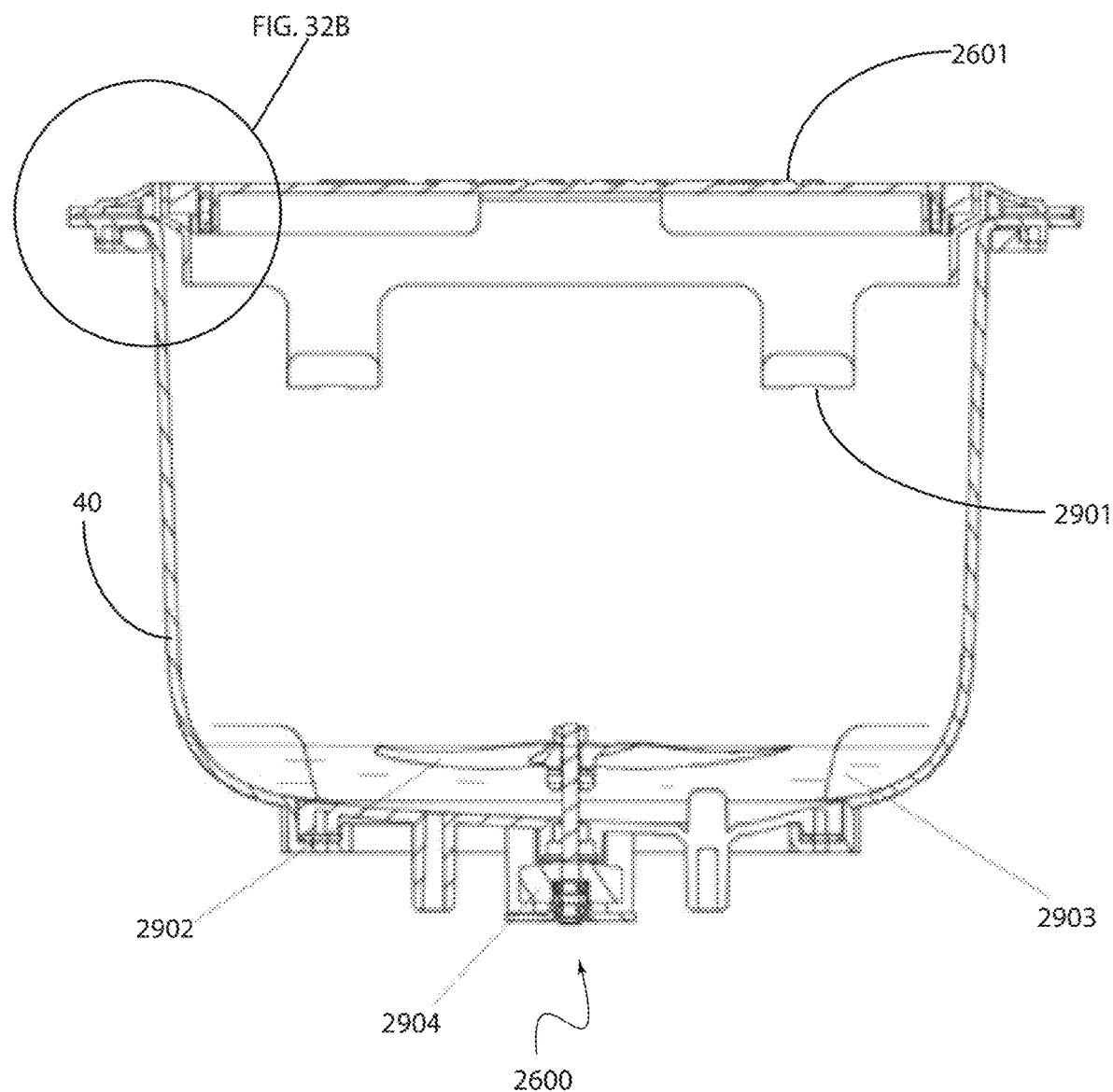
FIG. 29 depicts a cross-sectional view of one exemplary embodiment for a wash reservoir including a solvent disperser module configured to disperse solvent within a wash reservoir in accordance with the present invention.

In some exemplary embodiments, instead of using a mesh, or even in addition to a mesh, a support platform may employ include a cage or container for containing the 3D-printed object therein. For example, and without limiting the scope of the present invention, FIG. 24A-24B illustrate such embodiment. From these views, it may be appreciated that a cage 2400 may be coupled to a lid that may be suspended over the cavity of wash reservoir 40. In FIG. 29 and in FIG. 33A exemplary embodiments of a support or adapter configured to suspend a cage inside wash reservoir 40 are illustrated.

Referring to FIG. 2 and FIG. 7, a photosensitive-based resin concentration monitoring module may be installed on the wash bucket 41. The resin concentration monitoring module may comprise a laser diode and a photoresistor. The laser diode can generate a light with a certain wavelength which illuminates the photoresistor. The resistance of the photoresistor increases with decreasing incident light intensity which is caused by increasing media opacity between the laser diode and the photoresistor. The selection of the laser diode needs to avoid the wavelength range which may cause photopolymerization of the resin, such as ultra-violet. In some exemplary embodiments, it may be preferable to have a laser diode with a wavelength around 650 nm. The distance between the laser diode and the photoresistor may be fixed, so readings of the photoresistor are comparable and consistent. In some exemplary embodiments, information regarding the resin concentration for the wash solvent from cartridge 11a and 11b could be saved and updated on an ID chip and, respectively, so the controller 20 can retrieve this information when necessary.

The resin concentration monitoring module can also serve as the liquid level monitoring system. The resin concentration monitoring module can be fixed at a certain height which reflects the expected liquid level for the wash solvent. Before the wash solvent reaches that height, the gap between the laser diode and the photoresistor is filled with air which usually has a higher transparency than that of the wash solvent. Once the wash solvent achieves that height, the resistance of the photoresistor goes up, and it signals the controller 20 to stop refilling the wash reservoir 40.

In some exemplary embodiments, the agitator agitates the wash solvent in the wash bucket 41 to generate the turbulence with a predetermined speed for a certain time to remove the uncured residual resin from the surface of the printed 3D objects. The agitator may also agitate the air when there is no solvent inside the wash bucket 41 to create air flow to dry the printed 3D objects after wash. In such embodiments, the agitator comprises a waterproof brushless motor and a propeller. In some exemplary embodiments, it may be preferable that the speed of the waterproof brushless motor is in the rage of 5,000-25,000 rpm, and the length of blade from the propeller is in the range of 45-55 mm.

There may be three types of wash style, i.e., rinsing, splashing, and jetting, depending on the liquid level of wash solvent. For the rinsing style, the 3D objects are fully immersed in the wash solvent. In this case, the residual resin on the 3D objects is mainly removed by dissolving into the wash solvent. For the splashing style, the liquid level of the wash solvent is higher than the highest point of the propeller by 3-5 mm. In this case, the residual resin on the 3D objects is removed by both dissolving into the wash solvent and washing off by the solvent flow. For the jetting style, the liquid level of the wash solvent is lower than the lowest point of the propeller by 3-5 mm. In this case, the residual resin on the 3D objects is removed mainly by washing off by the high-speed solvent flow. The benefit of jetting the solvent versus rinsing are a) the amount of solvent used in jetting method is 10%-30% of the amount of solvent in rinsing (which is a significant saving on the amount of solvent) and b) the jetting method throws the liquid with a speed to the model which leads to a more effective wash.

In this embodiment, a combination of time and style for each wash stage could be determined based on the resin concentration of the wash solvent used and the amount of residual resin on the 3D printed objects.

The resin concentration monitoring module gives feedback to the entire wash system based on which the wash system can determine whether the wash solvent is suitable for wash or needs to be replaced. After each wash, the uncured resin goes into the wash solvent, and thus, the resin concentration in the wash solvent increases. The wash solvent used in the present invention is preferably configured for multiple uses and may be repeatedly used until the resin concentration reaches a certain level beyond which the wash process is not efficient anymore. Accordingly, in some exemplary embodiments, a user may be required to replace the wash solvent. This may be achieved in various manners depending on the specifications of the resin concentration monitoring module. For example, and without limiting the scope of the present invention, the following are exemplary embodiments of a resin concentration monitoring module in accordance with the present invention:

Detecting Change in Density:

For a commonly used wash solvent, such as acetone, IPA, or TPM, its density is usually smaller than that of the resin. To be more specific, the density for acetone is $0.788 \times 10^3$ kg/m$^3$, the density for IPA is $0.785 \times 10^3$ kg/m$^3$, and the density for TPM is $0.975 \times 10^3$ kg/m$^3$. Compared with the density of the aforementioned solvents, the density for photosensitive resin is usually greater than $1.1 \times 10^3$ kg/m$^3$. When more photosensitive resin is dissolved into the wash solvent, the density of the wash solvent also increases. Based on the change of the wash solvent density, a density-based sensor, e.g., hydrometer, can be used to monitor the resin concentration in the wash solvent.

Detecting Change in Pressure:

Besides directly using density change to indicate the resin concentration of the wash solvent, the pressure change at a certain location can also be used for this purpose. The pressure (P) in a static liquid is proportional to both the liquid density ($\rho$) and the depth (h) in the liquid which can be represented as $P=\rho gh$, where g is the gravitational constant. Therefore, the pressure change at a certain depth in the wash solvent can reflect the wash solvent density change, and further indicate the concentration change of the wash solvent.

Detect Change in Opacity:

Another method to monitor the concentration change of the wash solvent is to evaluate the opacity of the wash solvent. For commonly used wash solvent, such as acetone, IPA, or TPM, it usually has a high transparency. With the increasing of the resin concentration, the transparency decreases. This change can be detected by a photosensitive sensor, such as a photoresistor. For a given light source, the resistance of a photoresistor increases with decreasing incident light intensity which is caused by increasing media opacity between the light source and the photoresistor. Therefore, the opacity can be used to indicate the resin concentration in the wash solvent.

Figure 13:
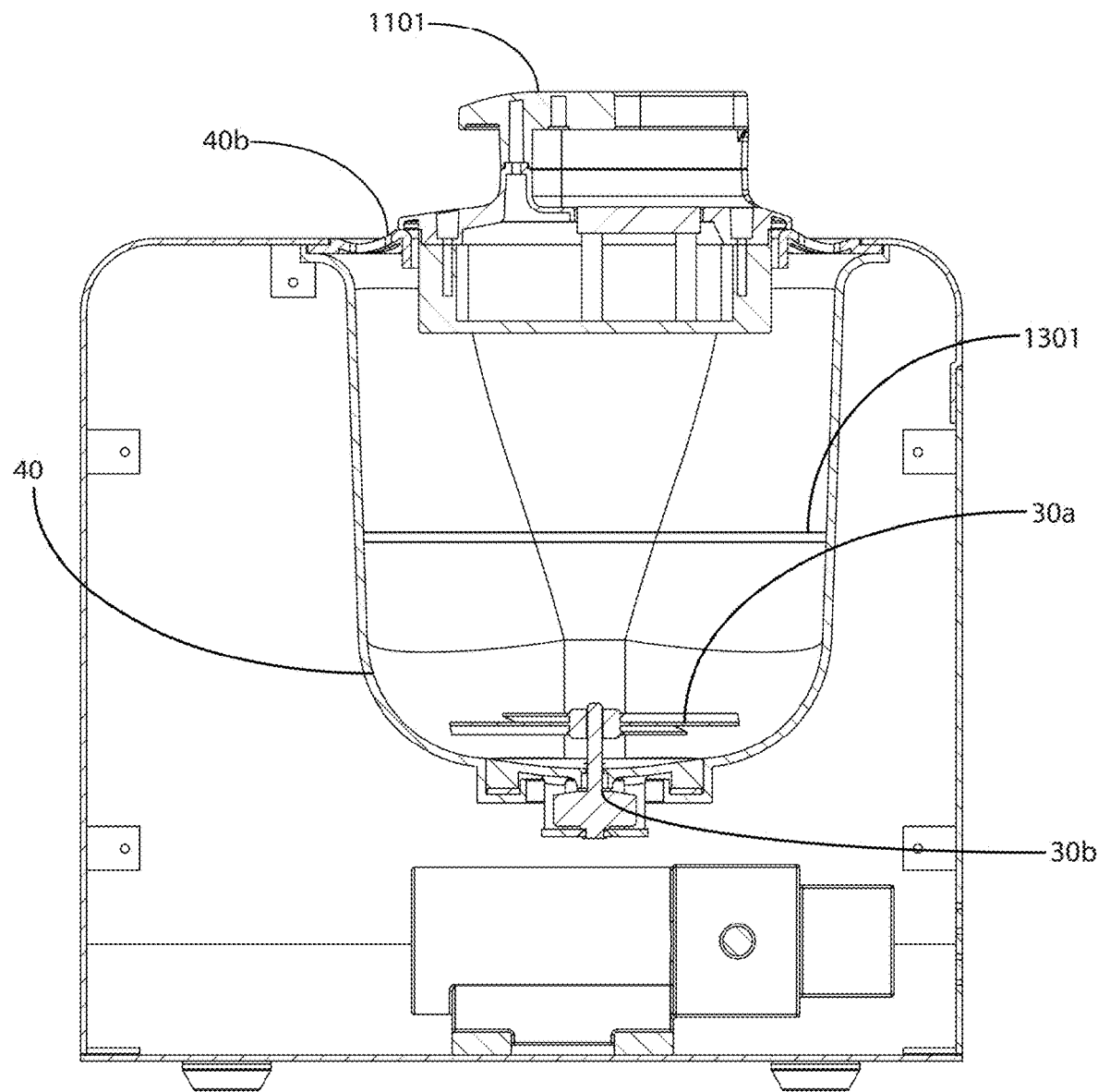
FIG. 13 depicts a cross-sectional view along the segment S-S illustrated in FIG. 12A.
Figure 14A:
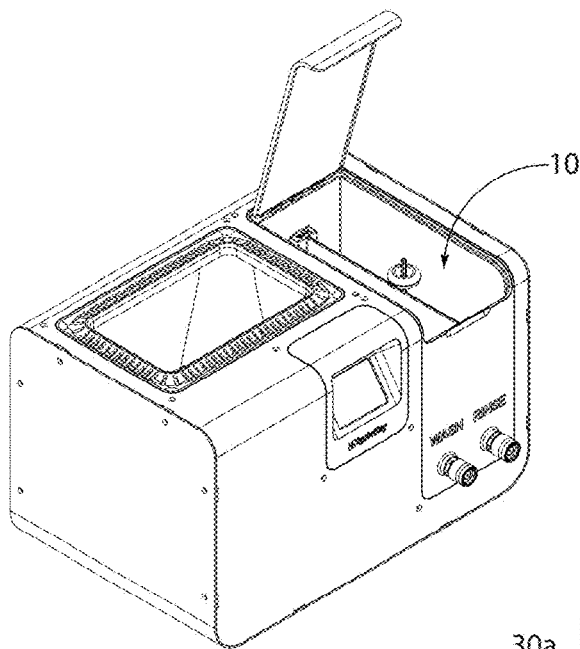
FIG. 14A-FIG. 14C depict a first perspective side view, a top view, and a second perspective side view, respectively, of an exemplary embodiment of the present invention.
Figure 14B:
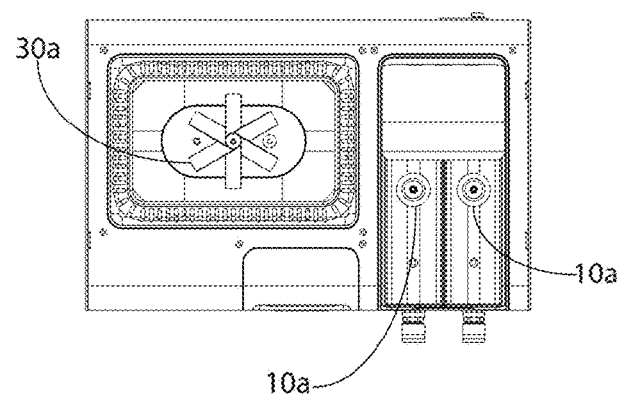
Figure 14C:
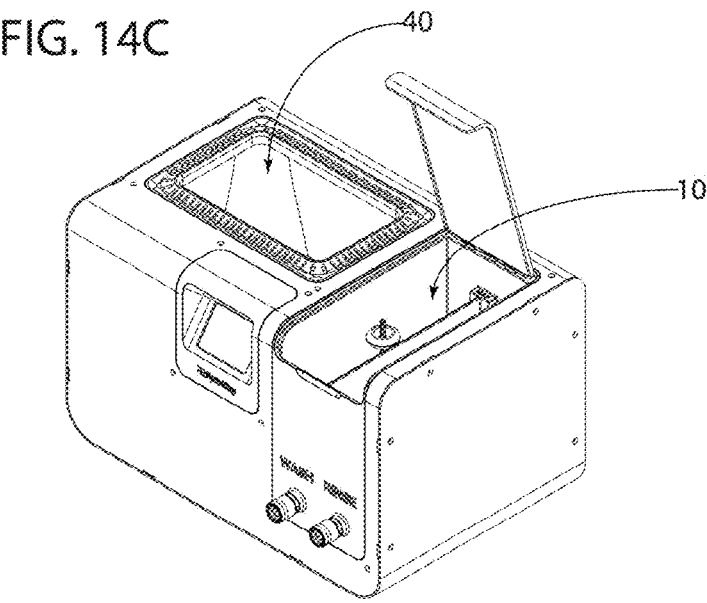
Figure 15A:
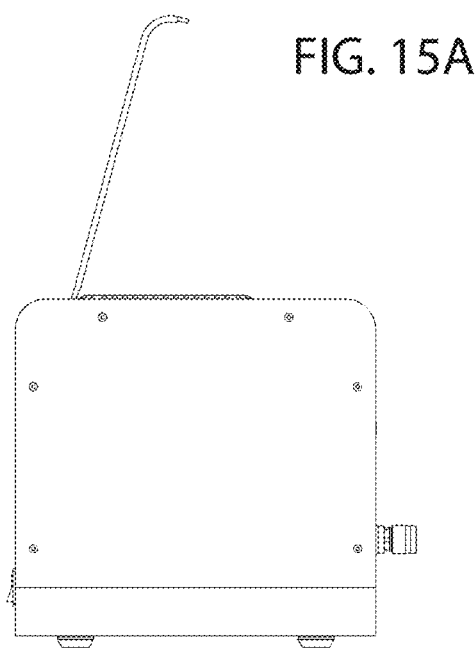
FIG. 15A-FIG. 15C depict a first side view, a front view, and a second side view, respectively, of the exemplary embodiment illustrated in FIG. 14A-FIG. 14C.
Figure 15B:
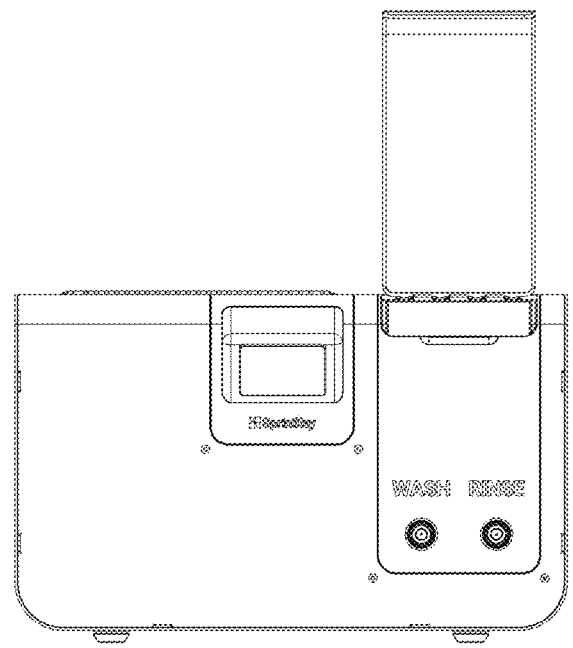
Figure 15C:
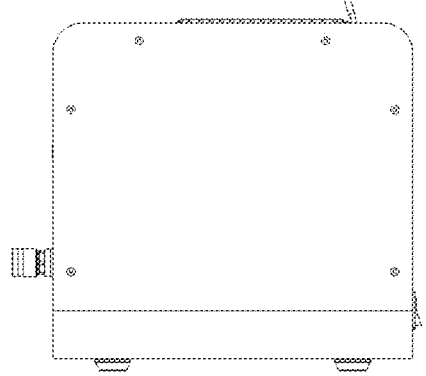
Figure 16:
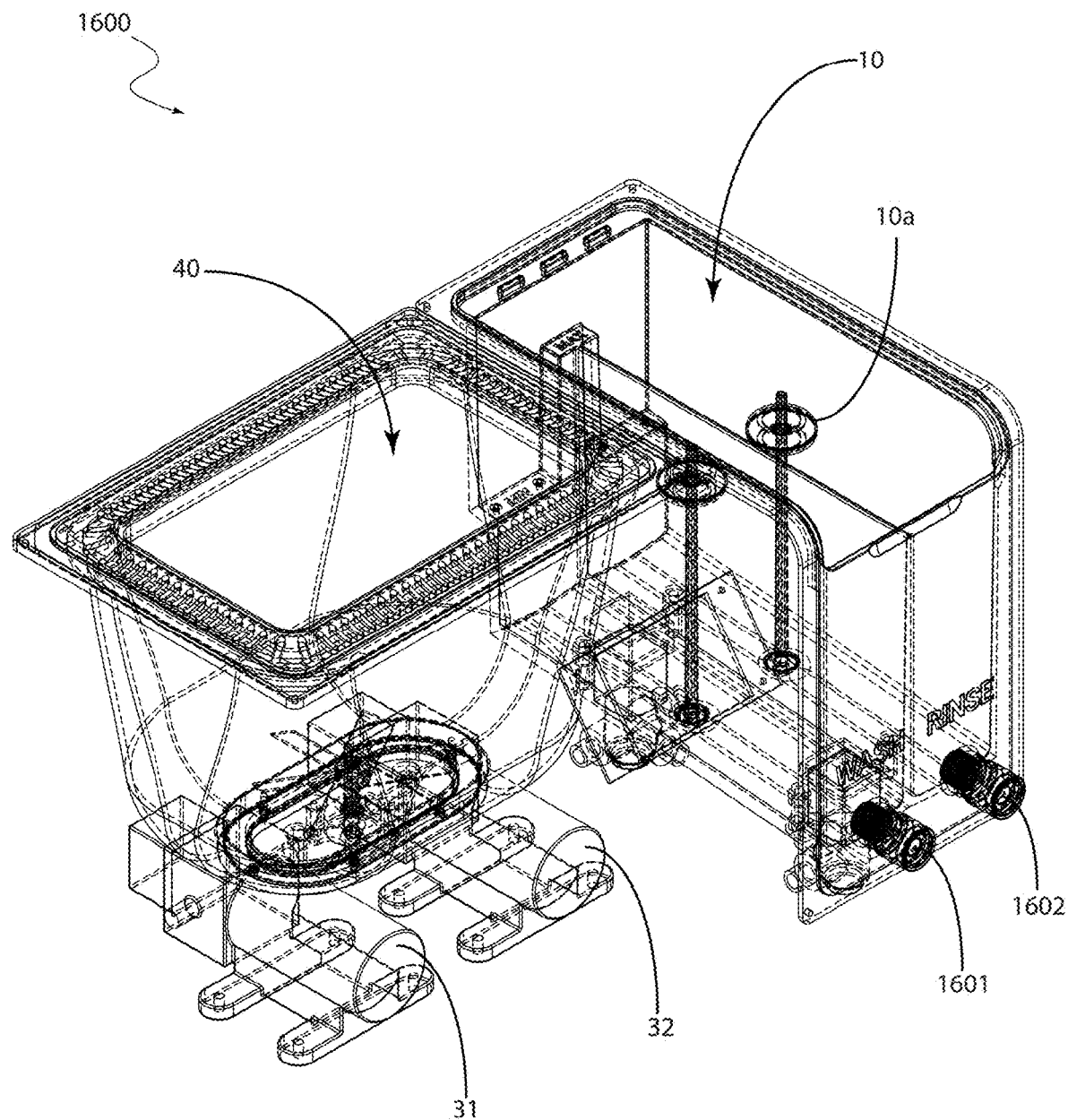
FIG. 16-FIG. 21 depict several see-through and cross-sectional views showing various components and configurations of the components within an enclosure of a device in accordance with exemplary embodiments of the present invention.
Figure 17:
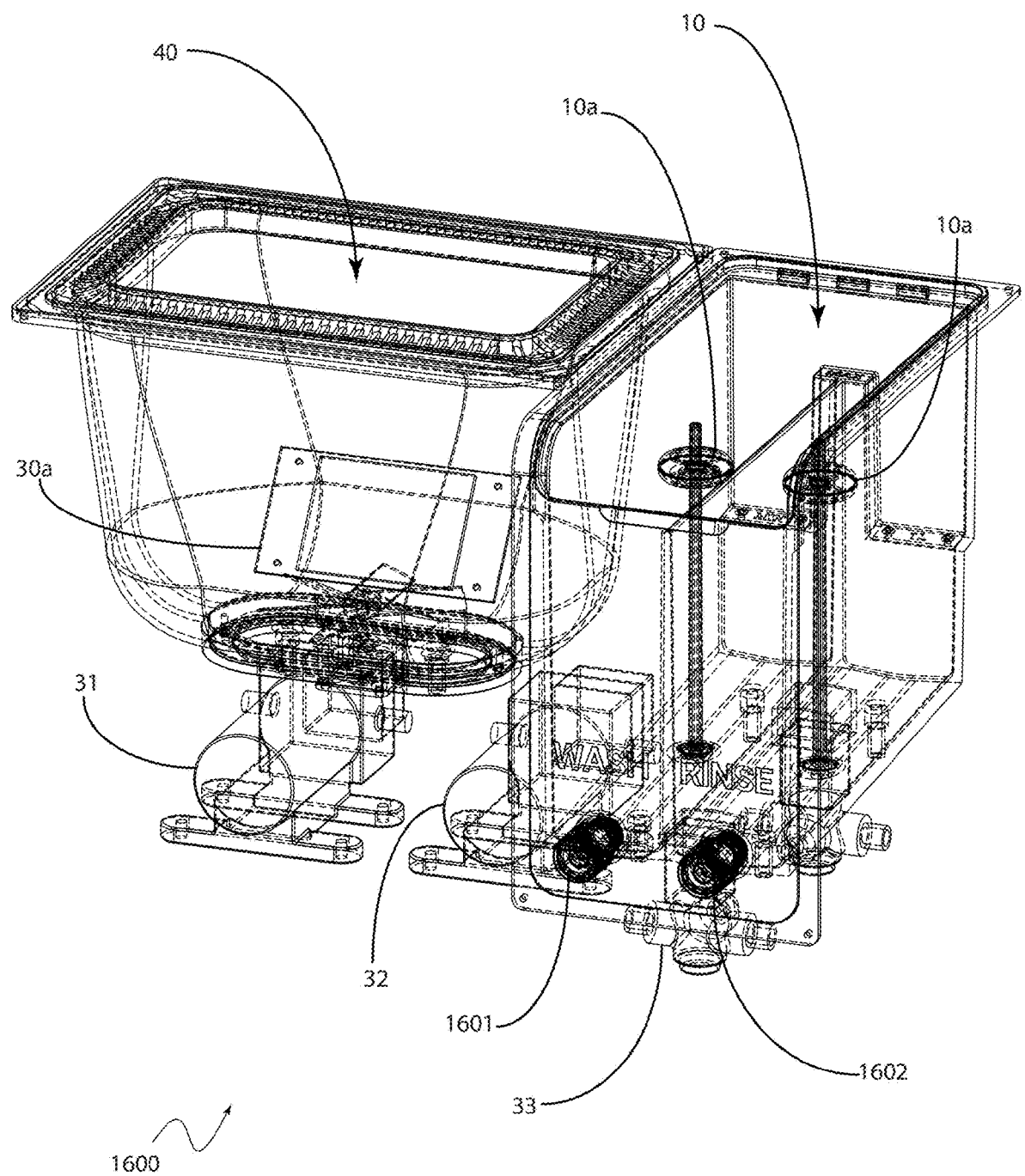

Turning now to the set of figures FIG. 11A-FIG. 12C, an exemplary embodiment of the present invention in which a top aperture of a multi-stage wash device is configured to receive a platform of a 3D printer that can be washed using the system when coupled to the aperture is depicted. FIG. 13 depicts a cross-sectional view of an exemplary embodiment of the present invention in which a top aperture of a multi-stage wash device is configured to receive a platform of a 3D printer that can be washed using the system when coupled to the aperture. From these views, it may be appreciated that at the top of the apparatus, an aperture receives a portion of the platform in a manner so that the surface(s) of the platform that require washing will be sealed inside the wash reservoir or cavity and facing the agitator. As mentioned above, the agitator may also agitate air when there is no solvent inside the wash reservoir (or wash bucket 41) to create air flow to dry the platform surface that has been washed.

Turning to figures, FIG. 14A-FIG. 15C, several perspective and side views are depicted of an exemplary embodiment of the present invention, showing a wash solvent reservoir opened. From these views, it may be appreciated that the wash solvent reservoir includes two adjacent repositories for each of the solutions (i.e. a wash solution and a rinse solution) employed by the system. For example, and without limiting the scope of the present invention, in such embodiment, rather than utilizing a cartridge for each solution, the separated reservoirs within the wash reservoir is configured to separately hold the solutions in the two adjacent compartments. Further, in such embodiment, quick-connect valves may be used to easily fill each compartment or reservoir with the solution. This design may be desirable to save space and avoid the costs of the cartridges that may be employed in accordance with other exemplary embodiments of the present invention. Notably, in either embodiment, the solutions are kept separated and never mixed outside of the wash reservoir also shown in these views. In one embodiment, the two reservoirs are fixed and in another they are removeable.

Turning to the next set of figures, FIG. 16-FIG. 20 depict several see-through and cross-sectional views showing various components and configurations of the components within a housing of a device in accordance with exemplary embodiments of the present invention. Various valves and pumps and sensors are shown in these views, which may be employed in some exemplary embodiments of the present invention.

Draining the reservoirs and replacing the saturated solvent with a new solvent may be achieved by the two quick connect fittings shown in FIG. 16-FIG. 20. Quick connect fitting has a release mechanism that prevent the liquid from spilling upon shutting off. FIG. 16-FIG. 20 further depict several see-through and cross-sectional views showing various components and configurations of the components within an enclosure of a device in accordance with exemplary embodiments of the present invention.

As mentioned above and may be gleaned from FIG. 16-FIG. 20, a system 1600 for washing off residual resin from objects that are 3D-printed through a vat polymerization process, in accordance with the present invention, may comprise: a wash reservoir 40 adapted to enclose a 3D-printed object, the wash reservoir in fluid communication with a solvent receptacle 10, the solvent receptacle housing a plurality of solvent solutions; a solvent disperser module 30 including an agitator 30*a* and one or more pumps 31, 32, the agitator 30*a* adapted to disperse the plurality of solvent solutions onto the 3D-printed object and the one or more pumps 31, 32 adapted to facilitate a flow of the plurality of solvent solutions between the wash reservoir 40 and the solvent receptacle 10; and a controller 20 (not shown but coupled to user interface 20*a*) in communication with the solvent disperser, the controller 20 including a set of executable instructions configured to: pump a first solution of the plurality of solvent solutions from the solvent receptacle 10 to the wash reservoir 40; disperse the first solutions onto the 3D-printed object; pump the first solution from the wash reservoir 40 to the solvent receptacle 10; pump a second solution of the plurality of solvent solutions from the solvent receptacle to the wash reservoir; and disperse the second solution onto the 3D-printed object.

In exemplary embodiments, the controller 20 may be further configured to: pump the second solution from the wash reservoir 40 to the solvent receptacle 10 thereby emptying the wash reservoir of any solvent solution. Subsequently, controller 20 may activate the agitator 30*a* to create an airflow and dry the 3D printed object.

In some exemplary embodiments, the agitator 30*a* comprises a propeller adapted to be fully or partially submerged in the first or second solvent solutions pumped into the wash reservoir 40—this may be achieved by forming a base or basin in which solvent solution may be gathered.

In some exemplary embodiments, the solvent receptacle comprises adjacent tanks 11*a* and 11*b* for separately holding two separate solutions. In some exemplary embodiments, the adjacent tanks 11*a* and 11*b* may comprise of cartridges. In some exemplary embodiments, system 1600 further comprises a quick connect valves 1601 and 1602 for each of the adjacent tanks 11*a* and 11*b* of the solvent receptacle 10. In some exemplary embodiments, system 1600 further comprises a resin concentration monitoring module configured to detect a resin concentration inside the solvent receptacle 10. For example, and without deviating from the scope of the present invention, the resin concentration module may include one or more sensors 10*a* including but not limited to an optical sensor, and/or a density sensor, and/or a pressure sensor.

To prevent spillage from the wash reservoir during operation of system 1600, in some exemplary embodiments, system 1600 further comprises an anti-splashing adapter 43 situated on a top region of the wash reservoir 40 (see also FIG. 7). In exemplary embodiments, the anti-splash adapter includes openings for facilitating an airflow within wash reservoir 40 during a drying cycle. In exemplary embodiments, as mentioned above, wash bucket 41 includes a slanted or angled surface 1603 to facilitate draining any remaining solution from the wash reservoir during a wash or dry cycle or during cleaning.

A method, performed by system 1600 for washing off residual resin from objects that are 3D-printed through a vat polymerization process, for example by system 1600, may include: (1) pumping a first solution of a plurality of solvent solutions from a solvent receptacle to a wash reservoir of the system, wherein the wash reservoir is adapted to enclose a 3D-printed object, by activating a pump of solvent disperser adapted to facilitate a flow of the plurality of solvent solutions between the wash reservoir and the solvent receptacle; (2) dispersing the first solutions onto the 3D-printed object by activating an agitator of the solvent disperser adapted to disperse the plurality of solvent solutions onto the 3D-printed object; (3) pumping the first solution from the wash reservoir to the solvent receptacle in order to substantially remove the first solution from the wash reservoir; (4) pumping a second solution of the plurality of solvent solutions from the solvent receptacle to the wash reservoir; and (5) dispersing the second solution onto the 3D-printed object.

In some exemplary embodiments, a method may further include (6) pumping the second solution from the wash reservoir to the solvent receptacle in order to substantially remove the second solution from the wash reservoir; and (7) activating the agitator to create an airflow and dry the 3D-printed object.

In some exemplary embodiments, a method may further include pumping the first solution or the second solution from the solvent reservoir to the wash reservoir comprises filling up the wash reservoir with the first or second solutions so that the 3D-printed object inside the wash reservoir is fully submerged in the solvent during a rinsing cycle.

In some exemplary embodiments, a method may further include pumping the first solution or the second solution from the solvent reservoir to the wash reservoir comprises filling up the wash reservoir with the first or second solutions so that a propeller of the agitator is fully submerged in the solvent during a splashing cycle. In some embodiments, the propeller is full submerged by 3-5 mm.

In some exemplary embodiments, a method may further include pumping the first solution or the second solution from the solvent reservoir to the wash reservoir comprises filling up the wash reservoir with the first or second solutions so that a solvent level inside the wash reservoir is lower than the lowest point of a propeller of the agitator during a jetting cycle. In some embodiments, the solvent level inside the wash reservoir is lower than the lowest point of a propeller of the agitator by 3-5 mm during a jetting cycle.

In some exemplary embodiments, a method may further include monitoring a resin concentration inside the solvent receptacle using one or more sensors including an optical sensor, a density sensor, or a pressure sensor.

Turning to the next set of figures, FIG. 21-FIG. 28 show a system that employs a cage 2400. More specifically, in these figures another exemplary embodiment is depicted in which a top is provided to cover the aperture of the washing reservoir instead of the platform receiving aperture shown in other figures discussed above. That is, an apparatus in accordance with the present invention may be configured to receive parts inside a cage (i.e. in contrast with the embodiment in FIG. 11-FIG. 12). The parts may be washed using the same methods and systems in accordance with the present invention but in this version the parts are securely placed inside the cage rather than coupled directly to the aperture as is the case in the embodiment configured to receive a 3D printer platform. In some exemplary embodiments, the aperture is configured to receive both the platform and the lid shown in these views.

Figure 22:
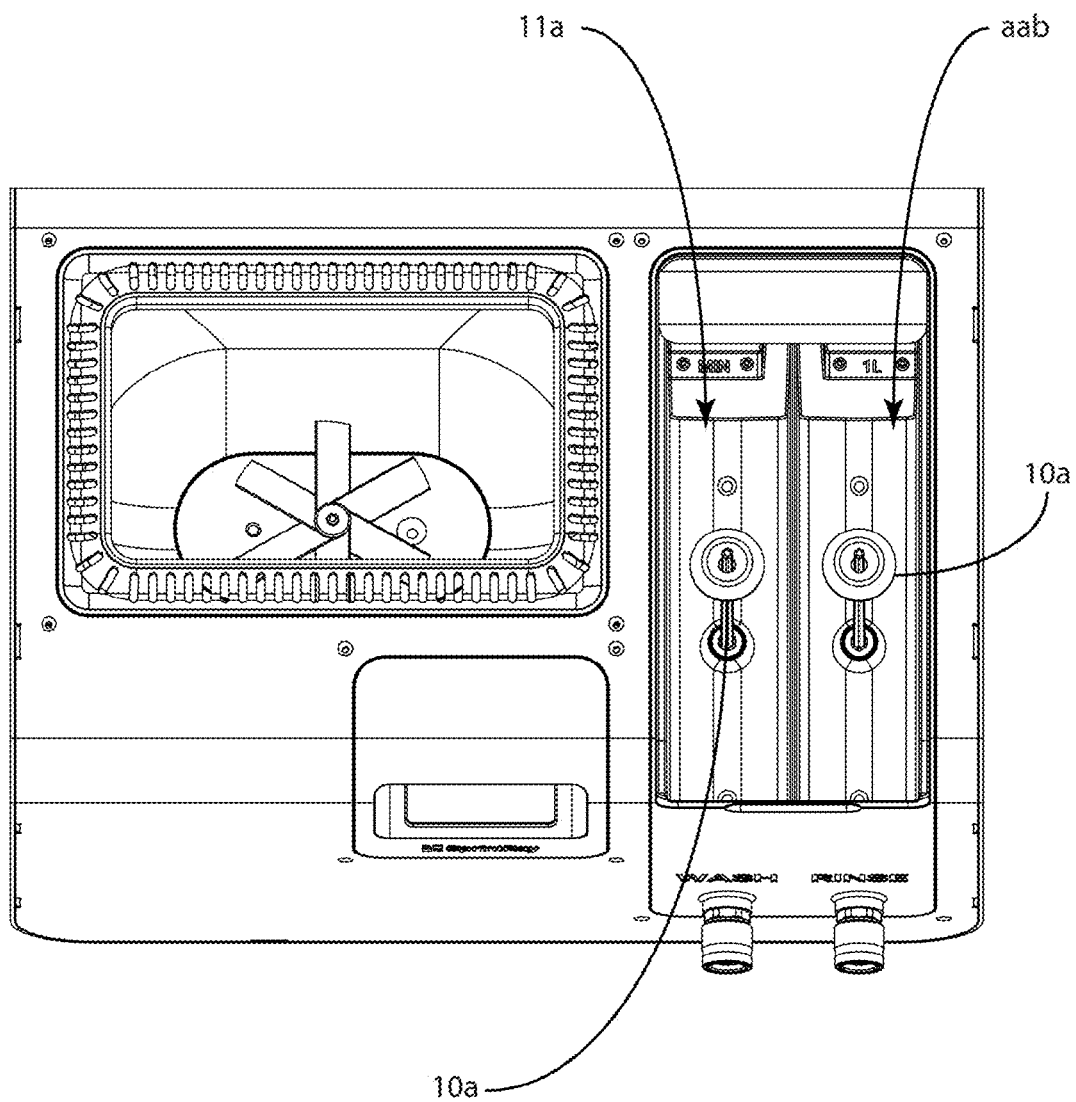
FIG. 22 illustrates an exemplary enclosure for housing the components depicted in FIG. 16-FIG. 21.
Figure 25A:
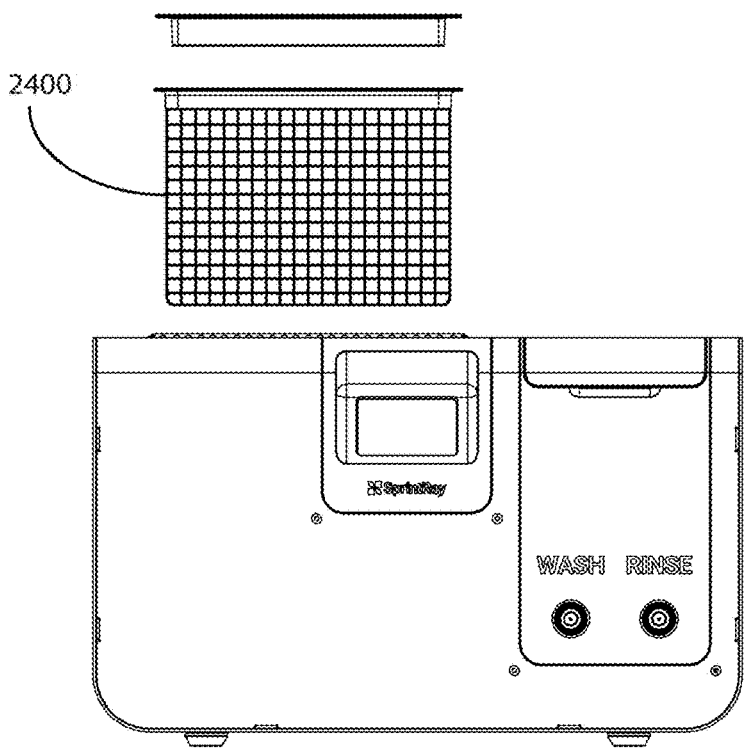
FIG. 25A-FIG. 25C depict an exploded view and exploded side views, respectively, of the exemplary embodiment illustrated in FIG. 23A-FIG. 24B.
Figure 25A:
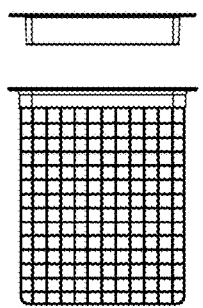
Figure 25B:
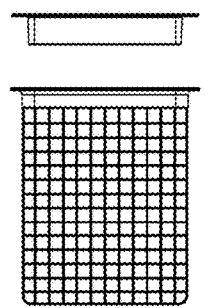
Figure 25C:
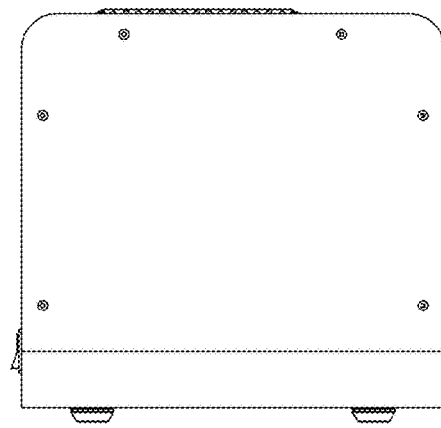
Figure 25C:
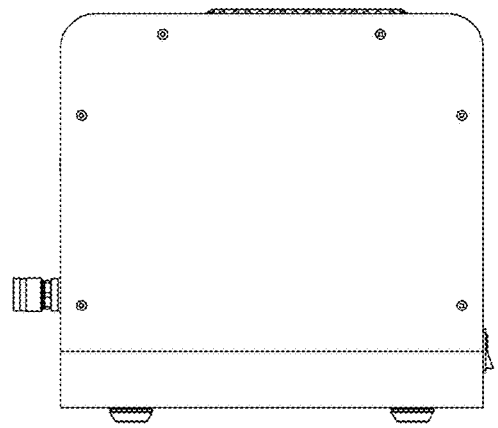

More specifically, FIG. 22 illustrates an exemplary enclosure for housing the components depicted in FIG. 16-FIG. 21. FIG. 23A-FIG. 23C depict a first perspective side view, a top view, and a second perspective side view, respectively, of an exemplary embodiment of the present invention that employs a cage for enclosing 3D printed objects therein. FIG. 24A-FIG. 24B depict a first exploded perspective side view, and a second exploded perspective side view of the exemplary embodiment illustrated in FIG. 23A-FIG. 23C. FIG. 25A-FIG. 25C depict an exploded view and exploded side views, respectively, of the exemplary embodiment illustrated in FIG. 23A-FIG. 24B.

Figure 26A:
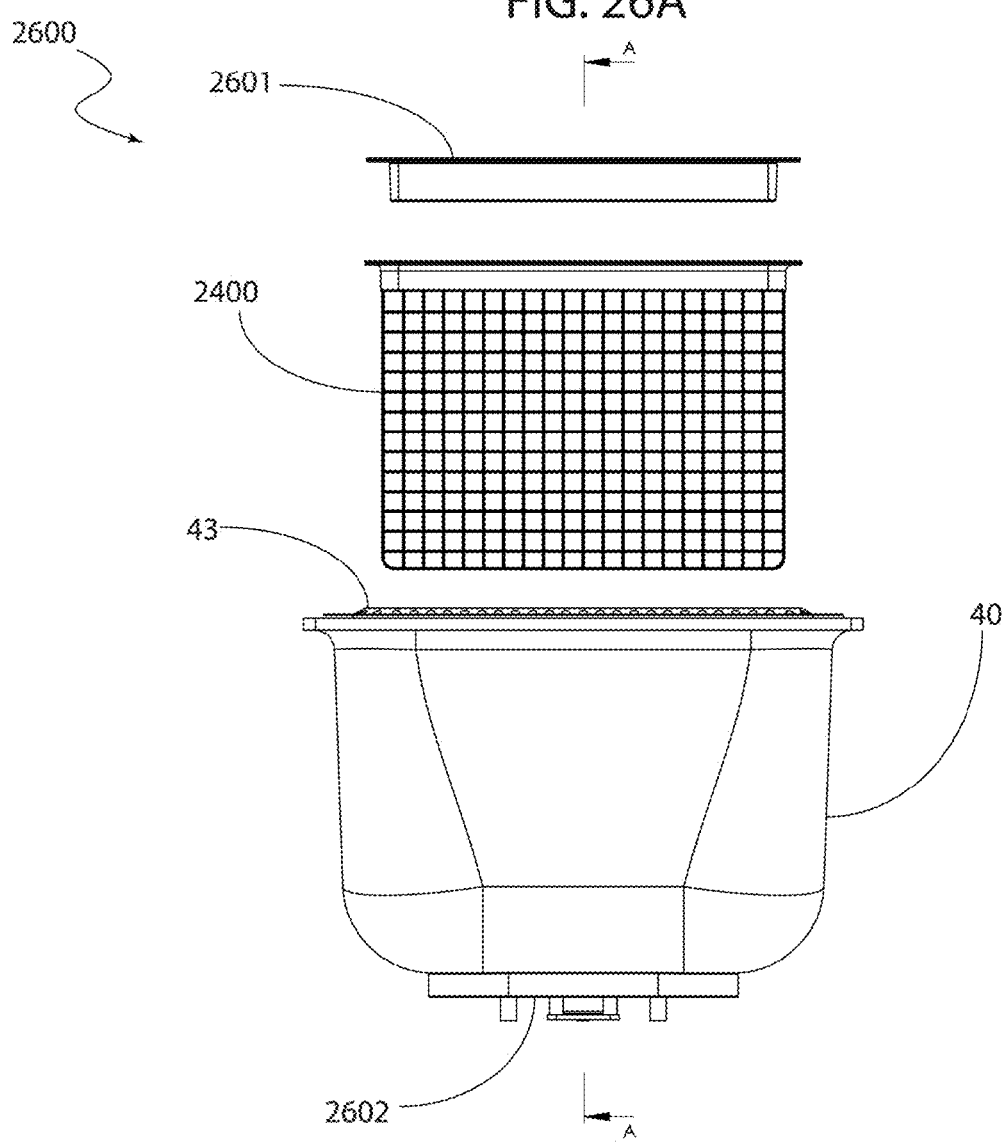
FIG. 26A-FIG. 26B depict an exploded front view and a bottom view, respectively, of an exemplary wash reservoir including a cage adapted to enclose a 3D printed object therein.
Figure 26B:
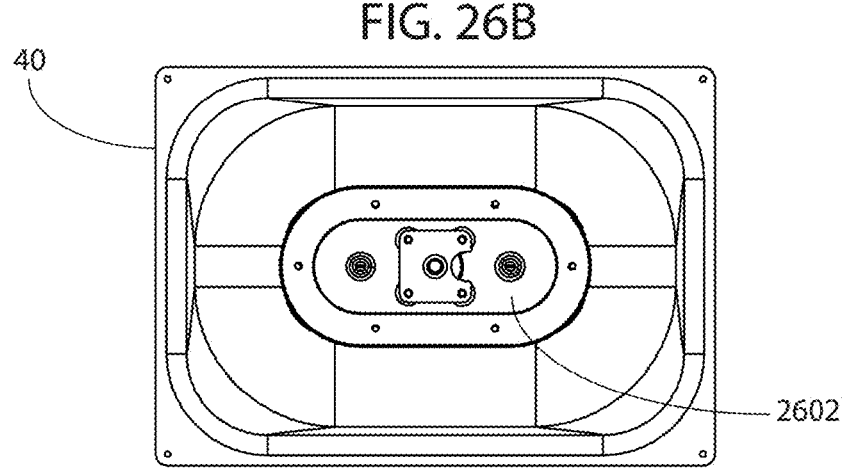

FIG. 26A-FIG. 26B depict an exploded front view and a bottom view, respectively, of an exemplary wash reservoir including cage 2400 adapted to enclose a 3D printed object therein. In this embodiment of these views, the wash system 2600 includes a lid 2601 and a cage 2400, which fits inside wash reservoir 40. FIG. 26B depicts a bottom view illustrating the bottom region of a motor assembly 2602 in accordance with the present invention. The lid 2601 may include a lid handle 2603, and in exemplary embodiments, as shown in FIG. 29, a region of the lid extending into the interior of wash reservoir 40 may include a coupling means such as a retaining arm 2901 for suspending cage 2400 inside wash reservoir 40.

Figure 27A:
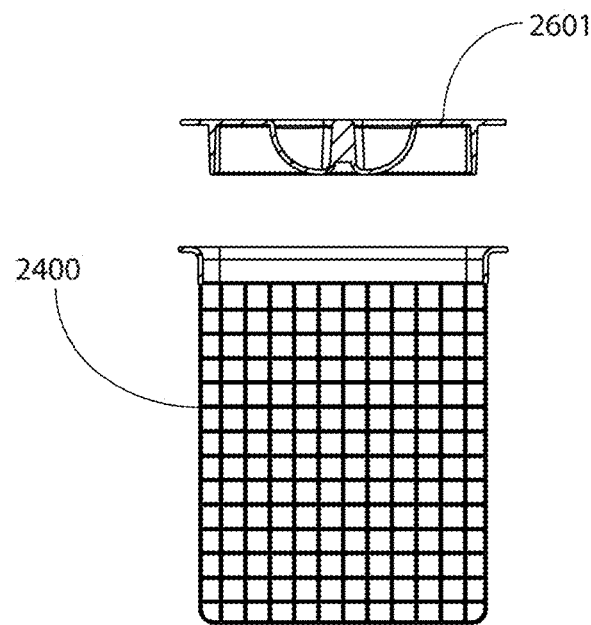
FIG. 27A-FIG. 27B depict an exploded cross-sectional view along the segment A-A of FIG. 26A and an exploded side view thereof, respectively, of an exemplary wash reservoir including a cage adapted to enclose a 3D printed object therein.
Figure 27B:
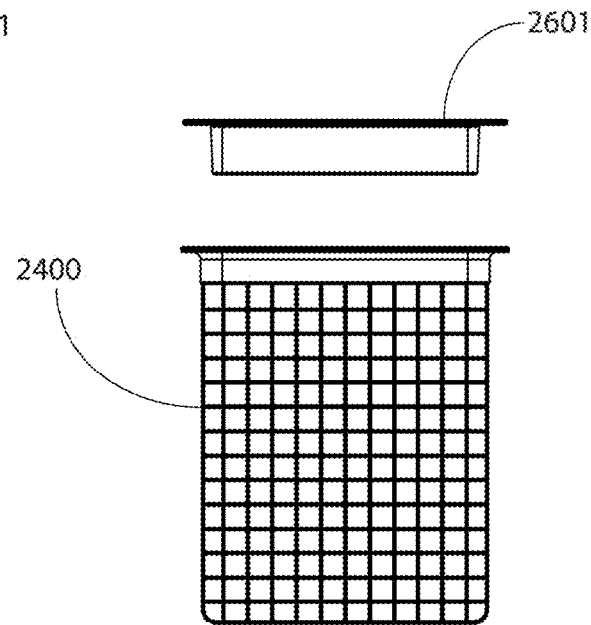
Figure 28:
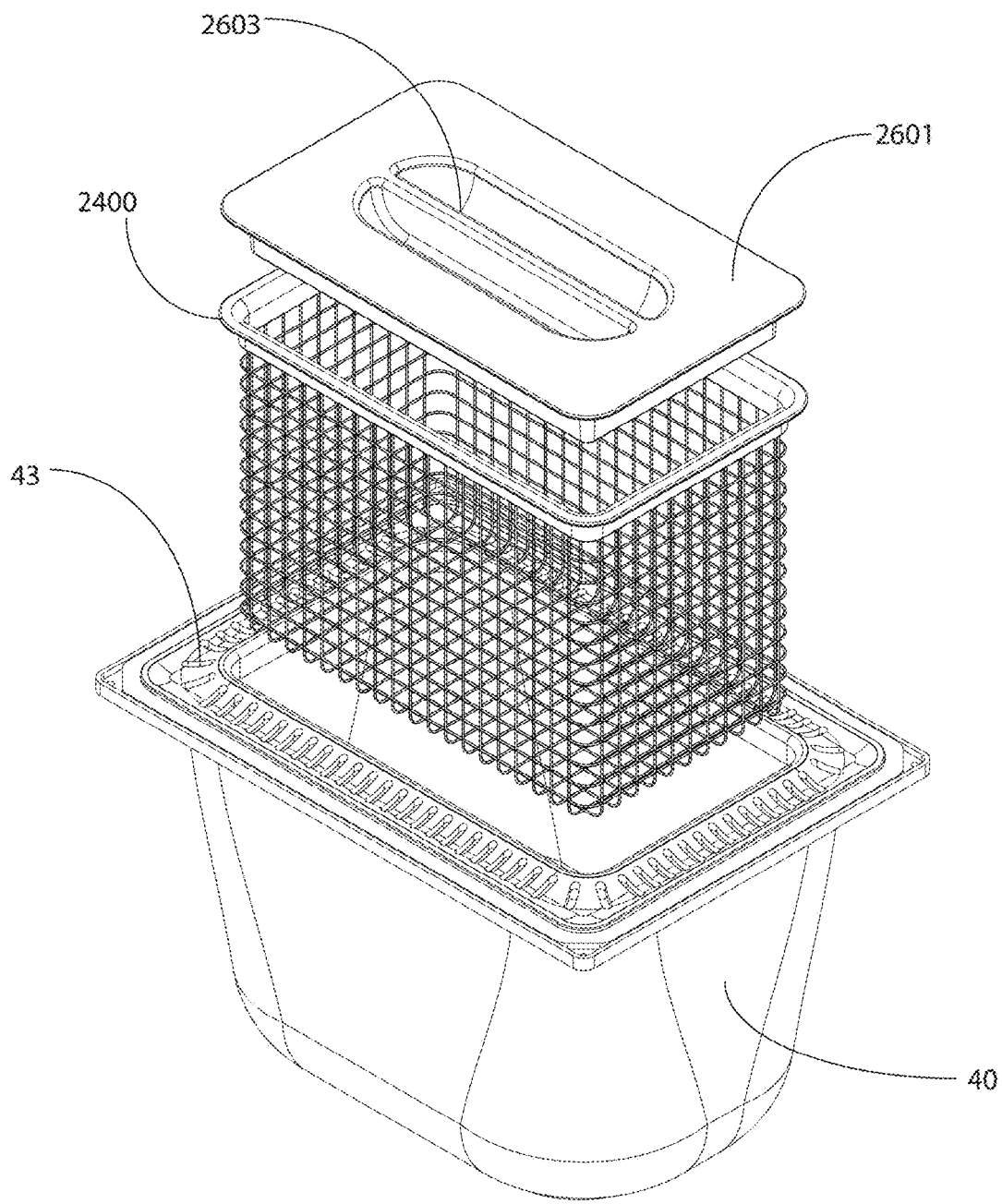
FIG. 28 depicts an exploded perspective view of exemplary wash reservoir including a cage adapted to enclose a 3D printed object therein.

FIG. 27A-FIG. 27B depict an exploded cross-sectional view along the segment A-A of FIG. 26A and an exploded side view thereof, respectively, of an exemplary wash reservoir including a cage adapted to enclose a 3D printed object therein. FIG. 28 depicts an exploded perspective view of exemplary wash reservoir including a cage adapted to enclose a 3D printed object therein. Moreover, the embodiment illustrated the figures referenced immediately above, may provide a more cost-effective and space saving design. Further, this design may be more environmentally friendly since it avoids use of various cartridges that may have to be refilled or otherwise disposed of after use.

Now turning to the next figure, FIG. 29 depicts a cross-sectional view of one exemplary embodiment for a wash reservoir including a solvent disperser module configured to disperse solvent within a wash reservoir in accordance with the present invention. More specifically, FIG. 29 illustrates a motor assembly 2600 of a solvent disperser module in accordance with the present invention. The motor assembly 2600 may employ a propeller 2902 to splash a liquid solvent 2903 upwards in a manner so that plenty of liquid will be dispersed on the 3D printed object, largely washing away the resin residue. Dispersing may include, jetting, splashing, or otherwise directing a flow of the solvent onto the 3D-printed part that may be suspended or secured within wash reservoir 40. In some embodiments, the system may employ a wash cycle that includes submerging or immersing the 3D printed object inside the wash reservoir, by for example, filling up the reservoir so that a 3D printed object therein is completely or substantially submerged, and activating the propellor 2902 in order to create a flow of the solvent liquid within the wash reservoir 40 and dislodge or remove any undesired residue.

In exemplary embodiments, for each cycle, the system consumes only 370 ml liquid, and the wash takes 3 mins. The high running speed with 3000 RPM of a brushless motor 2904, will drive the propeller to spin the surrounding liquid up. Calculating the optimal volume of the liquid consumed, this maximally releases the power of the brushless motor, and increases the liquid exchange rate with the wash part surface. In some embodiments, a brushless motor selection with proper KV rating and speed setting may deliver sufficient force of the liquid onto the part being washed. One benefit of this system is using a minimum volume of liquid to deliver the highest efficiency of wash result. Compared with conventional methods for washing, motor assembly 2600 highly increases the wash efficiency and wash cleanness results.

Figure 30:
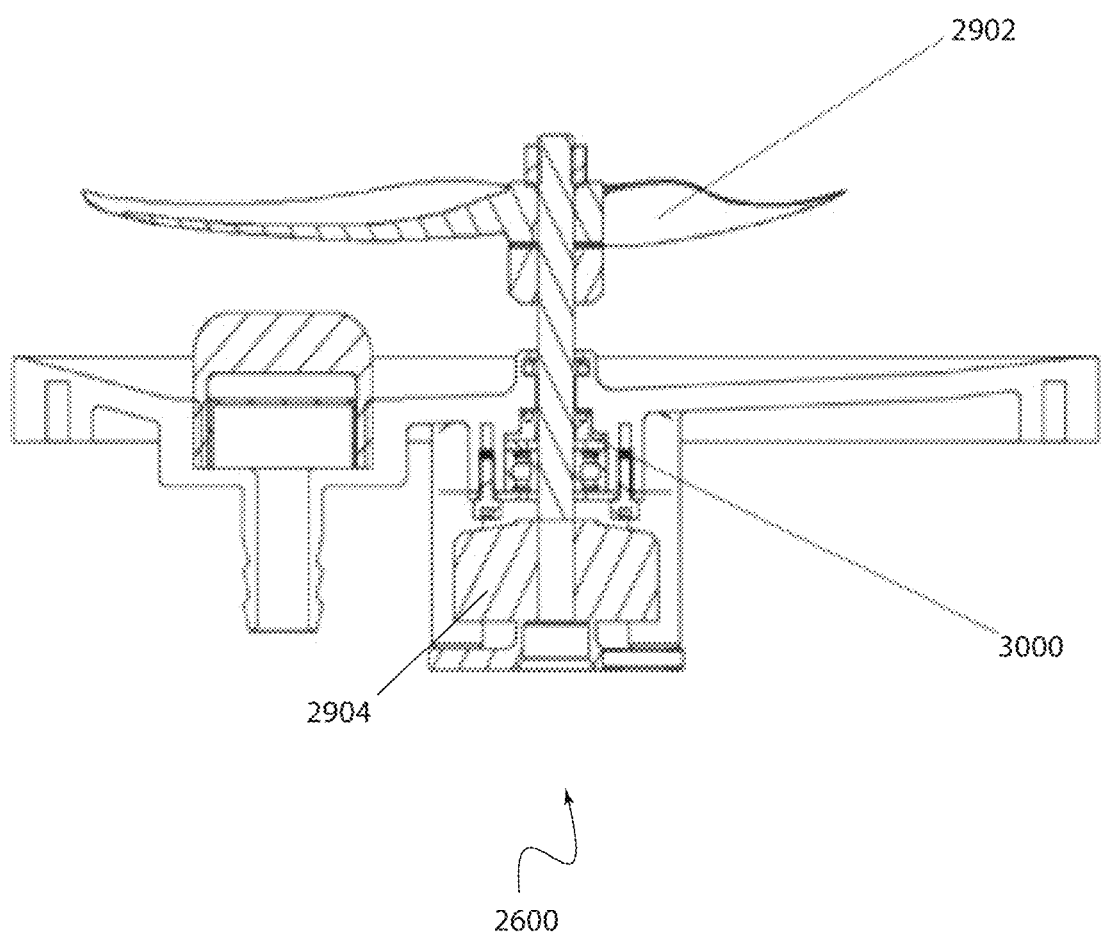
FIG. 30 depicts a cross-sectional view of some exemplary components of a solvent disperser module in accordance with the present invention.

Turning now to the next figure, FIG. 30 depicts a cross-sectional view of some exemplary components of a motor assembly for a disperser module in accordance with the present invention. More specifically, FIG. 30 depicts motor assembly 2600. To deliver a stable liquid dispersion, a motor 2904 drives an agitator, which in some exemplary embodiments as shown in this figure may comprise of a propeller 2902 to spin at stable RPMs. To deliver long-term usage, a seal may be preferably employed by assembly 2600, for example, and without limiting the scope of the present invention, a dynamic seal 3000. Dynamic seal 3000 may comprise of a rotary seal, or a power transmission seal. As may be appreciated by a person of ordinary skill in the art, dynamic seal 3000 is configured to seal openings between a rotating and a stationary component.

Figure 31A:
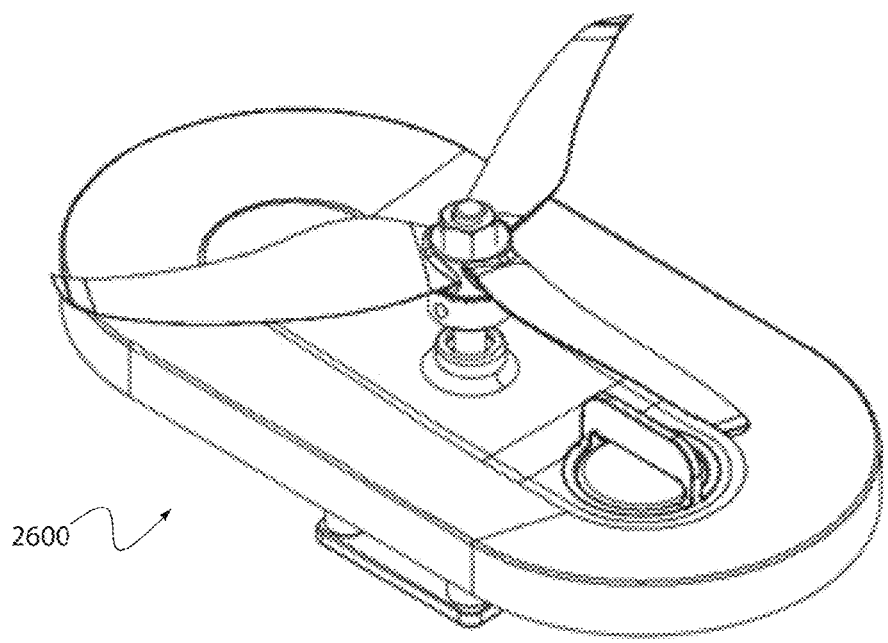
FIG. 31A depicts a perspective view of a solvent disperser assembly housing a motor in a sealed configuration.
Figure 31B:
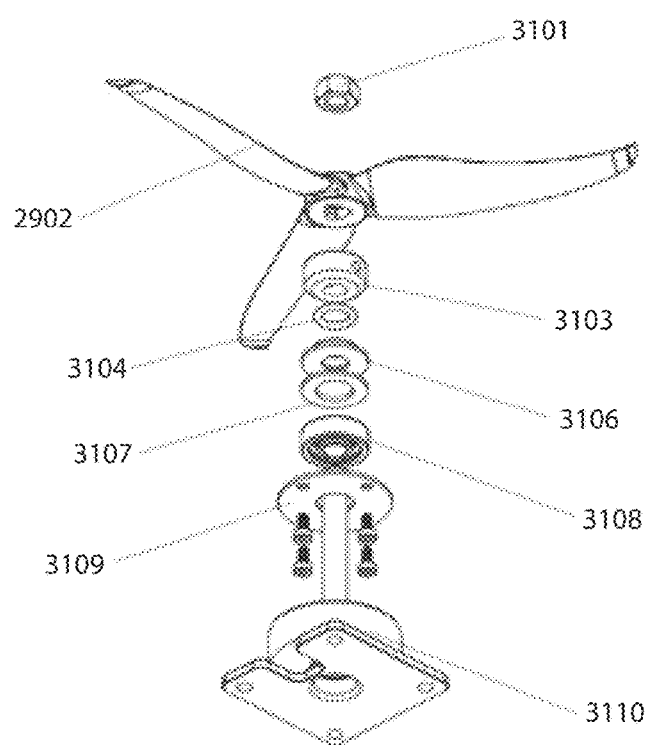
FIG. 31B depicts an exploded view of the components of the solvent disperser assembly depicted in FIG. 31A.

FIG. 31A depicts a perspective view of motor assembly 2600 and FIG. 31B depicts an exploded view thereof. The motor assembly 2600 may include lock nuts 3101, that lock the propeller to the assembly, propeller 2902, propeller seat 3103, which is a collar that contains the set screw to secure the propeller seat, a protecting O-ring 3104, a component for minimize the liquid flow into the seal, a grease component (not numbered)—such as a chemical resistant grease to help isolate the liquid that may traverse through the seal, a flange rotary seal 3106—a seal with flange that is the primary seal surface—a spacer 3107, a bearing 3108—a rotary assistant, a seal cover 3109, which is tightened by 4 M2 screws and compresses the entire assembly, and a brushless motor 3110, which may be configured to run at 3000 rpm in some exemplary embodiments, and which is the power source of the motor assembly 2600 to drive the propeller 2902.

Figure 32A:
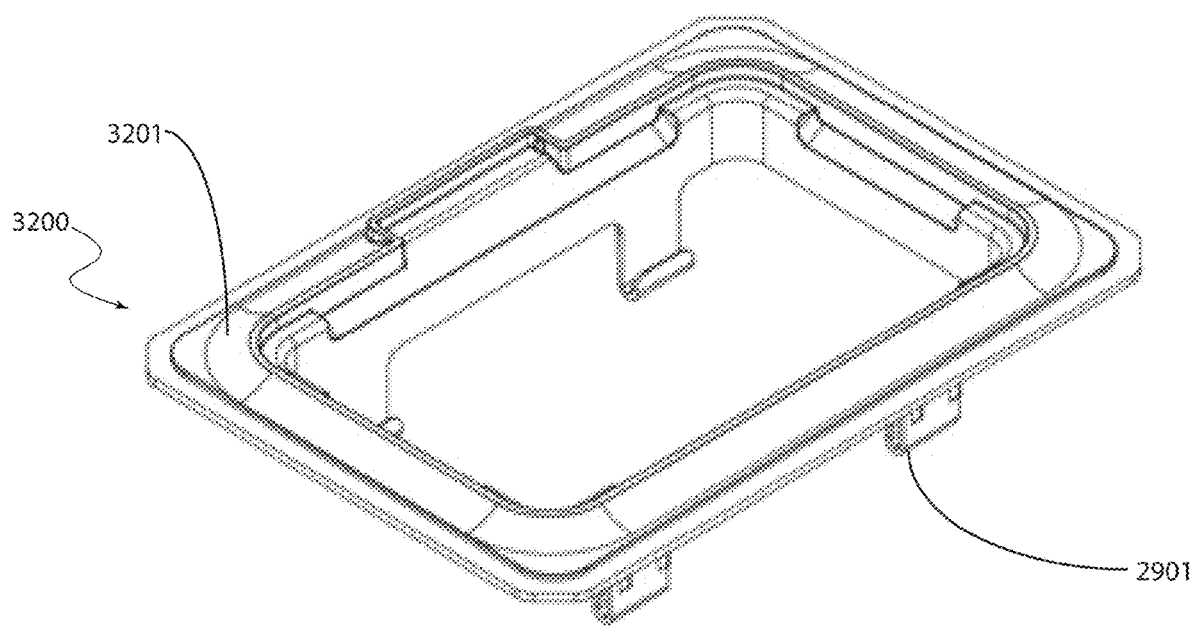
FIG. 32A-FIG. 32B depict a perspective view and a cross-sectional view of an airway or airflow system in accordance with some exemplary embodiments of the present invention.
Figure 32B:
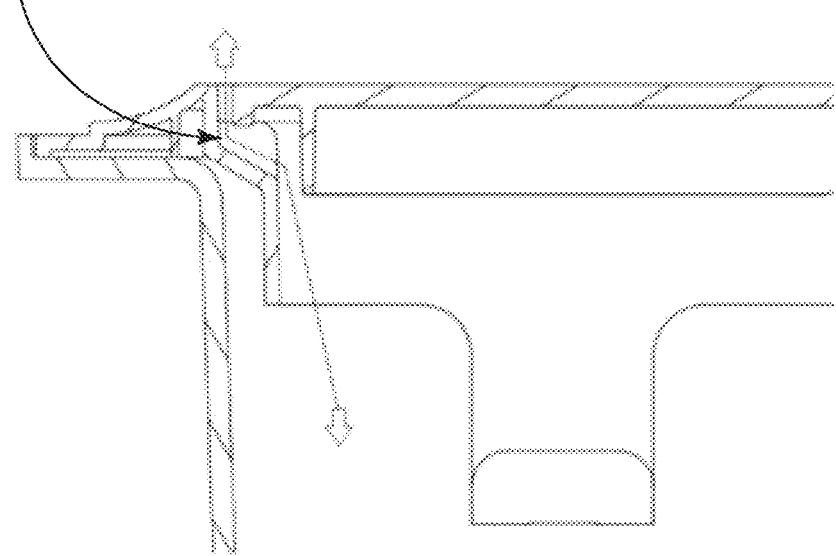

Turning now to the next set of figures, FIG. 32A-FIG. 32B depict a perspective view and a cross-sectional view of an airway or airflow system in accordance with some exemplary embodiments of the present invention. More specifically, these figures depict a unique design of an airflow system 3200, which comprises of a lid or lid adapter that provides an air channel to deliver the air exchange system between the chamber or cavity of wash receptacle 40 and the exterior thereof, as well as an anti-splash guard that may be built into the adapter. FIG. 32B shows how a splash guard 3201 registers with a wash bucket 4 with a retaining arm 2901 that extends from a bottom region of the splash guard 3201. Moreover, FIG. 32B depicts channel 3203 for providing an airflow or ventilation into the wash reservoir. In this embodiment, retaining arm 2901 extends from a bottom portion of splash guard 3201. The channel 3203 of airflow system 3200 facilitates a flow of air when, for example, an air-drying cycle is performed by allowing a flow of air into and or out of wash reservoir 40.

Figure 33A:
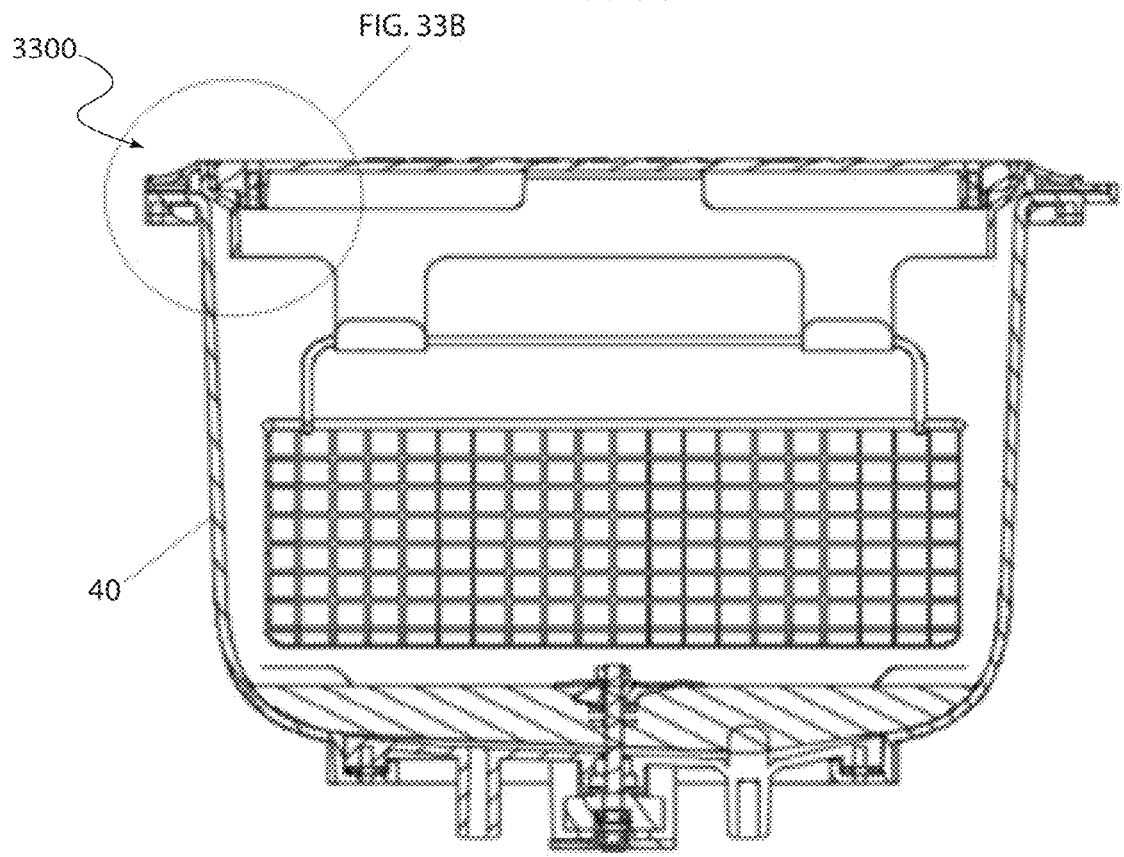
FIG. 33A-FIG. 33B depict a cross-sectional view and a close-up cross-sectional view, respectively, of an enclosure monitoring system in accordance with some exemplary embodiments of the present invention.
Figure 33B:
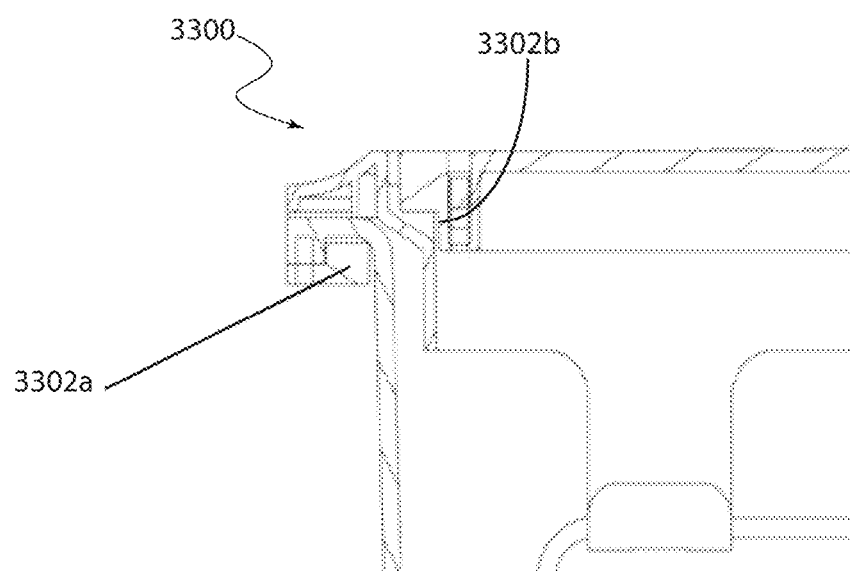

Turning now to the next set of figures, FIG. 33A-FIG. 33B depict a cross-sectional view and a close-up cross-sectional view, respectively, of an enclosure monitoring system in accordance with some exemplary embodiments of the present invention. More specifically, these views depict enclosure monitoring system 3300, which may include a magnet sensor system designed to identify whether the wash lid or the platform is sitting flat. FIG. 33A shows the whole picture of the magnet sensor system with a wash bucket 3301. FIG. 33B is the detail section view of how the magnet sensors 3302a, 3302b may be positioned. For example, and without limiting the scope of the present invention, a first magnet 3302a is taped on the platform, and inserted into the groove of the wash lid. A second magnet 3302b may be mounted on the outside of the wash bucket. When laying down the wash lid or the platform, the magnet will create the hall effect, which enables a controller to read the sensor feedback and determine a position of the wash lid and or platform. This user-friendly feature could protect the user when they open the wash lid or platform, the system will automatically pause to avoid the liquid splash out of the machine. Once the user places back the wash lid or platform, the system will resume the process.

Figure 34A:
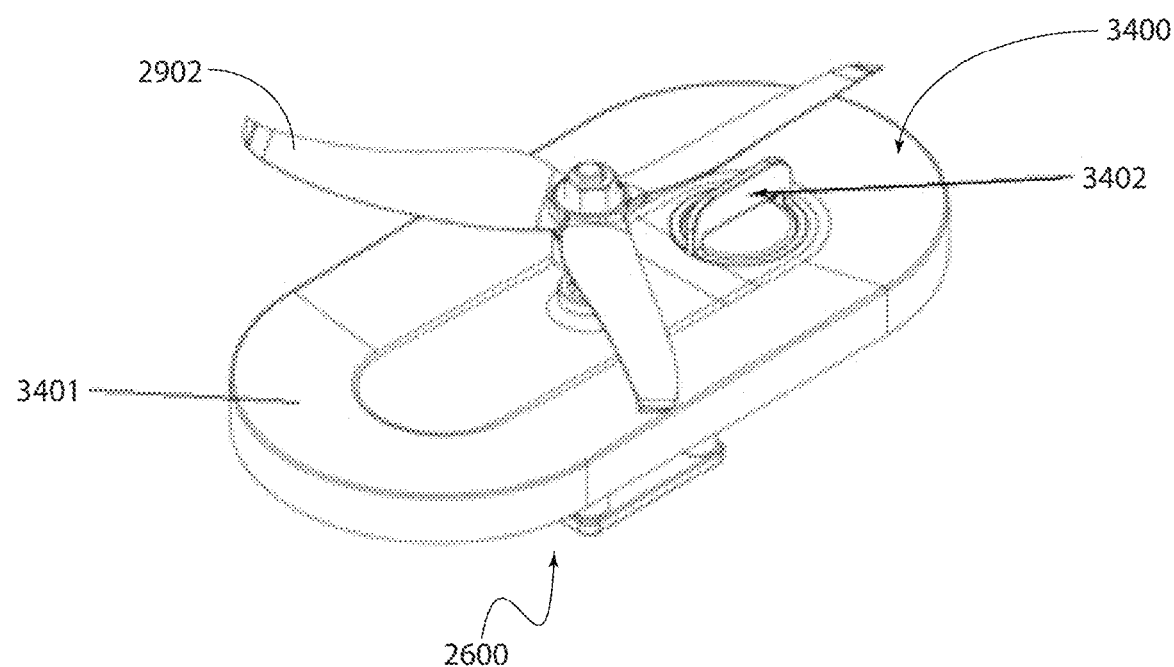
FIG. 34A-FIG. 34B depict a perspective view and a cross-sectional view of a vortex breaker in accordance with some exemplary embodiments of the present invention.
Figure 34B:
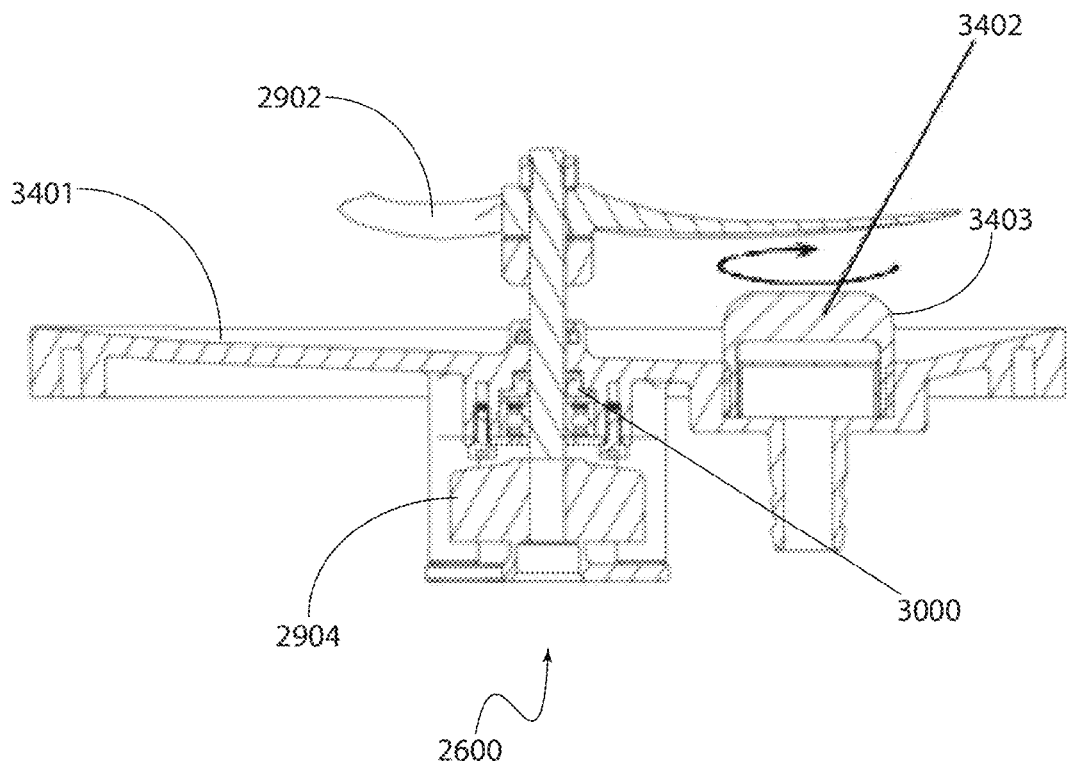

Turning to the next set of figures, FIG. 34A-FIG. 34B depict a perspective view and a cross-sectional view of a vortex breaker in accordance with some exemplary embodiments of the present invention. More specifically, these figures show vortex breaker 3400, an exemplary feature that may be implemented on a base or surface of disperser module 30 such as on a base portion of motor assembly 2600 of the disperser module 30. FIG. 34A illustrates how vortex breaker 3400 may be situated as a replaceable part on a base 3401. The function of it is to stop the formation of the vortex when draining the liquid through one or more drain holes that may be sealed and or controlled with a drain control 3402. FIG. 34B depicts a cross-sectional view of the vortex breaker 3400. The unique feature includes a twist knob 3403 of drain control 3402, that is easy to remove by the user. By opening up knob 3403, drainage can be more efficiently achieved.

Figure 35A:
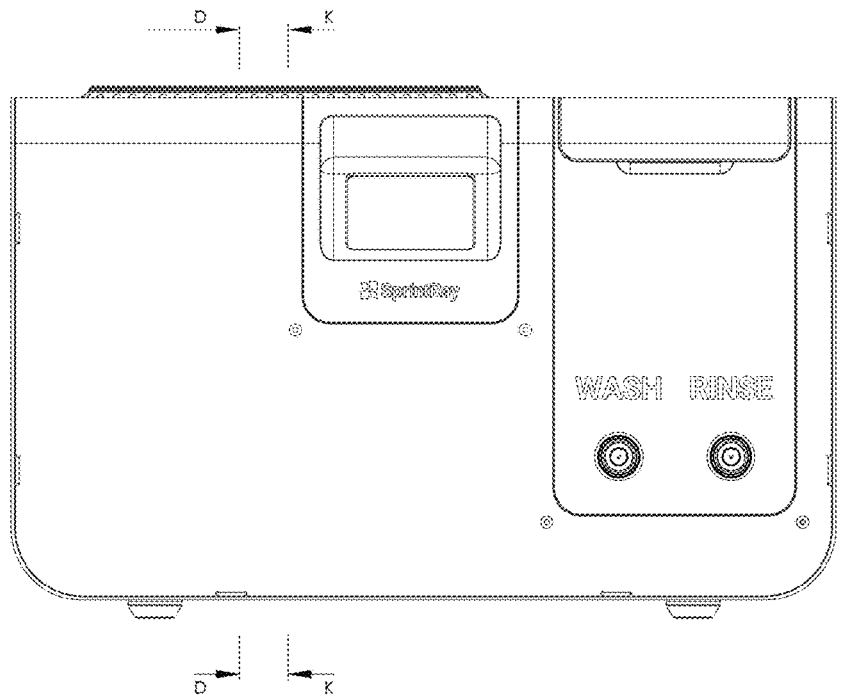
FIG. 35A-FIG. 35C depict a front view and side views, respectively, of the exemplary embodiment illustrated in FIG. 11A-FIG. 11B, the housing shown in a sealed configuration with a top lid in the closed position.
Figure 35B:
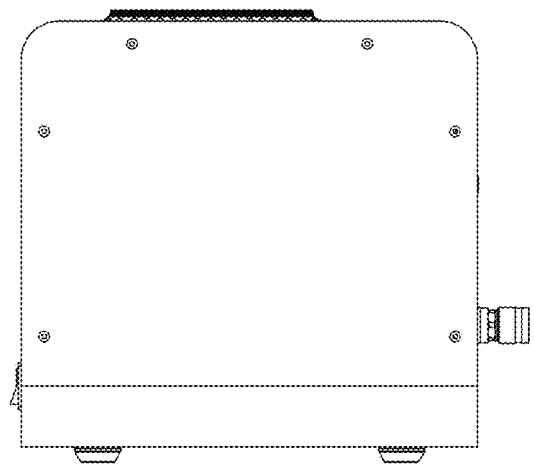
Figure 35C:
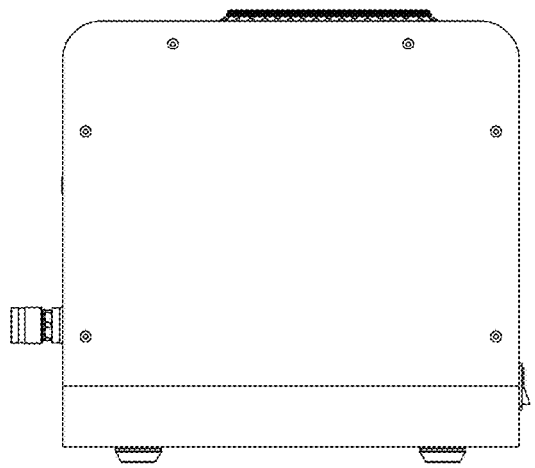

FIG. 35A-FIG. 35C depict a front view and side views, respectively, of the exemplary embodiment illustrated in FIG. 23A-FIG. 28, the housing shown in a sealed configuration with a top lid in the closed position.

Figure 36:
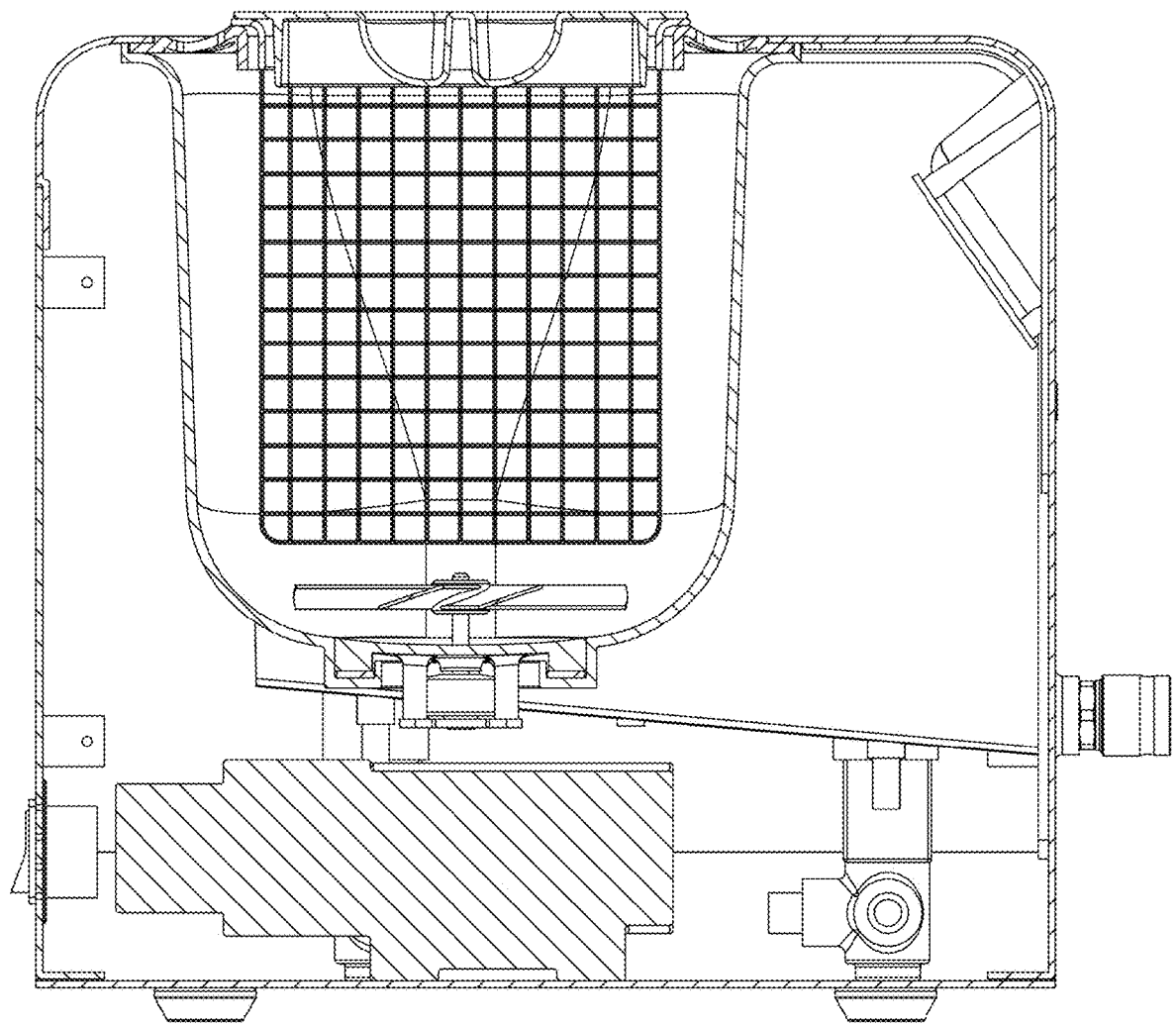
FIG. 36-FIG. 37 depict cross-sectional views along line segments D-D and K-K as shown in FIG. 35A.
Figure 37:
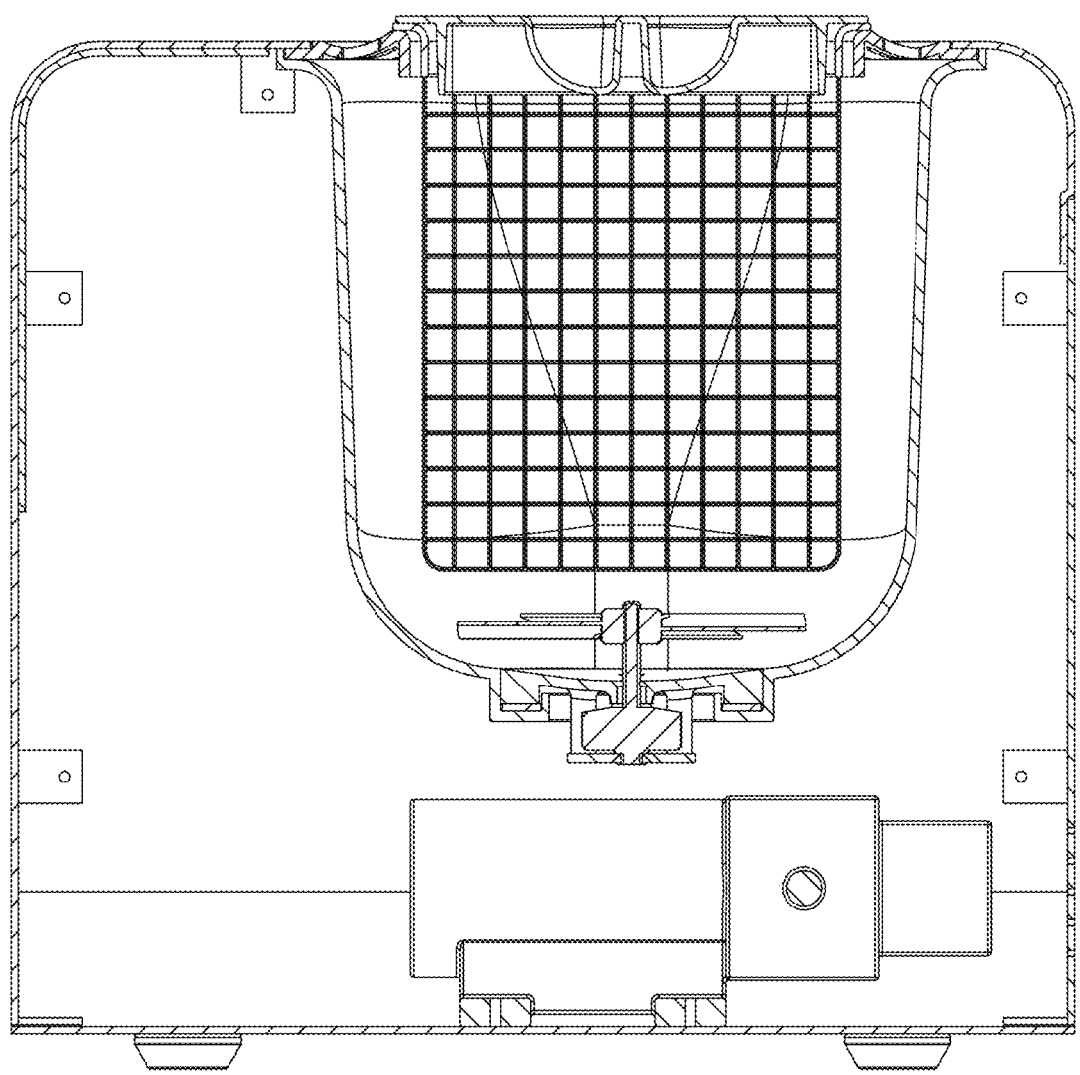
Figure 38:
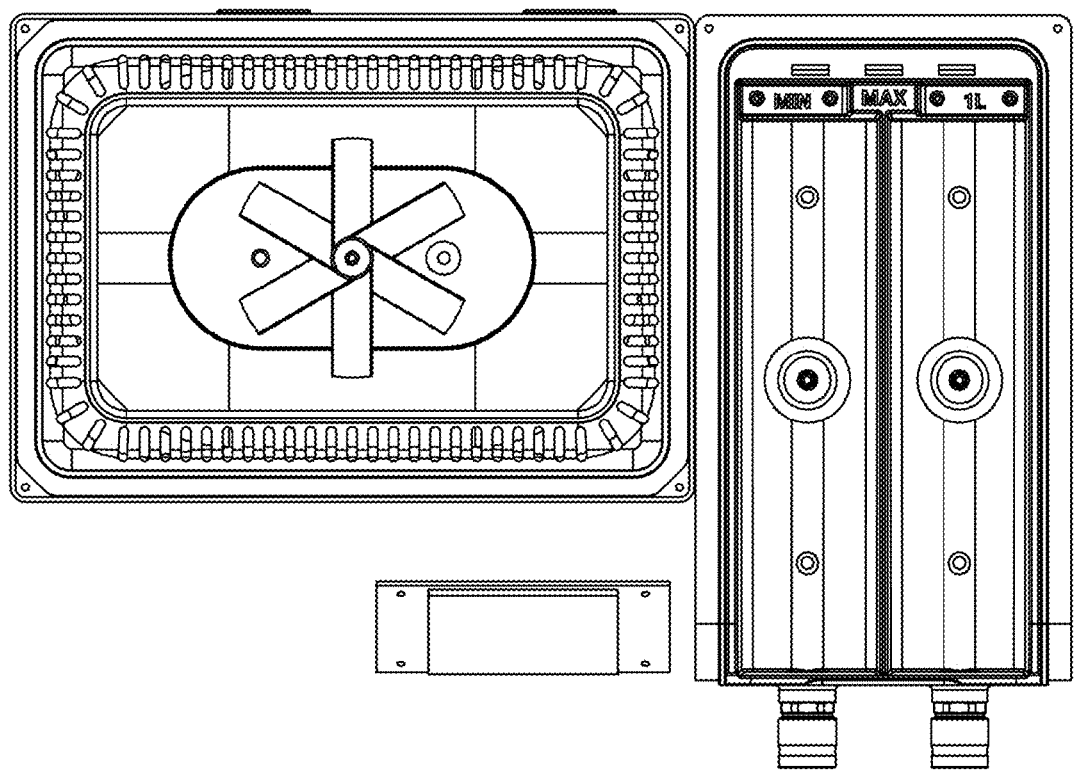
FIG. 38-FIG. 42 depict a top view, and several perspective views of an exemplary embodiment of the present invention in which two removable cartridges serve as repositories for two solutions kept separately adjacent to the washing cavity.
Figure 39:
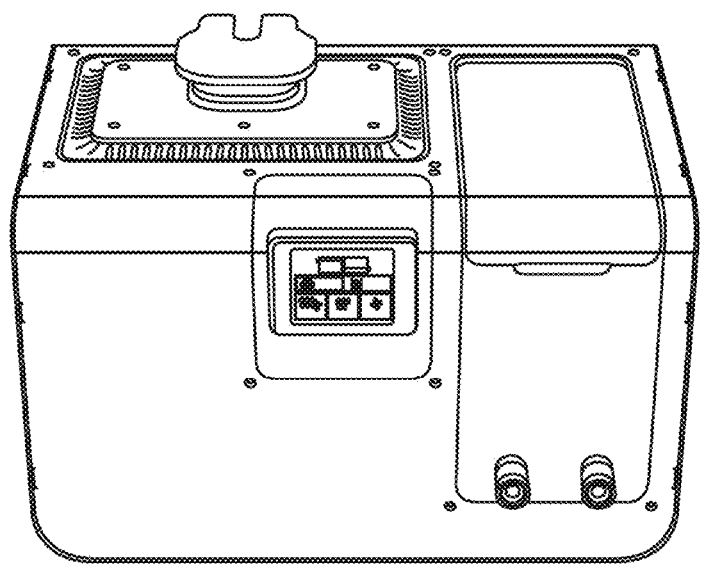
Figure 40:
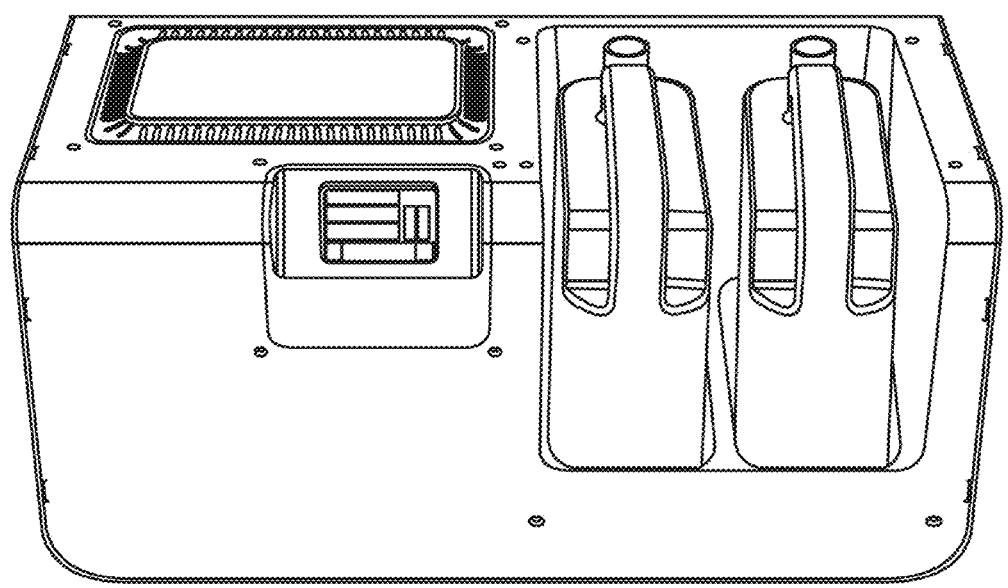
Figure 41:
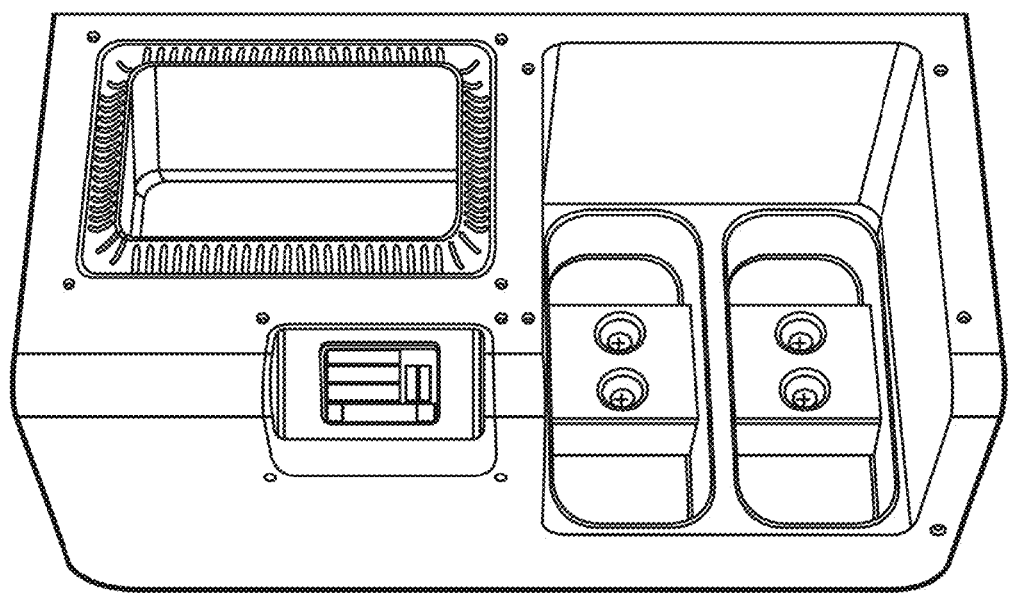
Figure 42:
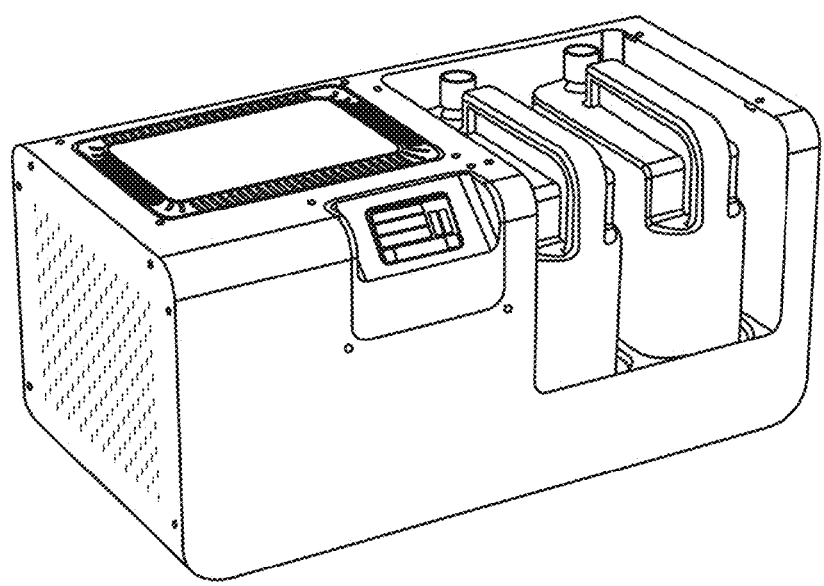

FIG. 36-FIG. 37 depict cross-sectional views along line segments D-D and K-K as shown in FIG. 35A, illustrating the cage within the wash reservoir. As may be appreciated from these views and as described above, during some cycles, the agitator such as a propeller of the washing system may be completely submerged, partially submerged (as in FIG. 29) or completely above a solution or liquid level within the wash reservoir of the system, depending on the cycle (i.e., the different wash cycles, or an air-dry cycle).

FIG. 38-FIG. 42 depict a top view, and several perspective views of an exemplary embodiment of the present invention in which two removable cartridges serve as repositories for two solutions kept separately adjacent to the washing cavity. This design is an exemplary design in accordance with embodiments discussed above, including as described with reference to FIG. 3-4, and FIG. 6.

Figure 43:
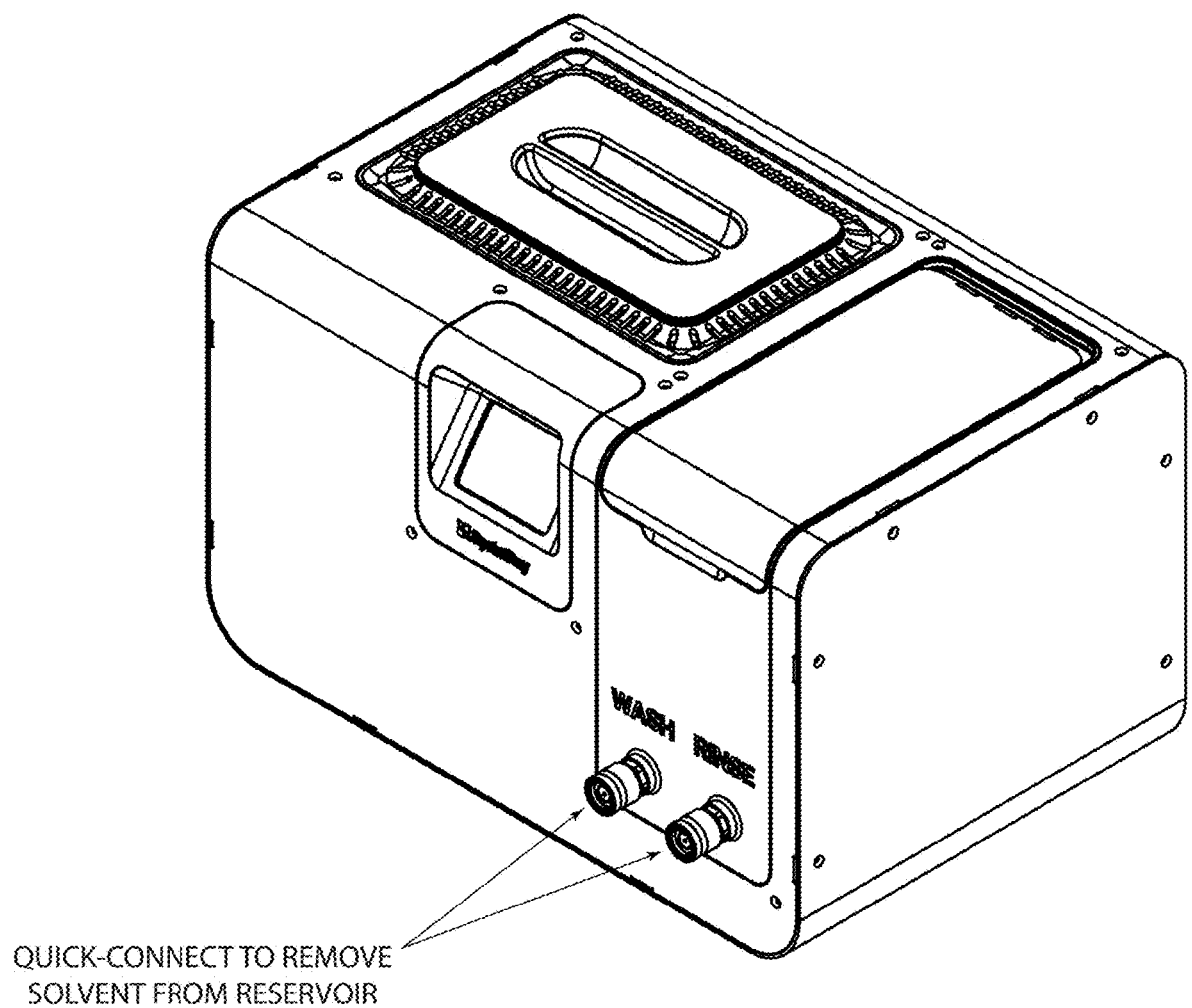
FIG. 43 depicts a perspective view of an exemplary embodiment of the present invention that employs a quick-connect valve system for efficiently removing solvent from one or more solvent reservoirs.

FIG. 43 depicts a perspective view of an exemplary embodiment of the present invention that employs a quick-connect valve system for efficiently removing solvent from one or more solvent reservoirs.

Figure 44A:
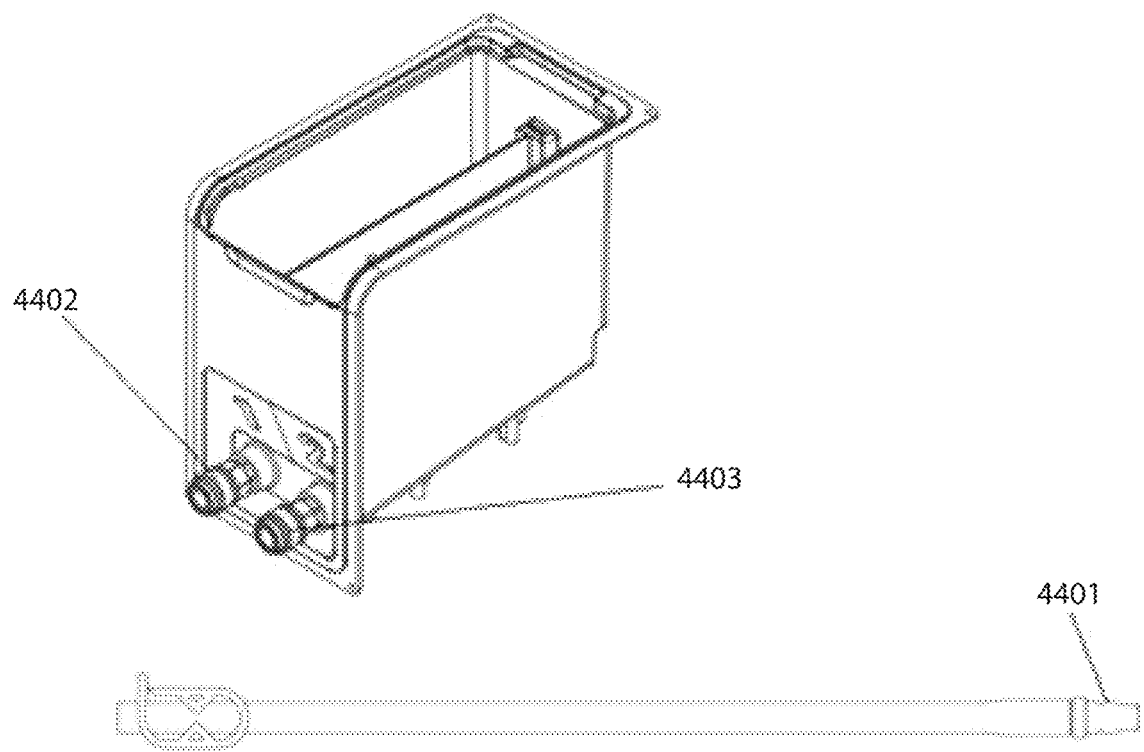
FIG. 44A-44B depict components for a quick-connect valve system in accordance with the present invention.
Figure 44B:
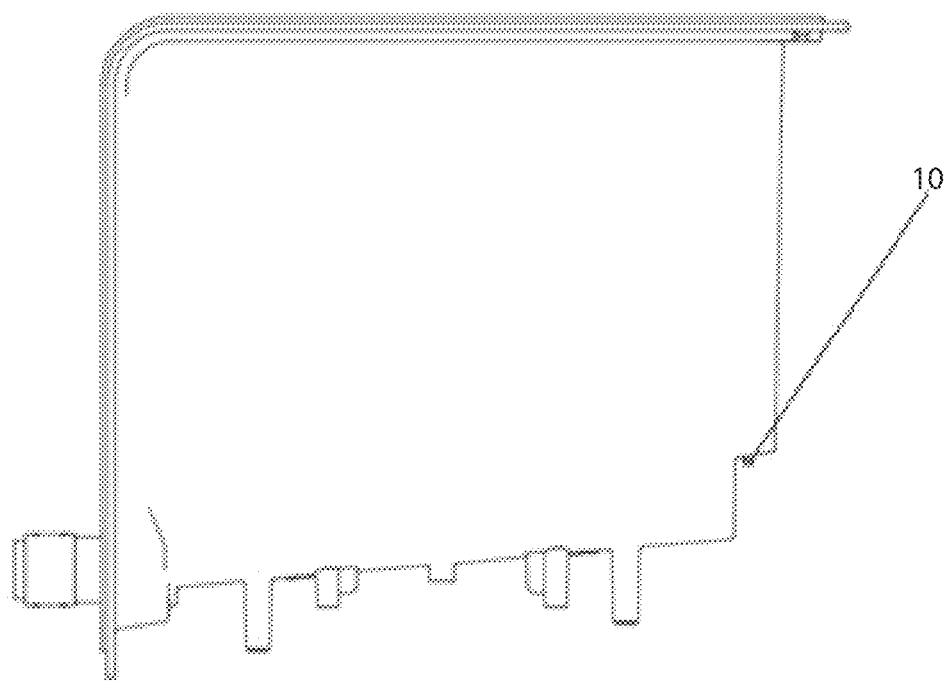

FIG. 44A-44B depict components for a quick-connect valve system in accordance with the present invention. As mentioned above, the quick-connect valves or fittings on an exterior of each reservoir may be used to easily drain or replace each of the solutions therein. Because the quick connect fittings have a release mechanism that prevent liquid from spilling upon shutting off, the components facilitate the draining and replacement of procedure. Accordingly, this design may be desirable to save space and avoid the costs of the cartridges that may be employed in accordance with other exemplary embodiments of the present invention. Notably, in either embodiment, the solutions are kept separated and never mixed outside of the wash reservoir also shown in these views.

In FIG. 44A, a quick disconnect system 4400 is illustrated in three parts: the male quick disconnect 4401, a female quick disconnect 4402, and a female quick disconnect 4403. The function of this quick disconnect fitting is to automatically shut-off liquid flow upon disconnection. FIG. 44B depicts a side view of the solvent reservoir 10, which may be slanted for easier cleaning as the slanting surface allows for easier drainage.

Figure 45:
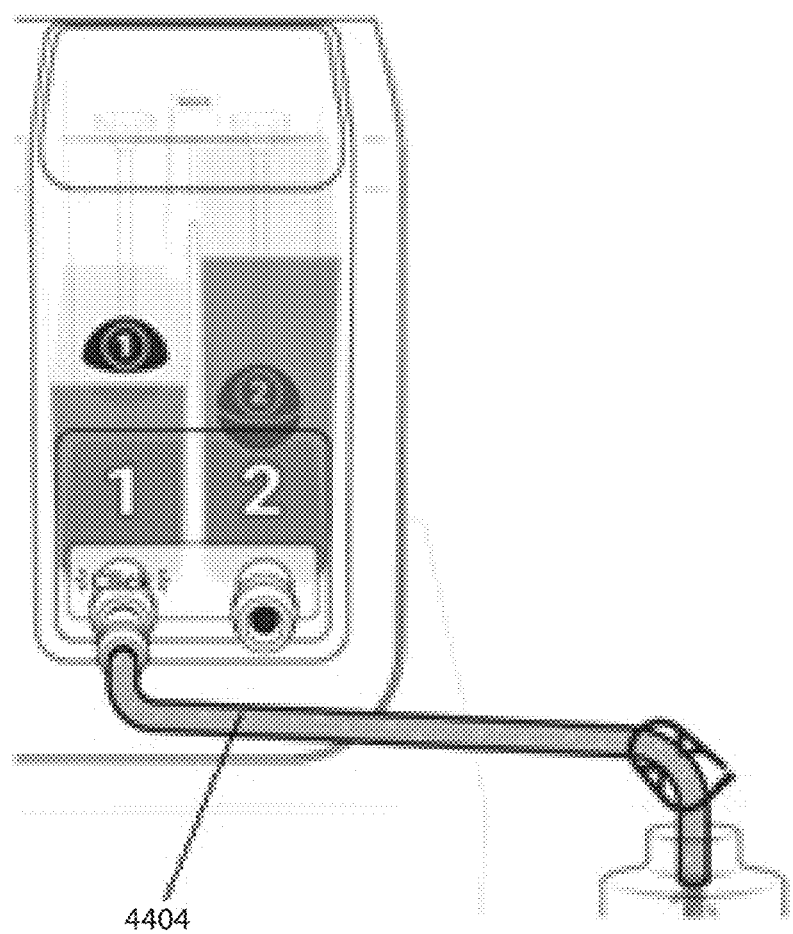
FIG. 45 depicts a quick-connect valve system in use, in accordance with practice of the present invention.

FIG. 45 depicts a quick-connect valve system in use, in accordance with practice of the present invention. In FIG. 45, a flow path 4404 is reestablished when the couplings are connected (for example, male quick disconnect 4401 to a female quick disconnect 4402); this feature allows the users to drain the liquid easily by inserting the quick disconnect, the insert will stay in place until manually push-pull out.

A multi-stage wash system for vat polymerization-based 3D printed parts has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method, performed by a multi-stage wash system for washing off residual resin from objects that are 3D-printed through a vat polymerization process, comprising:

exposing a 3D-printed object to a first solution of a plurality of solvent solutions inside an enclosure of a wash reservoir of the multi-stage wash system;

subsequently to exposing the 3D-printed object to the first solution, exposing the 3D-printed object to a second solution of the plurality of solvent solutions within the enclosure of the wash reservoir of the multi-stage wash system; and drying the 3D-printed object by exposing the 3D-printed object to an airflow within the enclosure of the wash reservoir of the multi-stage wash system, the airflow facilitated by an array of slots and corresponding blocks on an anti-splash adapter of the wash reservoir.

2. The method of claim 1, wherein drying the 3D-printed object by exposing the 3D-printed object to the airflow includes activating an agitator to create the airflow and dry the 3D-printed object.

3. The method of claim 1, further comprising:
filling up the wash reservoir or confirming the wash reservoir is filled to a predetermined amount with the first or second solutions so that the 3D-printed object inside the wash reservoir is at least partially submerged during a rinsing cycle.

4. The method of claim 1, further comprising:
monitoring a liquid level inside the enclosure using one or more sensors.

5. The method of claim 1, further comprising:
monitoring a resin concentration inside a wash solvent receptacle using one or more sensors.

6. The method of claim 1, further comprising:
detecting a resin density within a wash solvent receptacle.

7. The method of claim 1, further comprising:
determining a combination of a time and a style for one or more cycles of the multi-stage wash system based on a resin concentration of the first solution or the second solution used.

8. The method of claim 1, further comprising:
determining a combination of a time and a style for one or more cycles of the multi-stage wash system based on an amount of residual resin on the 3D printed object.

9. The method of claim 1, further comprising:
displaying via a user interface of the multi-stage wash system a status of the multi-stage wash system or wash cycle.

10. The method of claim 1, further comprising:
displaying a progress concerning a cycle of the multi-stage wash system.

11. The method of claim 1, further comprising:
executing a preprogrammed routine in response to receiving one or more commands from a user via a user interface of the multi-stage wash system, including starting or terminating a wash cycle.

12. The method of claim 1, further comprising:
executing a preprogrammed routine in response to receiving one or more commands from a user via a user interface of the multi-stage wash system, including setting a customized time for one or more wash or dry stages in a multi-stage wash cycle.

13. The method of claim 1, further comprising:
executing a preprogrammed routine in response to receiving one or more commands from a user via a user interface of the multi-stage wash system, including draining one or more receptacles of the wash reservoir of the multi-stage wash system.

14. The method of claim 1, wherein exposing the 3D-printed object to the first solution or the second solution includes dispersing the first solution or the second solution onto the 3D-printed object by activating an agitator.

15. The method of claim 1, further comprising:
pumping the first solution or the second solution from the wash reservoir to a wash solvent receptacle in order to substantially remove the first solution or the second solution from the wash reservoir.

16. The method of claim 1, further comprising:
pumping the first solution or the second solution from a wash solvent receptacle to the wash reservoir.

17. The method of claim 16, wherein:
pumping the first solution or the second solution from the wash solvent receptacle to the wash reservoir comprises filling up the wash reservoir with the first solution or the second solution so that the 3D-printed object inside the wash reservoir is fully submerged in the first solution or the second solution during a rinsing cycle.

18. The method of claim 16, wherein:
pumping the first solution or the second solution from the wash solvent receptacle to the wash reservoir comprises filling up the wash reservoir with the first or second solutions so that a propeller of an agitator is fully submerged in the first solution or the second solution during a splashing cycle.

19. The method of claim 16, wherein:
pumping the first solution or the second solution from the wash solvent receptacle to the wash reservoir comprises filling up the wash reservoir with the first or second solutions so that a solvent level inside the wash reservoir is lower than a portion of a propeller of an agitator during a jetting cycle.

20. The method of claim 1, further comprising:
dispersing the first solution or the second solution onto the 3D-printed object by activating an agitator, wherein dispersing the first solution or the second solution in one of a jetting manner, a splattering manner, and an immersive manner.

21. The method of claim 1, further comprising:
securing the 3D-printed object within the wash reservoir by a removable cage.

* * * * *